(12) United States Patent
Kempe

(10) Patent No.: US 7,107,205 B2
(45) Date of Patent: Sep. 12, 2006

(54) METHOD AND APPARATUS FOR ALIGNING AMBIGUITY IN FINITE STATE TRANSDUCERS

(75) Inventor: Andre Kempe, Biviers (FR)

(73) Assignee: Xerox Corporation, Stamford, CT (US)

( * ) Notice: Subject to any disclaimer, the term of this patent is extended or adjusted under 35 U.S.C. 154(b) by 1025 days.

(21) Appl. No.: 09/737,939

(22) Filed: Dec. 18, 2000

(65) Prior Publication Data

US 2002/0046017 A1 Apr. 18, 2002

Related U.S. Application Data

(60) Provisional application No. 60/194,493, filed on Apr. 3, 2000.

(51) Int. Cl.
  G06F 17/28 (2006.01)
  G06F 17/27 (2006.01)
  G06E 1/00 (2006.01)
(52) U.S. Cl. .................................. 704/2; 706/20; 704/9
(58) Field of Classification Search .................... 704/2, 704/9; 706/20
  See application file for complete search history.

(56) References Cited

U.S. PATENT DOCUMENTS 5,461,573 A * 10/1995 Chakradhar et al. ............ 716/4
5,721,939 A *  2/1998 Kaplan ........................... 704/9
6,587,844 B1 *  7/2003 Mohri ........................... 706/20

OTHER PUBLICATIONS

Kukula, James et al., Finite State Machine Decomposition By Transistion Pairing, IEEE, ICCAD-91,Nov. 1991, 414-417.*
Pereira, Fernando et al., Finite-State Approximation of Phrase Structure Grammars, ACL-91, Jun. 1991, 246-255.*
Devadas, Srinivas. Decomposition and Factoring of Sequential Finite State Machines, IEEE, Trans CAD, Nov. 1989, 1206-1217.*
Roche, Emmanuel. Factorization of Finite-State Transducer, MERL-TR-95-2, Feb. 1995, 1-13.*
Roche et al., Deterministic Part-Of-Speech Tagging with Finite State Transducers, MERL TR-94-07, Mar. 1995.*
Johnston, Michael et al., Finite-state Multimodal Parsing and Understanding, Jul. 2000, Proceedings of the 17th conference on Computational Linguistics—vol. 1, p. 369-375.*
Elgot C.C et al. "On Relations Defined by Generalized Finite Automata," IBM Journal of Research and Development, pp. 47-68, Jan. 1965.
Kempe, Andre "Reduction of Intermediate Alphabets in Finite-State Transducer Cascades," 7th Conference on Automatic Natural Language Processing (TALN), Lausanne, Switzerland; Sep. 16-18, 2000.
Kempe, Andre "Factorization of Ambiguous Finite-State Transducers," Pre-Proceedings of the 5th International Conference on Implementation and Application of Automata (CIAA), p. 157-164, London, Ontario, Canada, Jul. 2000 Final Proceedings in : Springer-Verlag Lecture Notes in Computer Science.
Roche E. et al. "Introduction", Finite-State Language Processing, MIT Press, Cambridge, MA, USA, pp. 1-66, Jun. 1997.
Sakarovitch, Jacques "A Construction on Finite Automata that has Remained Hidden," Theoretical Computer Science, 204:205-231, Sep. 1998.
Schutzenberger, Marcel Paul "A Remark on Finite Transducers," Information and Control, 4: 185-187, Sep. 1961.

* cited by examiner

*Primary Examiner*—Vijay Chawan
*Assistant Examiner*—Myriam Pierre
(74) *Attorney, Agent, or Firm*—Oliff & Berridge, PLC

(57) ABSTRACT

A method prepares a functional finite-state transducer (FST) with an epsilon or empty string on the input side for factorization into a bimachine. The method creates a left-deterministic input finite-state automation (FSA) by extracting and left-determinizing the input side of the functional FST. Subsequently, the corresponding sub-paths in the FST are identified for each arc in the left-deterministic FST and aligned.

16 Claims, 46 Drawing Sheets

METHOD AND APPARATUS FOR ALIGNING AMBIGUITY IN FINITE STATE TRANSDUCERS

CROSS-REFERENCE TO RELATED APPLICATIONS

Priority is claimed from U.S. Provisional Application No. 60/194,493, filed Apr. 3, 2000 by the same inventor and assignee, which is hereby incorporated herein by reference.

Cross-reference is made to U.S. patent application Ser. Nos., which are all hereby incorporated herein by reference: 09/737,552, entitled "Method And Apparatus For Factoring Ambiguous Finite State Transducers"; 09/737,940, entitled "Method And Apparatus For Factoring Unambiguous Finite State Transducers"; 09/737,939, entitled "Method And Apparatus For Aligning Ambiguity In Finite State Transducers"; 09/737,758, entitled "Method And Apparatus For Factoring Finite State Transducers With Unknown Symbols"; 09/737,553, entitled "Method And Apparatus For Extracting Infinite Ambiguity When Factoring Finite State Transducers"; 09/737,857, entitled "Method And Apparatus For Reducing The Intermediate Alphabet Occurring Between Cascaded Finite State Transducers"; 09/737,757, entitled "Method And Apparatus For Extracting Short Runs Of Ambiguity From Finite State Transducers".

BACKGROUND OF THE INVENTION

1. Field of the Invention

The invention relates to finite-state language processing, and more particularly to methods for efficiently processing finite-state networks in language processing and other applications.

2. Description of Related Art

Many basic steps in language processing, ranging from tokenization to phonological and morphological analysis, disambiguation, spelling correction, and shallow parsing can be performed efficiently by means of finite-state transducers. Such transducers are generally compiled from regular expressions, a formal language for representing sets and relations. Although regular expressions and methods for compiling them into automata have been part of elementary computer science for decades, the application of finite-state transducers to natural-language processing has given rise to many extensions to the classical regular-expression calculus.

The term language is used herein in a general sense to refer to a set of strings of any kind. A string is a concatenation of zero or more symbols. In the examples set forth below, the symbols are, in general, single characters such as "a", but user-defined multicharacter symbols such as "+Noun" are also possible. Multicharacter symbols are considered as atomic entities rather than as concatenations of single-character strings. A string that contains no symbols at all is called the empty string and the language that contains the empty string but no other strings is known as the empty string language. A language that contains no strings at all, not even the empty string, is called the empty language or null language. The language that contains every possible string of any length is called the universal language.

A set of ordered string pairs such as {<"a", "bb">, <"cd", "">} is called a relation. The first member of a pair is called the upper string, and the second member is called the lower string. A string-to-string relation is a mapping between two languages: the upper language and the lower language. They correspond to what is usually called the domain and the range of a relation. In this case, the upper language is {"a", "cd"} and the lower language is {"bb", ""}. A relation such as {<"a", "a">} in which every pair contains the same string twice is called an identity relation. If a relation pairs every string with a string that has the same length, the relation is an equal-length relation. Every identity relation is obviously an equal-length relation.

Finite-state automata are considered to be networks, or directed graphs that consist of states and labeled arcs. A network contains a single initial state, also called the start state, and any number of final states. In the figures presented herewith, states are represented as circles and arcs are represented as arrows. In the included diagrams, the start state is always the leftmost state and final states are marked by a double circle. Each state acts as the origin for zero or more arcs leading to some destination state. A sequence of arcs leading from the initial state to a final state is called a path. An arc may be labeled either by a single symbol such as "a" or a symbol pair such as "a:b", where "a" designates the symbol on the upper side of the arc and "b" the symbol on the lower side. If all the arcs of a network are labeled by a single symbol, the network is called a simple automation; if at least one label is a symbol pair the network is a transducer. Simple finite-state automata and transducers will not be treated as different types of mathematical objects herein. The framework set forth herein reflects closely the data structures in the Xerox implementation of finite-state networks.

A few simple examples illustrating some linguistic applications of finite-state networks are set forth below. The following sections will describe how such networks can be constructed.

Every path in a finite-state network encodes a string or an ordered pair of strings. The totality of paths in a network encodes a finite-state language or a finite-state relation. For example, the network illustrated in FIG. 1 encodes the language {"clear", "clever", "ear", "ever", "fat", "fatter"}.

Each state in FIG. 1 has a number, thereby facilitating references to paths through the network. There is a path for each of the six words in the language. For example, the path <0-e-3-v-9-e-4-r-5> represents the word "ever". A finite-state network is a very efficient encoding for a word list because all words beginning and ending in the same way can share a part of the network and every path is distinct from every other path.

If the number of words in a language is finite, then the network that encodes it is acyclic; that is, no path in the network loops back onto itself. Such a network also provides a perfect hash function for the language, a function that assigns or maps each word to a unique number in the range from 0 to n−1, where n is the number of paths in the network.

The network illustrated in FIG. 2 is an example of a lexical transducer. It encodes the relation {<"leaf+NN", "leaf">, <"leaf+NNS", "leaves">, <"left+JJ", "left">, <"leave+NN", "leave">, <"leave+NNS", "leaves">, <"leave+VB", "leave">, <"leave+VBZ", "leaves">, <"leave+VBD", "left">}. The substrings beginning with "+" are multicharacter symbols.

In order to make the diagrams less cluttered, it is traditional to combine several arcs into a single multiply-labeled arc. For example, the arc from state 5 to state 6 abbreviates four arcs that have the same origin and destination but a different label: "+NN:0", "+NNN:s", "+VB:0", "+VBZ:s". In this example, "0" is the epsilon symbol, standing for the empty string. Another important convention illustrated in FIG. 2 is that identity pairs such as "e:e" are represented as a single symbol "e". Because of this convention, the network in FIG. 1 could also be interpreted as a transducer for the identity relation on the language.

The lower language of the lexical transducer in FIG. 2 consists of inflected surface forms "leaf", "leave", "leaves", and "left" (i.e., language to be modeled). The upper language consists of the corresponding lexical forms or lemmas, each containing a citation form of the word followed by a part-of-speech tag.

Lexical transducers can be used for analysis or for generation. For example, to find the analyses for the word "leaves", one needs to locate the paths that contain the symbols "l", "e", "v", "e", and "s" as such on the lower side of the arc label. The network in FIG. 2 contains three such paths:

0-1-1-e-2-a-3-v-4-e-5-+NNS:s -6,
0-1-1-e-2-a-3-v-4-e-5-+VBZ:s -6,
0-1-1-e-2-a-3-f:v-8-+NNS:e-9-0:s -6.

The result of the analysis is obtained by concatenating the symbols on the upper side of the paths: "leave+NNS", "leave+VBZ", and "leaf+NNS".

The process of generating a surface form from a lemma, say "leave+VBD", is the same as for analysis except that the input form is matched against the upper side arc labels and the output is produced from the opposite side of the successful path or paths. In the case at hand, there is only one matching path:

0-1-1-e-2-a:f-12-v:t-13-e:0-14-+VBD:0-6

This path maps "leave+VBD" to "left", and vice versa.

The term "apply" is used herein to describe the process of finding the path or paths that match a given input and returning the output. As the example above shows, a transducer can be applied downward or upward. There is no privileged input side. In the implementation described here, transducers are inherently bi-directional.

Lexical transducers provide a very efficient method for morphological analysis and generation. A comprehensive analyzer for a language such as English, French, or German contains tens of thousands of states and hundreds of thousands of arcs, but it can be compressed to a relatively small size in the range of approximately 500 KB to 2 MB.

A relation may contain an infinite number of ordered pairs. One example of such a relation is the mapping from all lowercase strings to the corresponding uppercase strings. This relation contains an infinite number of pairs such as <"abc", "ABC">, <"xyzzy", "XYZZY">, and so on. FIG. 3 sketches the corresponding lower/upper case transducer. The path that relates "xyzzy" to "XYZZY" cycles many times through the single state of the transducer. FIG. 4 shows that path in linearized form.

The lower/upper case relation may be thought of as the representation of a simple orthographic rule. In fact, all kinds of string-changing rules may be viewed in this way, that is, as infinite string-to-string relations. The networks that represent phonological rewrite rules, two-level rules, or the GEN relation in Optimality Theory are of course in general more complex than the simple transducer illustrated in FIG. 3.

FIG. 4 may also be interpreted in another way, that is, as representing the application of the upper/lower case rule to the string "xyzzy". In fact, rule application is formally a composition of two relations; in this case, the identity relation on the string "xyzzy" and the upper/lower case relation in FIG. 3.

A composition is an operation on two relations. If one relation contains the pair <x, y> and the other relation contains the pair <y,z>, the relation resulting from composing the two will contain the pair <x,z>. Composition brings together the "outside" components of the two pairs and eliminates the common one in the middle. For example, the composition of {<"leave+VBD", "left"<} with the lower/upper case relation yields the relation {<"leave+VBD", "LEFT">}.

It is useful to have a general idea of how composition is carried out when string-to-string relations are represented by finite-state networks. Composition is advantageously thought of as a two-step procedure. First, the paths of the two networks that have a matching string in the middle are lined up and merged, as shown in FIG. 5. For the sake of perspicuity, the upper and lower symbols are shown explicitly on different sides of the arc except that zero (i.e., epsilon) is represented by a blank. The string "left" is then eliminated in the middle, yielding the transducer in FIG. 6 that directly maps "leave+VBD" to "LEFT".

Once rule application is thought of as composition, it immediately can be seen that a rule can be applied to several words, or even infinitely many words at the same time if the words are represented by a finite-state network. Lexical transducers are typically created by composing a set of transducers for orthographic rules with a transducer encoding the source lexicon. Two rule transducers can also be composed with one another to yield a single transducer that gives the same result as the successive application of the original rules. This is a well-known fundamental insight in computational phonology.

The formal properties of finite-state automata are considered briefly below. All the networks presented in this background have the three important properties defined Table 1.

TABLE 1

| | |
|---|---|
| Epsilon-free | There are no arcs labeled with the epsilon (ε) symbol alone. |
| Deterministic | No state has more than one outgoing arc with the same label. |
| Minimal | There is no other network with exactly the same paths that has fewer states. |

If a network encodes a regular language and if it is epsilon-free, deterministic and minimal, the network is guaranteed to be the best encoding for that language in the sense that any other network for the same language has the same number of states and arcs and differs only with respect to the order of the arcs, which generally is irrelevant.

The situation is more complex in the case of regular relations. Even if a transducer is epsilon-free, deterministic, and minimal in the sense of Table 1, there may still be another network with fewer states and arcs for the same relation. If the network has arcs labeled with a symbol pair that contains an epsilon on one side, these one-sided epsilons could be distributed differently, or perhaps even eliminated, and this might reduce the size of the network. For example, the two networks in FIGS. 7 and 8 encode the same relation, {<"aa", "a">, <"ab", "ab">}. They are both deterministic and minimal but one is smaller than the other due to a more optimal placement of the one-sided epsilon transition. In the general case there is no way to determine whether a given transducer is the best encoding for an arbitrary relation.

For transducers, the intuitive notion of determinism makes sense only with respect to a given direction of application. But there are still two ways to think about determinism, as shown in Table 2.

TABLE 2

| | |
|---|---|
| Functional | For any input there is at most one output. |
| Sequential | No state has more than one arc with the same symbol on the input side. |

Although the transducers in FIGS. 7 and 8 are functional (i.e., unambiguous) in both directions, the one in FIG. 7 is not sequential in either direction. When it is applied downward, to the string "aa", there are two paths that have to be pursued initially, even though only one will succeed. The same is true in the other direction as well. In other words, there is local ambiguity at the start state because "a" may have to be deleted or retained. In this case, the ambiguity is resolved by the next input symbol one step later.

If the relation itself is unambiguous in the relevant direction and if all the ambiguities in the transducer resolve themselves within some fixed number of steps, the transducer is called sequentiable. That is, an equivalent sequential transducer in the same direction can be constructed. FIG. 9 shows the downward sequentialized version of the transducer in FIG. 7.

The sequentialization process combines the locally ambiguous paths into a single path that does not produce any output until the ambiguity has been resolved. In the case at hand, the ambiguous path contains just one arc. When a "b" is seen, the delayed "a" is produced as output and then the "b" itself in a one-sided epsilon transition. Otherwise, an "a" must follow, and in this case there is no delayed output. In effect, the local ambiguity is resolved with one symbol lookahead.

The network in FIG. 9 is sequential but only in the downward direction. Upward sequentialization produces the network shown in FIG. 8, which clearly is the best encoding for this simple relation.

Even if a transducer is functional, it may well be unsequentiable if the resolution of a local ambiguity requires an unbounded amount of lookahead. For example, the simple transducer illustrated in FIG. 10 cannot be sequentialized in either direction.

This transducer reduces any sequence of "a"s that is preceded by a "b" to an epsilon or copies it to the output unchanged depending on whether the sequence of as is followed by a "c". A sequential transducer would have to delay the decision until it reached the end of an arbitrarily long sequence of "a"s. It is clearly impossible for any finite-state device to accumulate an unbounded amount of delayed output.

However, in such cases it is always possible to split the functional but unsequentiable transducer into a bimachine, as will be described in further detail below. A bimachine for an unambiguous relation consists of two sequential transducers that are applied in a sequence. The first half of the bimachine processes the input from left-to-right; the second half of the bimachine processes the output of the first half from right-to-left. Although the application of a bimachine requires two passes, a bimachine is in general more efficient to apply than the original transducer because the two components of the bimachine are both sequential. There is no local ambiguity in either the left-to-right or the right-to-left half of the bimachine if the original transducer is unambiguous in the given direction of application. FIGS. 11 and 12 together show a bimachine derived from the transducer in FIG. 10.

The left-to-right half of the bimachine (FIG. 11) is only concerned about the left context of the replacement. A string of "a"s that is preceded by "b" is mapped to a string of "a1"s, an auxiliary symbol (or diacritic) to indicate that the left context has been matched. The right-to-left half of the bimachine (FIG. 12) maps each instance of the auxiliary symbol "a1" either to "a" or to an epsilon depending on whether it is preceded by "c" when the intermediate output is processed from right-to-left.

The bimachine in FIGS. 11 and 12 encodes exactly the same relation as the transducer in FIG. 10. The composition of the left-to-right half (FIG. 11) of the bimachine with the reverse of the right-to-left half (FIG. 12) yields the original single transducer (FIG. 10).

SUMMARY OF THE INVENTION

It is an object of the invention to provide an improved method and apparatus for preparing a functional finite-state transducer (FST) with an epsilon or empty string on the input side for factorization into a bimachine.

In accordance with the invention, there is provided a method, and apparatus therefor, for aligning ambiguity in an input finite-state transducer (FST) having an input side. Initially, a left-deterministic input finite-state automation (FSA) is created that has a plurality of arcs by extracting the input side and determinizing the input side from left to right. Subsequently, each arc in the left-deterministic FSA is identified, and for each such arc at least one corresponding sub-path in the input FST is identified, and aligned with at least one other corresponding sub-path by prepending arcs with symbols representative of an empty string.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

Figure 1:
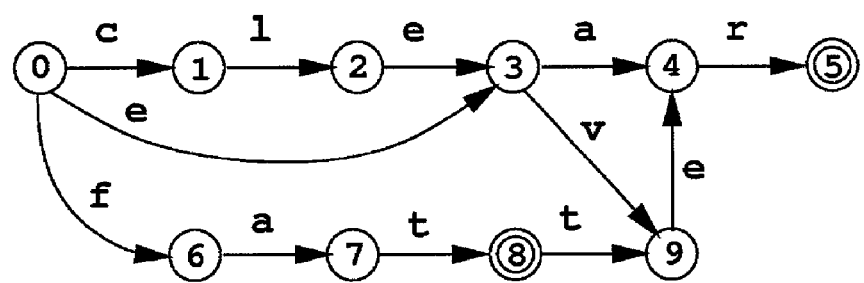
FIG. 1 illustrates an example of a simple finite state automation.
Figure 2:
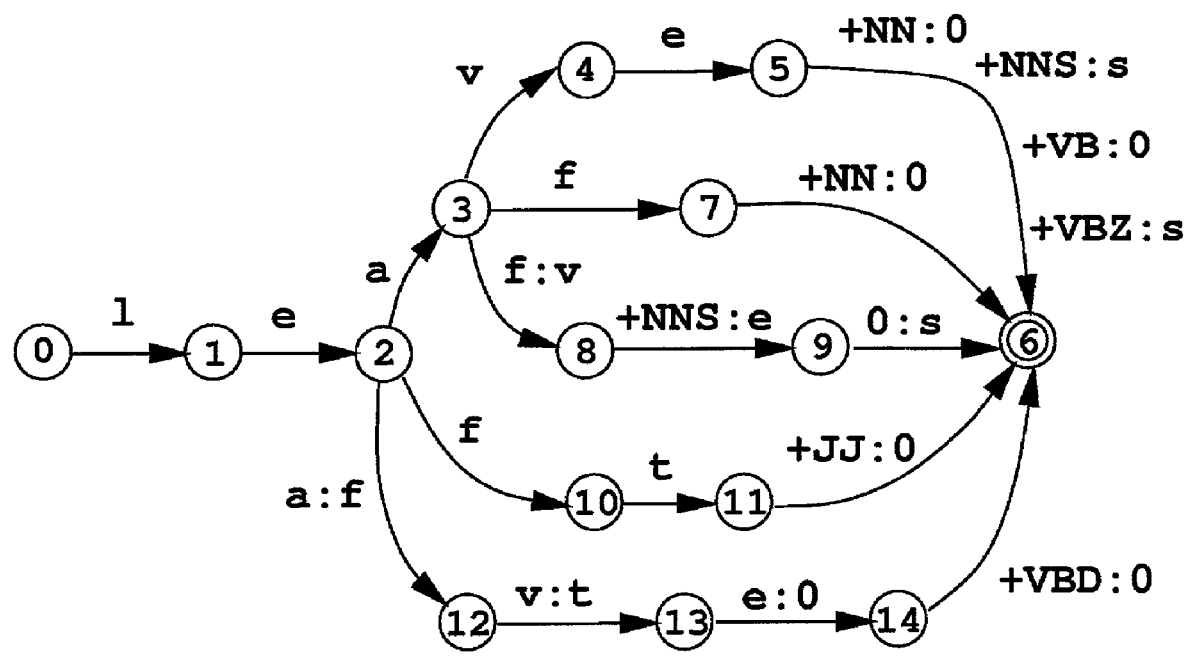
FIG. 2 illustrates an example of a lexical transducer.
Figure 3:
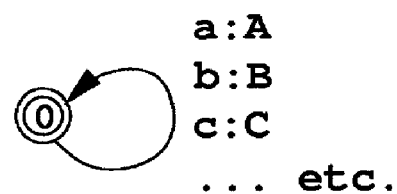
FIG. 3 illustrates an example of a lower/upper case transducer.
Figure 4:
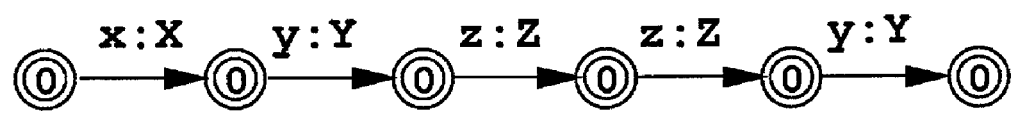
FIG. 4 illustrates an example of a path in a lower/upper case transducer.
Figure 5:
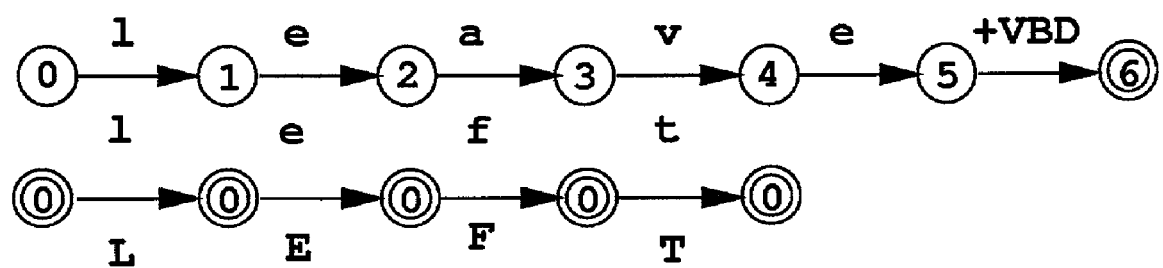
FIG. 5 illustrates an example of merging two paths.
Figure 6:
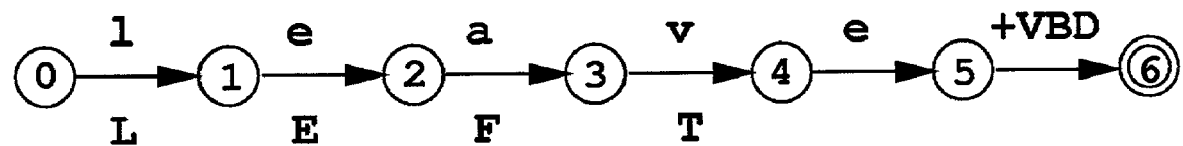
FIG. 6 illustrates the result of composing the networks shown in FIG. 5.
Figure 7:
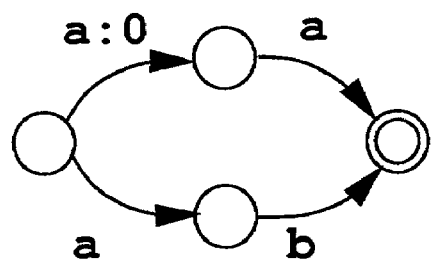
FIG. 7 illustrates a transducer that encodes the relation [a:0a|a b]
Figure 8:
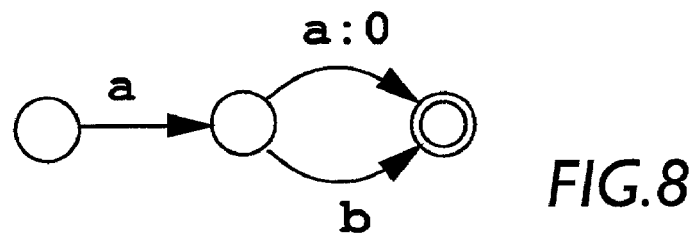
FIG. 8 illustrates a transducer that encodes the relation [a[a:0|b]]
Figure 9:
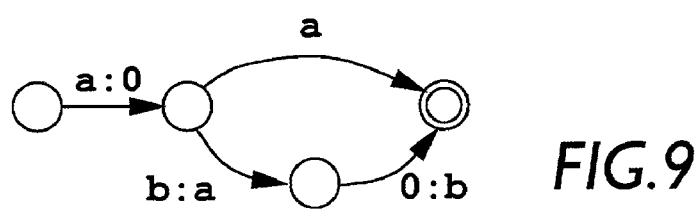
FIG. 9 illustrates a transducer that encodes the relation [a:0[a|b:a0:b]]
Figure 10:
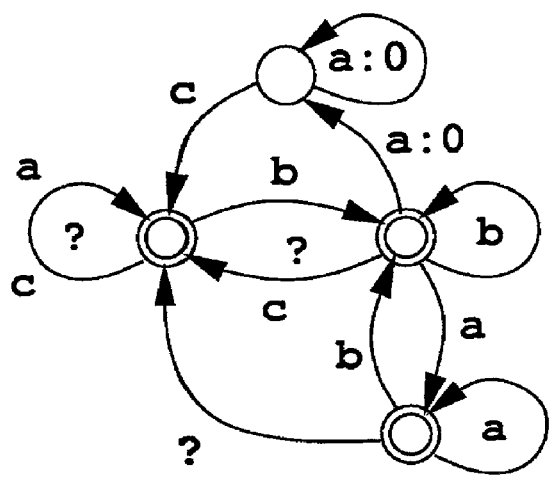
FIG. 10 illustrates a transducer that encodes the relation [a+@->0||b_c]
Figure 11:
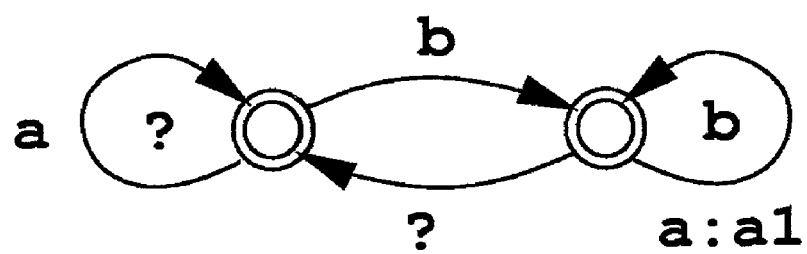
FIGS. 11 and 12 together illustrate a bimachine derived from the transducer shown in FIG. 10.
Figure 12:
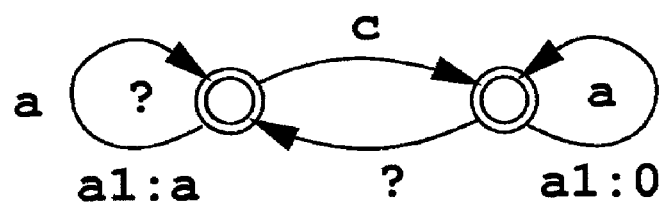

This disclosure is organized as follows. Some of the principal terms and conventions used in this description are set forth below. Following that, a simplified overview of the factorization processes (i.e., methods detaining processing instructions or operations) is presented in the context of other finite-state operations. Finally, the factorization processes are described in more detail, using more complex examples with more features that are relevant for factorization.

A. Terminology

Set forth below are definitions of some of the principal terms used in this specification. Other terms are explained at their first occurrence.

An input prefix of a state q of an FST (Finite State Transducer) or transducer is the part of an input string on a particular path that ranges from the initial state to the state q. An input prefix would be an accepted input string if q were a final state.

An input suffix of a state q of an FST is the part of an input string on a particular path that ranges from the state q to a final state. An input suffix would be an accepted input string if q were an initial state.

The input prefix set of a state q of an FST is the set of all input prefixes of q. The input prefix set of an arc a is the input prefix set of its source state.

The suffix set of a state q of an FST is the set of all input suffixes of q. The input suffix set of an arc a is the input suffix set of its destination state.

An ambiguity field is a maximal set of alternative sub-paths that all accept the same sub-string in the same position of the same input string.

Ambiguity is a relation that maps an input string to more than one output strings, or alternatively, a set of arc sequences in an FST that encodes such a relation. Finite ambiguity maps an input string to a finite number of output strings; infinite ambiguity maps an input string to an infinite number of output strings. An FST is ambiguous if it contains at least one ambiguity of either type. It is finitely ambiguous if it contains only finite ambiguity, and infinitely ambiguous otherwise.

A diacritic is a special symbol. It is usually distinct from the input and output symbols of an unfactored FST, and serves a particular purpose as a placeholder typically in an intermediate processing step.

The unknown symbol (or any symbol), represented by "?", denotes any symbol in the known alphabet and any unknown symbol. In a finite-state graph, it only denotes any unknown symbol.

B. Conventions

The conventions below are followed in this disclosure.

In finite-state graphs: Every FST has one initial state, labeled with number 0, and one or more final states marked by double circles. The initial state can also be final. All other state numbers and all arc numbers have no meaning for the FST but are just used to reference a state or an arc from within the text. An arc with n labels designates a set of n arcs with one label each that all have the same source and destination. In a symbol pair occurring as an arc label, the first symbol is the input and the second the output symbol. For example, in the symbol pair "a:b", "a" is the input and "b" the output symbol. Simple (i.e. unpaired) symbols occurring as an arc label represent identity pairs. For example, "a" means "a:a".

Use of brackets: Curly brackets ("{ }") include a set of objects of the same type, e.g., {100, 102, 106} denotes a set of arcs that are referred to by their numbers. Ceiling brackets ("⌈ ⌉") include an ordered set of arcs that constitute a path or subpaths through an FST, e.g., ⌈100, 101, 102, 103⌉ is a path consisting of the four named arcs. Angle brackets ("< >") include an n-tuple of objects of possibly different types, e.g., <$q^s$, $q^d$, $\sigma^{in}$, $\sigma^{out}$> denotes a quadruple of two states and two symbols.

C. Factoring Ambiguous Finite State Transducers

This initial Section C of the specification, which refers to FIGS. 13-29, describes a method for factoring an ambiguous transducer into two transducers. The first of them is functional, i.e., unambiguous. The second retains the ambiguity of the original transducer but is fail-safe when applied to the output of the first one, i.e., the application of the second transducer to an input string never leads to a state that does not provide a transition for the next symbol in the input. That is, the second factor has no failing paths. Subsequently, the functional transducer can be factored into a left-sequential and a right-sequential transducer that jointly represent a bimachine. The proposed factorization allows faster processing of input strings because no failing paths need to be followed. It also allows the functional and the ambiguous part of a transducer to be manipulated separately, which can be useful with parsers or part-of-speech taggers.

C.1 Summary Of Factoring Ambiguous Finite State Transducers

An ambiguous finite-state transducer ("FST") is an object that accepts a set of possible input strings, and for every accepted input string, outputs one or more output strings by following different alternative paths from an initial state to a final state. In addition, there may be a number of other paths that are followed from the initial state up to a certain point where they fail. Following these latter failing paths is necessary (up until the point they fail) to determine whether they can be successful, but that represents an inefficiency (loss of time).

A method is proposed herein for factoring an ambiguous FST with failing paths into two factors which are Finite State Transducers (FSTs). Factor 1 is functional (i.e. unambiguous) but still has failing paths, while factor 2 retains the ambiguity of the original FST but is fail-safe when applied to the output of factor 1. The application of factor 2 never leads to a state that does not provide a transition for the next input symbol, i.e., factor 2 has no failing paths.

Subsequently, factor 1 can in turn be factorized into a left-sequential and a right-sequential FST that jointly represent a bimachine. See Marcel Paul Schützenberger, "A remark on finite transducers," *Information and Control*, 4:185–187 (1961) and Emmanuel Roche and Yves Schabes, eds., *Finite-State Language Processing*, MIT Press (Cambridge, Mass., U.S.A 1997), 1–66. As used herein, the terms "left-sequential," "left-deterministic," "right-deterministic," and the like are shorthand terms intended to mean "left-to-right-sequential," "left-to-right-deterministic," and "right-to-left-deterministic," respectively, as would be known to a practitioner of ordinary skill in the art. These two sequential FSTs plus factor 2 of the first factorization together represent a trimachine. Any input string is processed by this trimachine, first deterministically from left to right, then deterministically from right to left, and finally ambiguously but without failing paths from left to right. Alternatively, the trimachine can be converted into a modified bimachine by composing the right-sequential with the ambiguous FST. The FST that results from this composition is ambiguous but without failing paths. Any input string is processed by the modified bimachine, first deterministically from left to right and then ambiguously but without failing paths from right to left.

The proposed factorization offers the following advantages: First, with a trimachine or a modified bimachine input strings can be processed faster than with an ordinary FST because no time is spent on failing paths. Second, the functional and the ambiguous part of an FST can be studied and manipulated separately which can be useful with FSTs representing rule systems that generate ambiguous results such as parsers or part-of-speech taggers.

Although FSTs are inherently bi-directional, they are often intended to be used in a given direction. The proposed factorization is performed with respect to the direction of application. The two sides (or tapes or levels) of an FST are referred to herein as input side and output side.

C.2 Overview Of Factoring Ambiguous Finite State Transducers

This section gives a simplified overview of the factorization process that is explained in more detail at a later stage, and situates it in a context of other finite-state operations. A simple example is used.

As mentioned above, an ambiguous FST returns for every accepted input string one or more output strings by following different alternative paths from the initial state to a final state. In addition there may be a number of other paths that are followed from the initial state up to a certain point where they fail. For example, the FST in FIG. 13 has for the input string "cabca" two successful paths formed by the ordered arc sets ⌈101, 104, 108, 112, 115⌉ and ⌈101, 104, 109, 113, 115⌉ respectively, and three failing paths formed by the ordered arc sets ⌈100, 102, 105⌉, ⌈101, 102, 106⌉, and ⌈100, 103, 107⌉, respectively.

Even for input strings that are not accepted there may be more than one failing path. Following all of them is necessary but represents an inefficiency (loss of time). For example, the input string "caba" is not accepted but requires following five failing paths, namely ⌈100, 102, 105⌉, ⌈100, 102, 106⌉, ⌈100, 103, 107⌉, ⌈101, 104, 108⌉, and ⌈101, 104, 109⌉.

The factorization process set forth herein builds two FSTs, a first factor and a second factor, from an ambiguous FST such that in the first factor, a set of alternative arcs is collapsed into one arc that is labeled with a diacritic on the output side, and in the second factor, this diacritic is mapped to a set of alternative output symbols.

Figure 13:
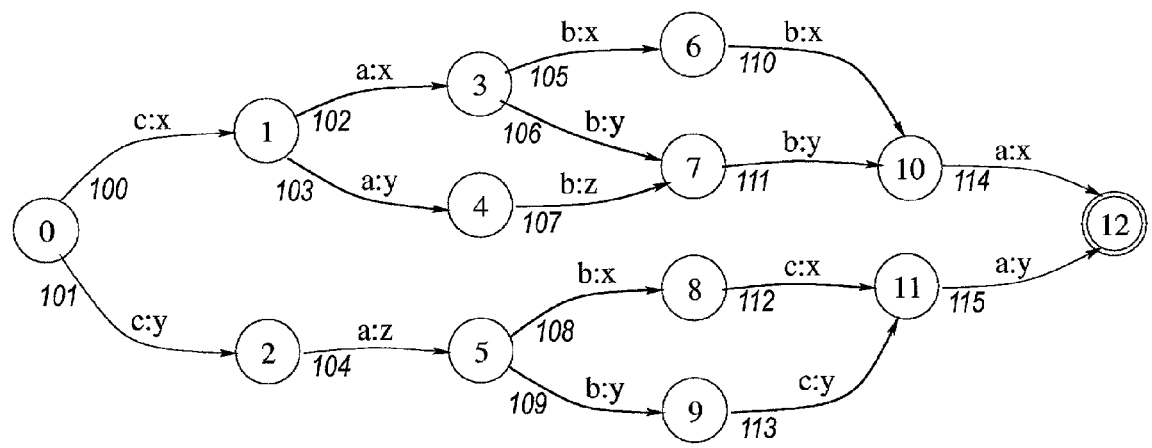
FIG. 13 illustrates an example of an ambiguous FST having arcs 100–115 and states 0–12.

The FST in FIG. 13 contains two ambiguity fields. The first ambiguity field spans from state 1 to state 10, and maps the substring "abb" of the input string "cabba" to the set of alternative output substrings {xxx, xyy, yzy}. In the first factor, this ambiguity field is collapsed into a single subpath ranging from state 1 to state 7 shown in FIG. 14, that maps the substring "abb" to the intermediate substring "$\psi_0$bb". Factor 2 maps this intermediate substring to the set of alternative output substrings {xxx, xyy, yzy} by following the alternative subpaths ⌈302, 305, 307⌉, ⌈302, 304, 306⌉, and ⌈301, 303, 306⌉ respectively, as shown in FIG. 15. The second ambiguity field shown in FIG. 13 spans from state 5 to state 11, and maps the substring "bc" of the input string "cabca" to the set of alternative output substrings {xx, yy}. In the first factor, this ambiguity field is collapsed into a single subpath ranging from state 4 to state 8 shown in FIG. 14, that maps the substring "bc" to the intermediate substring "$\psi_1$c". The second factor maps this intermediate substring to the set of alternative output substrings {xx, yy} by following the alternative subpaths ⌈308, 310⌉ and ⌈309, 311⌉ respectively, as shown in FIG. 15. Note that in the first factor a diacritic is only used on the first arc of an ambiguity field, and that the other arcs of an ambiguity field simply accept an input symbol without modifying it.

Figure 14:
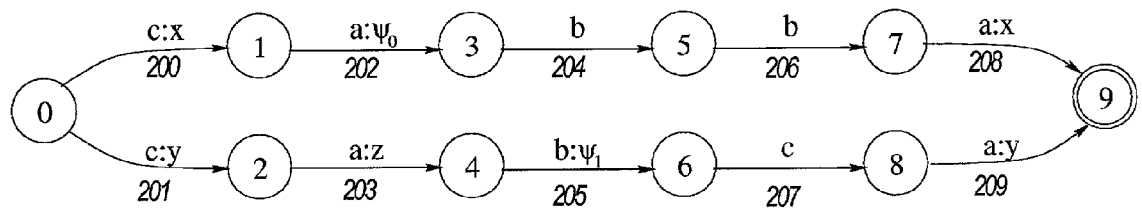
FIG. 14 illustrates a first factor of the FST shown in FIG. 13 or unambiguous FST, having arcs 200–209 and states 0–9.
Figure 15:
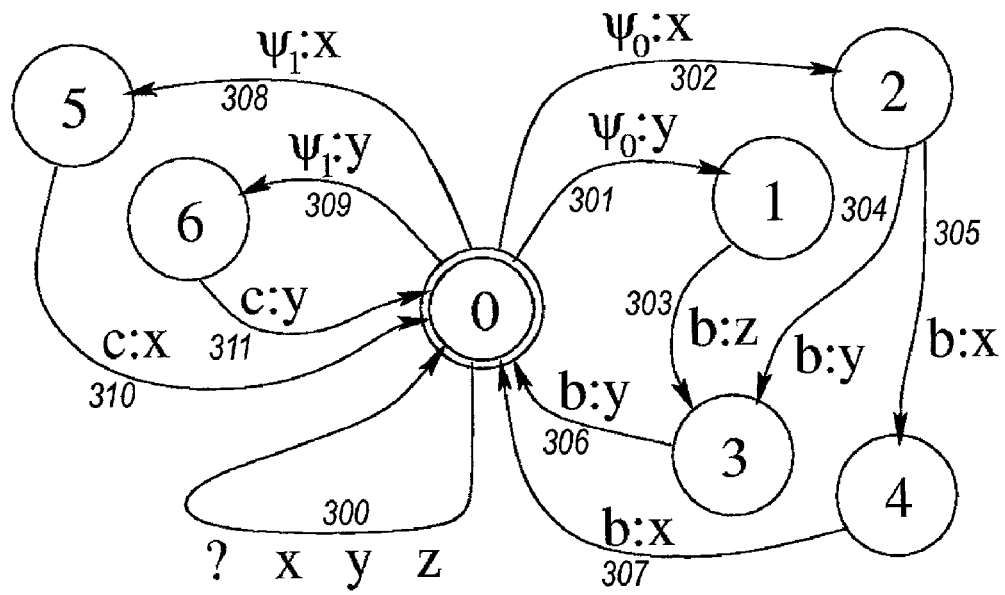
FIG. 15 illustrates a second factor of the FST shown in FIG. 13 or fail-safe FST, having arcs 300–311 and states 0–6, which forms part of a trimachine that includes the FSTs (Finites State Transducers) in FIGS. 15–17.

All substrings that are accepted outside an ambiguity field are mapped by the first factor to their final output (FIG. 14). This output is then accepted by the second factor without any further modification, by means of a loop on the initial state. In the above example this loop consists of the arc 300 that is actually a set of four looping arcs with one symbol each (FIG. 15).

The first factor is functional (i.e. unambiguous) but not sequential, i.e., even for accepted input strings it can contain failing paths (FIG. 14). For the input string "cabca" it has one successful path formed by the ordered arc set ⌈201, 203, 205, 207, 209⌉, and one failing path formed by the ordered arc set ⌈200, 202, 204⌉. The second factor is ambiguous (it retains the ambiguity of the original FST) but it is fail-safe for all strings in the output language of the first factor, i.e., an arc is never traversed in vain (FIG. 15).

Figure 16:
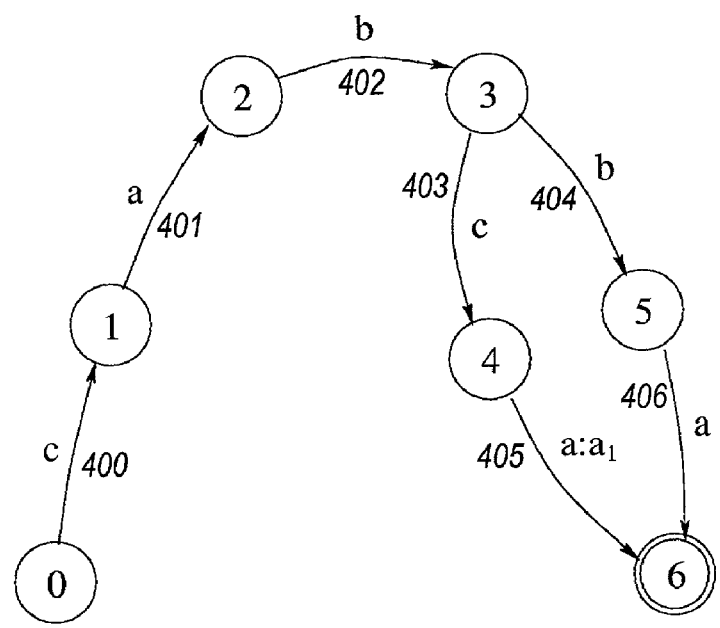
FIG. 16 illustrates a left-sequential FST with arcs 400–406 and states 0–6, which forms part of a trimachine that includes the FSTs in FIGS. 15–17 and a modified bimachine that includes the FSTs in FIGS. 16 and 18.
Figure 17:
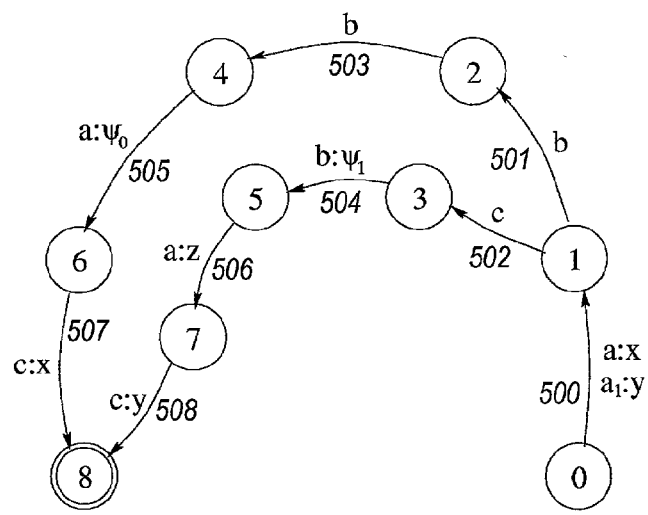
FIG. 17 illustrates a right-sequential FST with arcs 500–508 and states 0–8, which forms part of a trimachine that includes the FSTs in FIGS. 15–17.

Since the first factor is functional (FIG. 14), it can be factored into a left-sequential FST (FIG. 16) and a right-sequential FST (FIG. 17) that jointly represent a bimachine. See Schützenberger (1961) and Roche and Schabes (1997), cited above. These two sequential FSTs plus the second factor of the first factorization (described above) together represent a trimachine. The trimachine obtained from the above example is shown in FIGS. 16–17 and 15. When the trimachine is applied to an input string, its left-sequential FST maps the input string "cabca" deterministically from left to right (LR) to the intermediate string "cabcα₁" (FIG. 16). Then, the right-sequential FST maps this string deterministically from right to left (RL) to another intermediate string "yzψ₁cy" (FIG. 17). Finally, the ambiguous FST (the original second factor) maps that string from left to right (LR) to the set of alternative output strings {yzxxy, yzyyy} (FIG. 15). Note that the first two FSTs of a trimachine are sequential, and that the last two FSTs are fail-safe for their respective input. Input strings that are not accepted, fail in the first (left-sequential) FST on one single path, and require no further attention.

Figure 18:
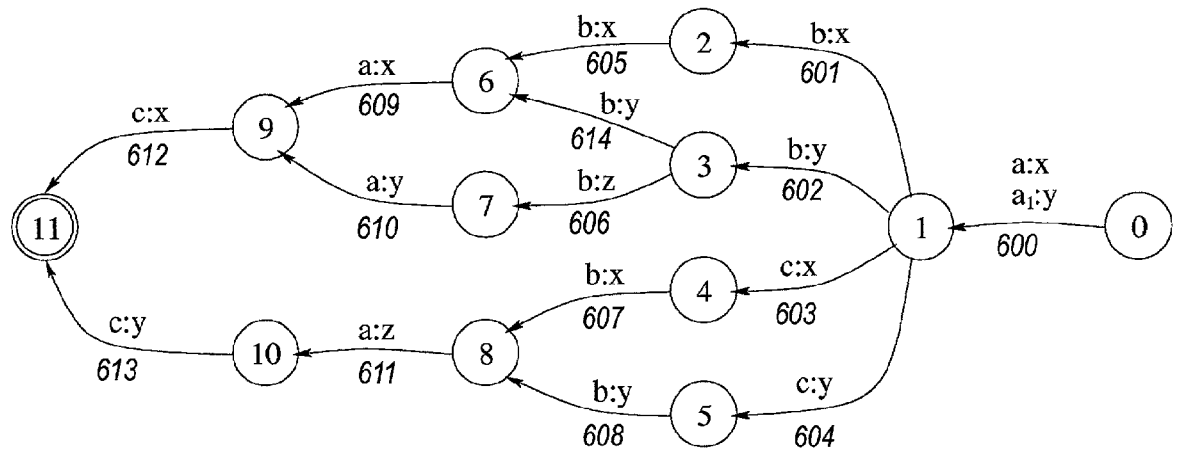
FIG. 18 illustrates an ambiguous right-to-left FST with arcs 600–614 and states 0–11 that is fail-safe for the output of the left-sequential FST shown in FIG. 16.

Finally, the trimachine (FIGS. 16–17 and 15) can be converted into a modified bimachine (FIGS. 16 and 18) by composing the right-sequential FST with a right-to-left form of the ambiguous FST (FIGS. 17 and 15). Although it is possible in the current example, it is not always possible to reverse the ambiguous FST because this may create failing paths. In general, the original FST must be first reversed and then factored (FIG. 13). The reversed first factor can then be reversed back and factorized into a bimachine. The reversed second factor can be composed with the right-sequential FST of this bimachine. The left-sequential FST of the modified bimachine maps the input string "cabca" deterministically from left to right, to the intermediate string "cabcα₁" (FIG. 16). The ambiguous FST maps this string from right to left to the set of alternative output strings {yzxxy, yzyyy} (FIG. 18). Note that the first FST of a modified bimachine is sequential, and that the second FST is fail-safe for the output of the first one. Input strings that are not accepted, fail in the first (left-sequential) FST on one single path, and require no further attention.

Figure 19:
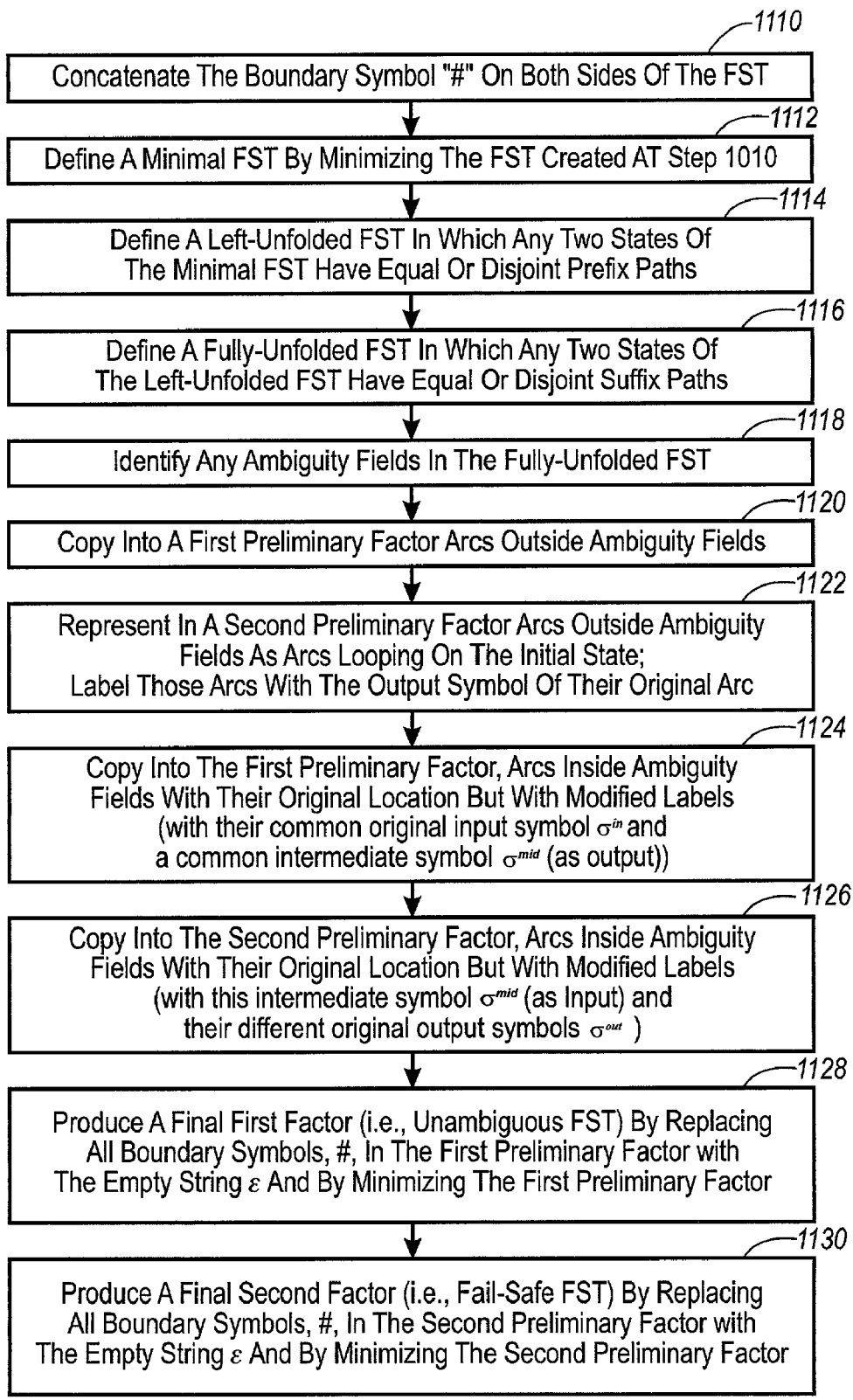
FIG. 19 is a flow diagram that sets forth the steps for factorizing ambiguous FSTs.

The following Sections C.3–C.5 explain the factorization of ambiguous FSTs in more detail, and refer to a flow chart set forth in FIG. 19 and finite state transducers and automata in FIGS. 20–29. These sections use a more complex example than the previous section to show more features of an FST that are relevant for factorization.

C.3 Starting Point Of Factorization

Figure 20:
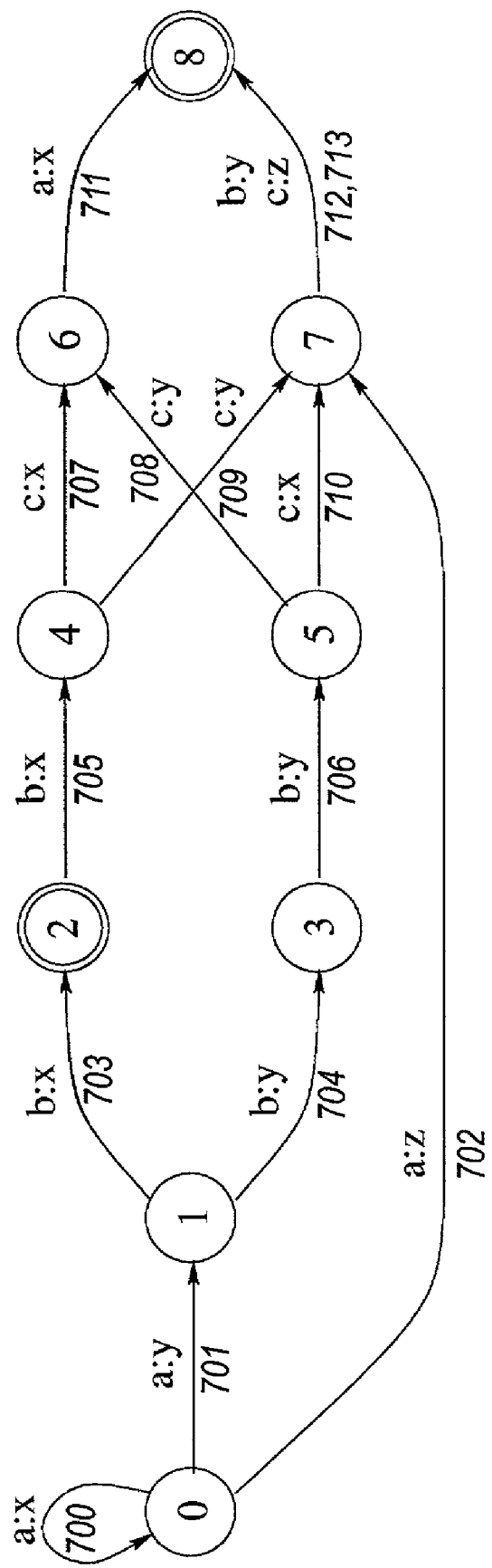
FIG. 20 illustrates an ambiguous FST with arcs 700–713 and states 0–8.

The factorization of the ambiguous FST in FIG. 20 requires identifying maximal sets of alternative arcs that must be collapsed in the first factor and unfolded again in the second factor. Two arcs are alternative with respect to each other if they are situated at the same position on two alternative paths that accept the same input string. This means the two arcs must have (a) the same input symbol and (b) identical sets of input prefixes and input suffixes. For example, the two arcs 705 and 706 constitute such a maximal set of alternative arcs (FIG. 20). The two arcs both accept the input symbol "b" and have the input prefix set {a″ab} and the input suffix set {ca, cb, cc}. Two arcs are not alternative and must not be collapsed if they accept different input symbols, or if they have no prefixes or no suffixes in common.

In general, an FST can contain arcs where neither of these two premises (i.e., neither equivalent nor disjoint prefixes and suffixes) is true. In the above example this concerns the two arcs 703 and 704 (FIG. 20). They have identical input symbols "b" and identical input prefix sets {a″a} but their input suffix sets, {ϵ, bca, bcb, bcc } and {bca, bcb, bcc } respectively, are neither equivalent nor disjoint. These two arcs are only partially alternative arcs, and it is not decidable whether to collapse them. To make this question always decidable, the original FST is pre-processed in such a way that the sets of input prefixes and input suffixes of all arcs become either equivalent or disjoint, without altering the relation that is described by the FST.

C.4 Factorization Pre-Processing

Figure 21:
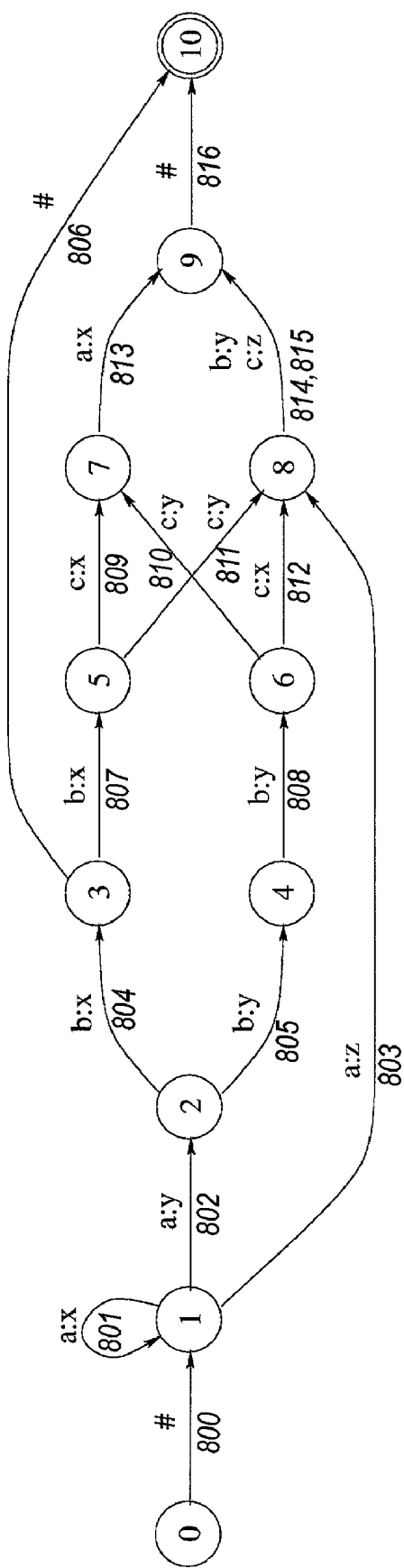
FIG. 21 illustrates a minimal FST with arcs 800–816 and states 0–10 of the FST shown in FIG. 20.

The first steps of the pre-processing consists of concatenating the FST (FIG. 20) on both sides (i.e., the start state and the final state(s)) with boundary symbols, #, (step 1110) and minimizing the result (step 1112). The resulting FST is shown in FIG. 21. This operation causes that the properties of initiality and finality, otherwise carried only by states, to be also carried by arcs making them easier to handle. It also allows creating multiple copies of the former initial state (now state 1) in subsequent operations, which is not possible with the original FST under the convention that an FST has only one initial state (FIG. 20). The resulting FST of the first pre-processing step will be referred to as the minimal FST.

Figure 22:
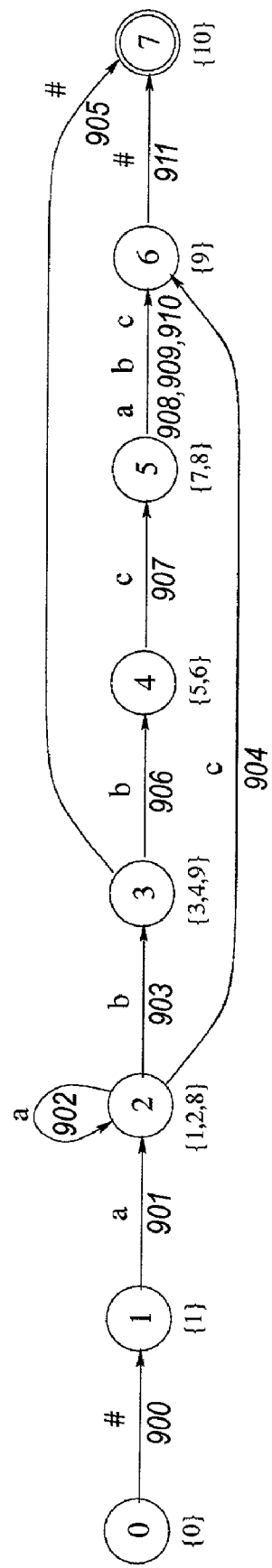
FIG. 22 illustrates a left-deterministic input finite-state automation with arcs 900–911 and states 0–7 built from the minimal FST shown in FIG. 21.
Figure 23:
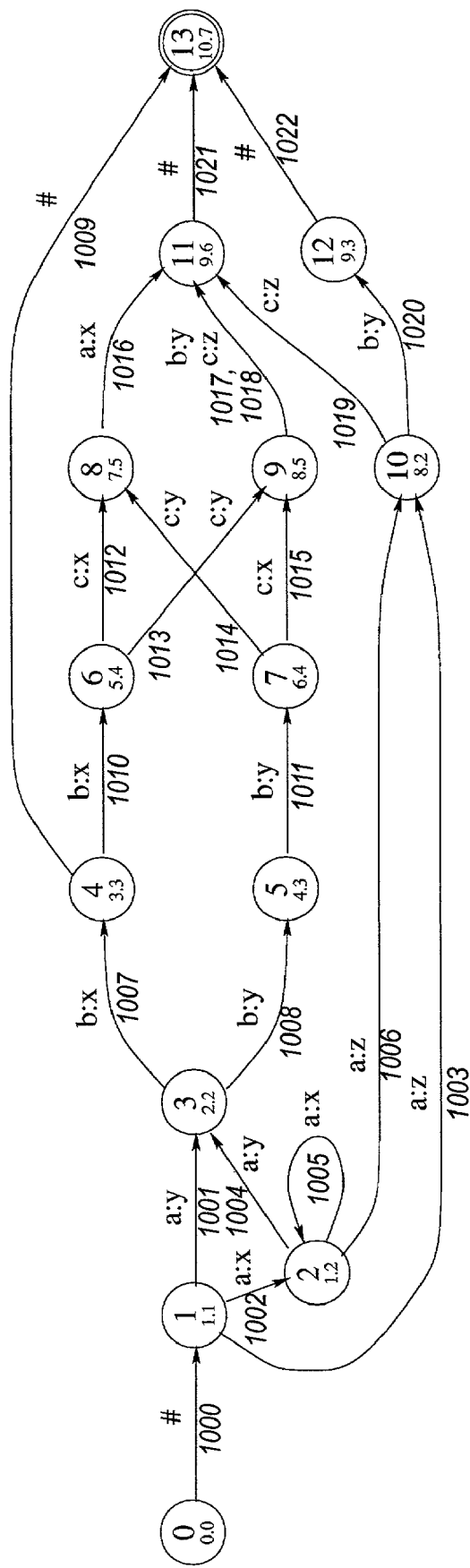
FIG. 23 illustrates a left-unfolded FST with arcs 1000–1022 and states 0–13.

The second step of the pre-processing consists of a left-unfolding of the minimal FST (step 1114), based on its left-deterministic input finite state automaton (input FSA). The input FSA, which is illustrated in FIG. 22, is obtained (step 1114) by extracting the input side from the minimal FST (FIG. 21) and determinizing it from left to right. Every state of the input FSA (FIG. 22) corresponds to a set of states of the minimal FST (FIG. 21), and is assigned a set of state numbers (FIG. 22). Every state of the minimal FST is copied to the (new) left-unfolded FST (FIG. 23) as many times as it occurs in different state sets of the input FSA. The copying of the arcs is described below. For example, state 8 of the minimal FST occurs in the states sets of both state 2 and 5 of the input FSA, and is therefore copied twice to the left-unfolded FST, where the two copies have the state numbers 9 and 10.

Every state q of the left-unfolded FST corresponds to one state $q^m$ of the minimal FST and to one state $q^L$ of the left-deterministic input FSA. The relation between these states can be expressed by:

$$\forall q \in Q, q^m \in Q^m, q^L \in Q^L:$$

$$q^m = m(q)$$

$$q^L = L(q)$$

In the left-unfolded FST of the above example (FIG. 23), every state is labeled with a triple of state numbers <q, $q^m$, $q^L$>. For example, states 9 and 10 are labeled with the triples <9, 8, 5> and <10, 8, 2> respectively which means that they are both copies of state 8 of the minimal FST but correspond to different states of the left-deterministic input FSA, namely to the states 5 and 2 respectively.

Every state q of the left-unfolded FST (FIG. 23) inherits the full set of outgoing arcs of the corresponding state $q^m$ of the minimal FST. Every arc of the left-unfolded FST points to one of the copies of its original destination state, namely to the state q with the appropriate L(q). For example, the set of outgoing arcs {801, 802, 803} of state 1 of the minimal FST is inherited by both state 1 and 2 of the left-unfolded FST where it becomes {1002, 1001, 1003} and {1005, 1004, 1006}. Arc 801 of the minimal FST (FIG. 21) points to state 1 ($q^m$=1), and the corresponding arc 901 of the left-deterministic input FSA (FIG. 22) points to state 2 ($q^L$=2). Therefore, the arcs 1002 and 1005 of the left-unfolded FST, that are copies of the arc 801 of the minimal FST, must both point to the state q with m(q)=1 and L(q)=2, i.e., to state 2.

The left-unfolded FST describes the same relation as the minimal FST.

Figure 24:
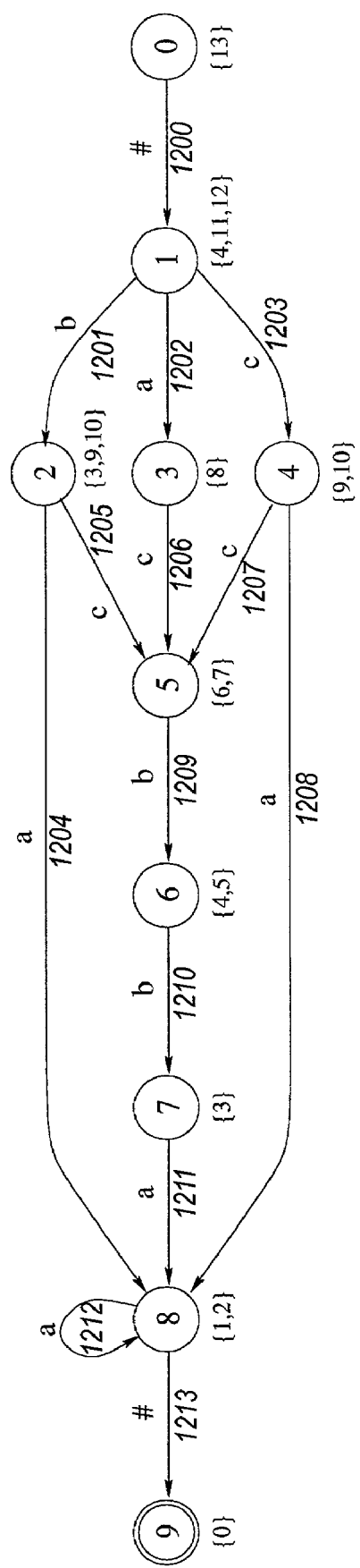
FIG. 24 illustrates a right-deterministic input finite-state automaton with arcs 1200–1213 and states 0–9.
Figure 25:
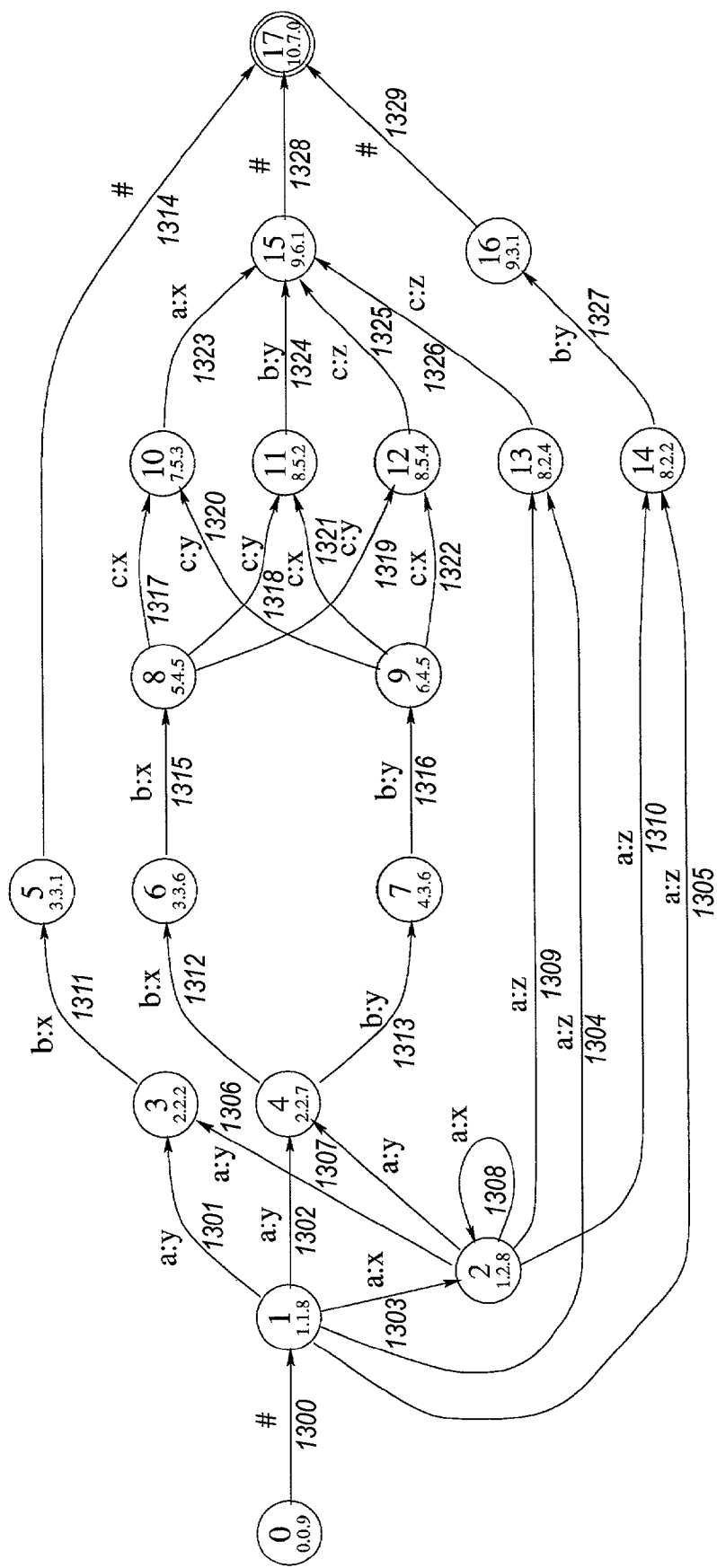
FIG. 25 illustrates a fully (i.e., left and right) unfolded FST with arcs 1300–1329 and states 0–17.

The third step of the pre-processing consists of a right-unfolding of the previously left-unfolded FST (step 1116), based on its right-deterministic input FSA (calculated in step 1115). The right-deterministic input FSA and the right-unfolded FST are illustrated in FIGS. 24 and 25, respectively. This step is performed exactly as the second step, except that the left-unfolded FST is reversed before the operation, and reversed back afterwards. The reversal consists of making the initial state final and the only final state initial, and changing the direction of all arcs, without minimization or determinization that would change the structure of the FST.

Every state q of the fully (i.e. left and right) unfolded FST (FIG. 25) corresponds to one state $q^m$ of the minimal FST (FIG. 21), to one state $q^L$ of the left-deterministic input FSA (FIG. 22), and to one state $q^R$ of the right-deterministic input FSA (FIG. 24). The relation between these states can be expressed by:

$$\forall q \in Q, q^m \in Q^m, q^L \in Q^L, q^R \in Q^R:$$

$$q^m = m(q)$$

$$q^L = L(q)$$

$$q^R = R(q)$$

In the fully unfolded FST of the above example (illustrated in FIG. 25), every state is labeled with a quadruple of state numbers <q, $q^m$, $q^L$, $q^R$>. For example, the states 11, 12, 13, and 14 are labeled with the quadruples <11, 8, 5, 2>, <12, 8, 5, 4>, <13, 8, 2, 4>, and <14, 8, 2, 2> which means that they are all copies of state 8 of the minimal FST ($q^m$=8).

Every state q of the unfolded FST has the same input prefix set as the corresponding state $q^L$ of the left-deterministic input FSA and the same input suffix set as the corresponding state $q^R$ of the right-deterministic input FSA:

$$\forall q \in Q:$$

$$PRE^{in}(q) = PRE^{in}(L(q))$$

$$SUF^{in}(q) = SUF^{in}(R(q))$$

Consequently, two states of the unfolded FST have equal input prefix sets if they correspond to the same state $q^L$, and equal input suffix sets if they correspond to the same state $q^R$:

$$\forall q_i, q_j \subset Q:$$

$$PRE^{in}(q_i) = PRE^{in}(q_j) \Leftrightarrow L(q_i) = L(q_j)$$

$$SUF^{in}(q_i) = SUF^{in}(q_j) \Leftrightarrow R(q_i) = R(q_j)$$

The input prefix and input suffix sets of the states of the unfolded FST are either identical or disjoint. Partial overlaps cannot occur.

Equivalent states of the unfolded FST are different copies of the same state of the minimal FST. This means, two states are equivalent if and only if they correspond to the same state $q^m$ of the minimal FST:

$$q_i \equiv q_j \Leftrightarrow m(q_i) = m(q_j)$$

Every arc a of the fully unfolded FST can be described by a quadruple:

$$\alpha = <s, d, \sigma^{in}, \sigma^{out}> \text{ with } a \in A, s, d \in Q, \sigma^{in} \in \Sigma^{in}, \sigma^{out} \in \Sigma^{out}$$

where s and d are the source and destination state, and $\sigma^{in}$ and $\sigma^{out}$ the input and output symbol of the arc a respectively. For example, the arc 1302 of the fully unfolded FST (FIG. 25) can be described by the quadruple <1, 4, a, y> which means that the arc goes from state 1 to state 4 and maps "a" to "y".

Alternative arcs represent alternative transductions of the same input symbol in the same position of an input string. Two arcs are alternative arcs with respect to each other if and only if they have the same input symbol and equal input prefix and suffix sets. The input prefix set of an arc is the input prefix set of its source state, and the input suffix set of an arc is the input suffix set of its destination state:

$$\alpha_i^{alt} \sim \alpha_j : \Leftrightarrow (\sigma_i^{in} = \sigma_j^{in}) \wedge (PRE^{in}(s_i) = PRE^{in}(s_j)) \wedge (SUF^{in}(d_i) = SUF^{in}(d_j))$$

Equivalent arcs are different copies of the same arc of the minimal FST. Two arcs are equivalent if they have the same input and output symbol, and equivalent source and destination states:

$$\alpha_i \equiv \alpha_j : \Leftrightarrow (\sigma_i^{in} = \sigma_j^{in}) \wedge (\sigma_i^{out} = \sigma_j^{out}) \wedge (s_i \equiv s_j) \wedge (d_i \equiv d_j)$$

Two equivalent arcs are also alternative with respect to each other but not vice versa.

The fully unfolded FST describes the same relation as the minimal FST. The previously undecidable question whether two arcs are alternative to each other and should be collapsed, is decidable for the fully unfolded FST.

C.5 Factors

Figure 26:
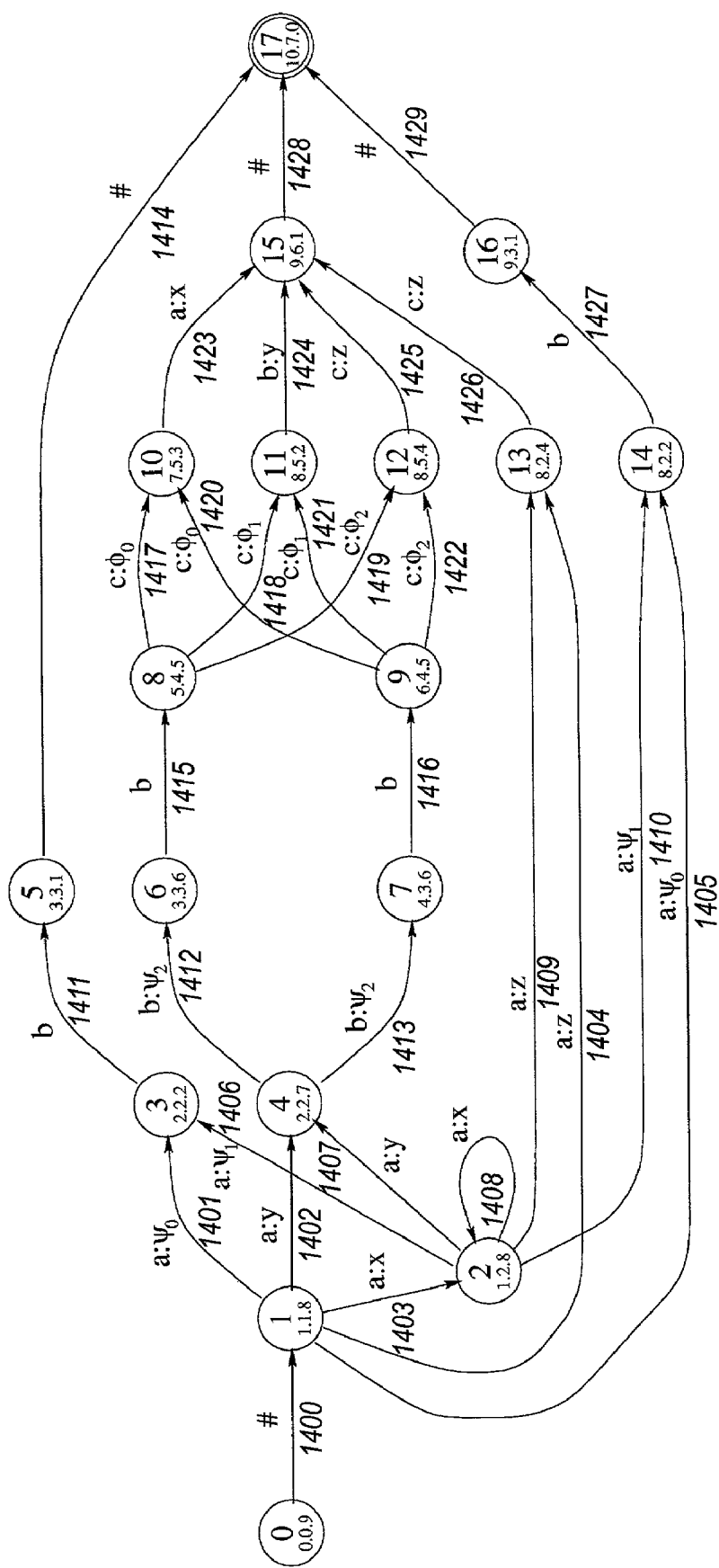
FIG. 26 illustrates a first preliminary factor or non-minimal functional FST with arcs 1400–1429 and states 0–17.
Figure 27:
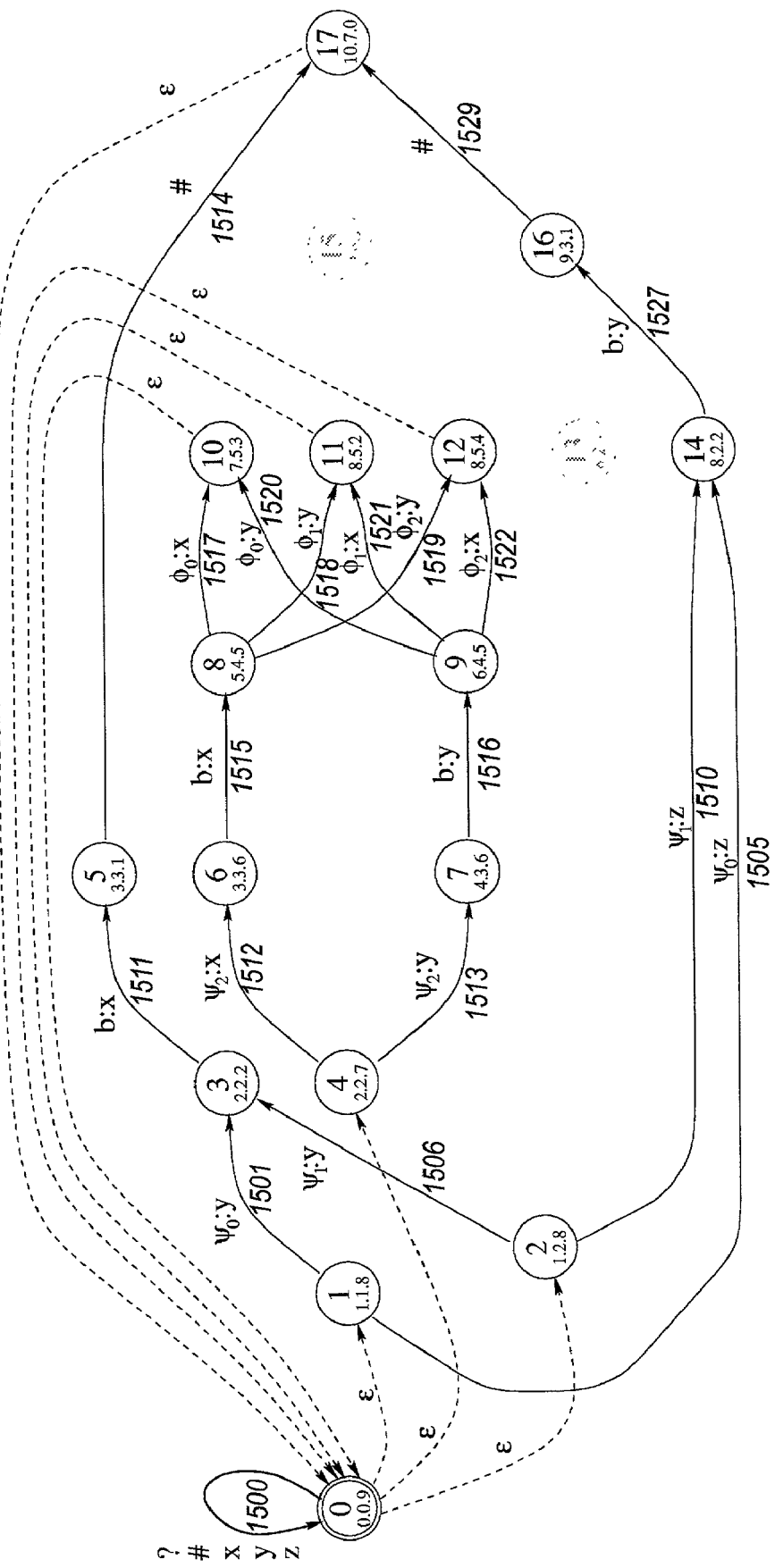
FIG. 27 illustrates a second preliminary factor or non-minimal ambiguous FST with arcs 1500–1529 and states 0–17.

After the pre-processing, preliminary factors can be built as shown in FIGS. 26 and 27. All states of the fully unfolded FST (FIG. 25) are copied to both factors. All arcs of the unfolded FST are grouped to disjoint maximal sets of alternative arcs. For the above unfolded FST shown in FIG. 25, this gives the arc sets {1300}, {1301, 1305}, {1302}, {1303}, {1304}, {1306, 1310}, {1307}, {1308}, {1309}, {1311, 1327}, {1312, 1313}, {1314, 1329}, {1315, 1316}, {1317, 1320}, {1318, 1321}, {1319, 1322}, {1323}, {1324}, {1325}, {1326}, and {1328}.

Arc sets can have different locations with respect to ambiguity fields. Singleton sets (e.g., {1300} or {1302}) and sets where all arcs are equivalent with respect to each other (there is no such example illustrated in FIG. 25) do not contain an ambiguity. These arc sets are outside any ambiguity field. All other arc sets (e.g., {1315, 1316}) contain an ambiguity. They are inside an ambiguity field where three different (possibly co-occurring) locations can be distinguished: an arc set A is at the beginning of an ambiguity field if and only if the source states of all arcs in the set are equivalent (e.g., {1301, 1305} and {1312, 1313}):

$$Begin(A): \Leftrightarrow \forall \alpha_i, \alpha_j \in A : s_i \equiv s_j$$

an arc set A is at the end of an ambiguity field if and only if the destination states of all arcs in the set are equivalent (e.g., {1317, 1320} and {1314, 1329}):

$$End(A): \Leftrightarrow \forall \alpha_i, \alpha_j \in A : d_i \equiv d_j;$$

and an arc set A is at an ambiguity fork, i.e., at a position where two or more ambiguity fields with a common (overlapping) beginning separate from each other, if and only if there is an arc $\alpha_i$ in this set and an arc $\alpha_k$ in another set so that both arcs have the same input symbol, equivalent source states, and disjoint input suffix sets. This means that the corresponding state $q^m = m(s_i) = m(s_k)$ of the minimal FST can be left via either arc, $\alpha_i$ or $\alpha_k$, but one of them is on a failing path, and therefore should not be taken (e.g., {1317, 1320} and {1318, 1321}):

$$Fork(A): \Leftrightarrow \exists \alpha_i \in A, \alpha_k \in A : (\sigma_i^{in} = \sigma_k^{in}) \wedge (s_i \equiv s_k) \wedge (SUF^{in}(d_i) \neq SUF^{in}(d_k)).$$

Every arc of the unfolded FST (FIG. 25) is represented in both factors. Arcs that are outside any ambiguity field (step 1118) are copied to the first preliminary factor (step 1120) as they are (FIG. 26). In the second preliminary factor, they are represented (step 1122) by an arc looping on the initial state and labeled with the output symbol of the original arc (FIG. 27). This means, these functional transductions of symbols are performed by the first factor, and the second factor only accepts the output symbols by means of looping arcs. For example, arc 1302 labeled with "a:y" is copied to the first factor as it is, and a looping arc 1500 labeled with "y" is created in the second factor.

All arcs of an arc set that is inside an ambiguity field (step 1118) are copied to both preliminary factors with their original location (regarding their source and destination) but with modified labels (FIGS. 26–27). They are copied to the first preliminary factor (step 1124) with their common original input symbol $\sigma^{in}$ and a common intermediate symbol $\sigma^{mid}$ (as output), and to the second factor (step 1126) with this intermediate symbol $\sigma^{mid}$ (as input) and their different original output symbols $\sigma^{out}$. This causes the copy of the arc set in the first factor to perform a functional transduction and to collapse into one single arc when the first factor is minimized. The intermediate symbol of an arc set can be a diacritic that is unique within the whole FST, i.e., that is not used for any other arc set.

If there is concern about the size of the factors and their alphabets, diacritics should be used sparingly. In this case, the choice of a common intermediate symbol $\sigma^{mid}$ for a set of alternative arcs depends on the location of the arc set with respect to an ambiguity field, as follows.

At the beginning of an ambiguity field, the common intermediate symbol $\sigma^{mid}$ is a diacritic that must be unique within the whole FST. For example, the arc set {1312, 1313} (FIG. 25) gets the diacritic $\psi_2$, i.e., the arcs change their labels from {b:x, b:y} to {b:$\psi_2$, b:$\psi_2$} in the first factor and to {$\psi_2$:x, $\psi_2$:y} in the second factor. In addition, an arc labeled with the empty string $\epsilon$ is inserted in the second factor from the initial state of the FST to the source state of every arc in the set, which causes the ambiguity field to begin at the initial state after minimization.

At a fork position that does no coincide with the beginning of an ambiguity field, the common intermediate symbol a $\sigma^{mid}$ is a diacritic that needs to be unique only among all arc sets that have the same input symbol and the same input prefix set. This diacritic can be re-used with other forks. For example, the arc set {1317, 1320} gets the diacritic $\Phi_0$, i.e., the arcs change their labels from {c:x, c:y} to {c:$\Phi_0$, c:$\Phi_0$} in the first factor and to {$\Phi_0$:x, $\Phi_0$:y} in the second factor.

In all other positions inside an ambiguity field, the common intermediate symbol $\sigma^{mid}$ equals the common input symbol $\sigma^{in}$ of all arcs in a set. For example, the arc set {1315, 1316} gets the intermediate symbol "b", i.e., the arcs change their labels from {b:x, b:y} to {b, b} in the first factor and keep their labels in the second factor.

At the end of an ambiguity field, one of the above rules for intermediate symbols $\sigma^{mid}$ is applied. In addition, an arc labeled with the empty string $\epsilon$ is inserted in the second factor from the destination state of every arc in the set to the initial state of the FST, which causes the ambiguity field to end at the initial (final) state after minimization.

Figure 28:
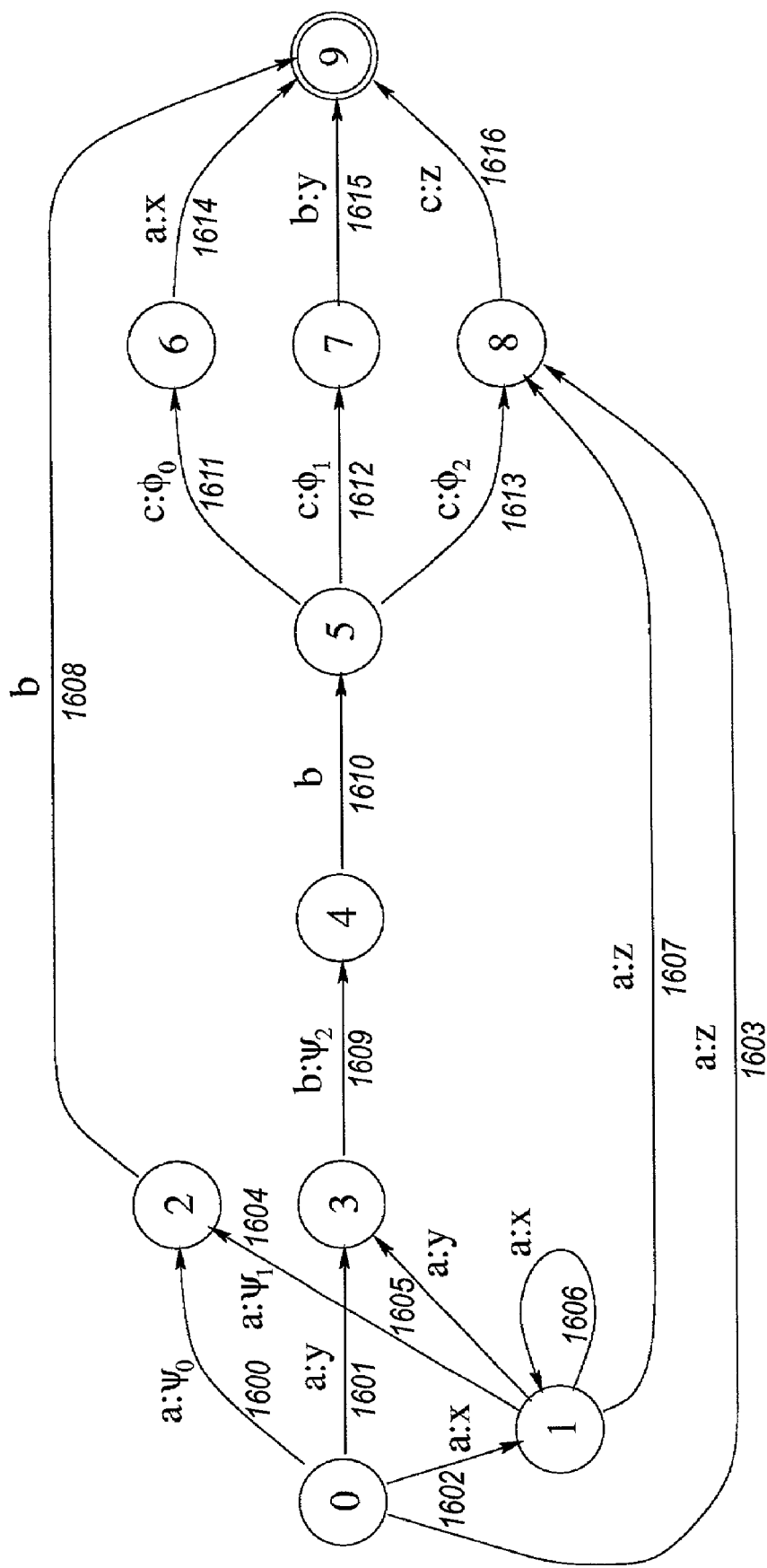
FIG. 28 illustrates a first final factor or minimal functional FST (i.e., unambiguous FST) with arcs 1600–1616 and states 0–9.
Figure 29:
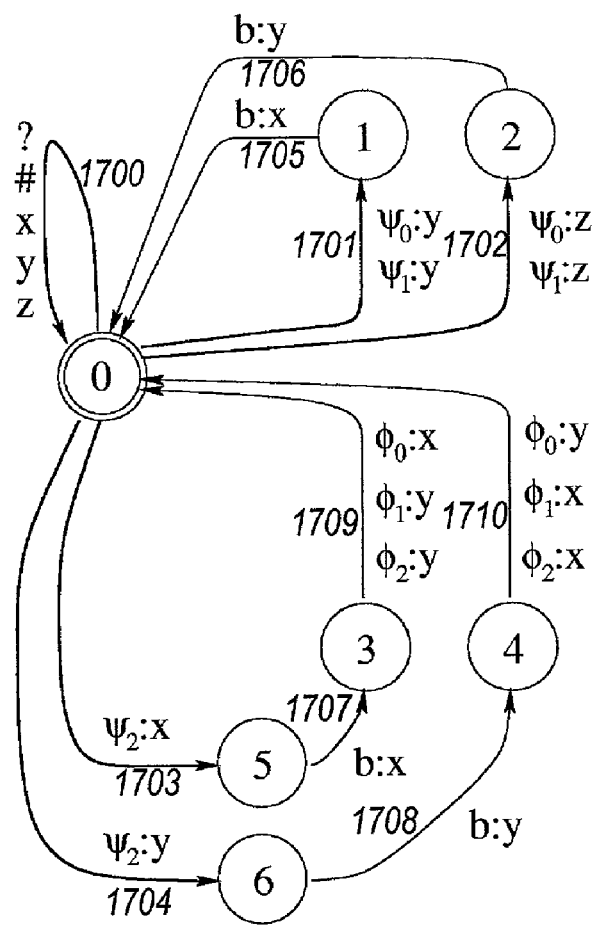
FIG. 29 illustrates a second final factor or minimal ambiguous FST (i.e., fail-safe FST) without failing paths with arcs 1700–1710 and states 0–6.

The final factors shown in FIGS. 28–29 are obtained by replacing all boundary symbols, #, with the empty string $\epsilon$ and minimizing the preliminary factors shown in FIGS. 26–27 (steps 1128 and 1130, respectively). The first factor (i.e., an unambiguous FST), which is shown in FIG. 28, realizes a functional transduction of every accepted input string by mapping every symbol outside an ambiguity field to the corresponding unique output symbol and every symbol inside an ambiguity field to a corresponding unique intermediate symbol. The second factor (i.e., a fail-safe FST), which is shown in FIG. 29, accepts every unambiguous output symbol without altering it, and maps every intermediate symbol to a set of alternative output symbols.

D. Improvements To Bimachine Factorization

This section describes three improvements to the bimachine factorization process proposed by Roche and Schabes (1997), which is cited above.

Any functional (i.e., unambiguous) FST can be converted into a bimachine (see Schüitzenberger, 1961, cited above), which in turn can be factored into a left-sequential FST and a right-sequential FST that together are equivalent to the bimachine. Processes for those transformations were proposed by Roche and Schabes. Such transformed bimachines have the advantage of having higher processing speed by virtue of their sequentiality (i.e., no backtracking is necessary), despite the fact that one FST has been replaced with two. Moreover, left and right context dependencies are made explicit, which allows them to be handled separately. However, the Roche and Schabes method can create a large number of additional symbols, and furthermore, the method is not applicable to FSTs that contain transitions for the unknown symbol. The methods set forth herein solve those problems. They create symbols more sparingly and avoid a direct factorization of the unknown symbol.

Although FSTs are inherently bidirectional, they are often intended to be used in a given direction. The original Roche and Schabes factorization method and the improvements set forth below are performed with respect to the direction of application. In this document, the two sides of an FST are referred to as the input side and the output side.

A bimachine can be described by a quintuple, as follows:

$$B = <\Sigma_{in}, \Sigma_{out}, A_1, A_2, \delta>.$$

It consists of an input alphabet $\Sigma_{in}$, an output alphabet $\Sigma_{out}$, a left-deterministic automaton $A_1$, a right-deterministic automaton $A_2$, and an emission function $\delta$ that can be represented by a matrix, which is shown in Table 3. One way to obtain the output is that the two automata process the same input sequence, left-to-right and right-to-left respectively, and generate a sequence of states (i.e., state numbers) each. Based on these two state sequences and on the original input sequence, the emission function matrix shown in Table 3 generates the output sequence.

As discussed above, methods are known for converting a functional FST into a bimachine, and for factoring a bimachine into two sequential FSTs. The Roche and Schabes method is described with reference to FIGS. 30–38.

Figure 30:
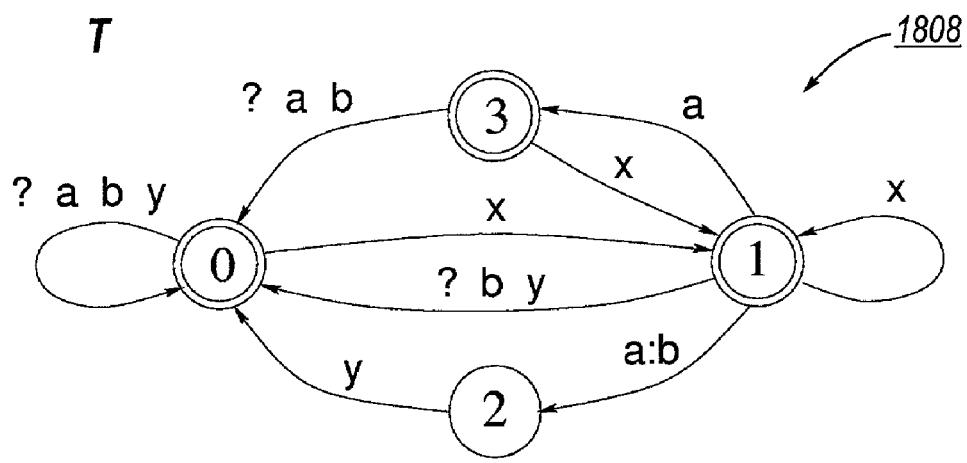
FIG. 30 illustrates a functional FST, with states 0–3, that describes a mapping such that every "a" that occurs between an "x" and a "y" on the input side is replaced by a "b" on the output side.

FIG. 30 illustrates a functional FST that describes a mapping such that every "a" that occurs between an "x" and a "y" on the input side is replaced by a "b" on the output side.

Figure 31:
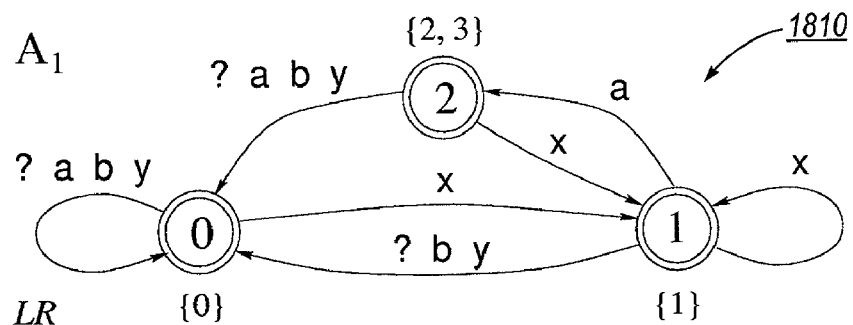
FIGS. 31 and 32 illustrate the functional FST shown in FIG. 30 converted into a bimachine B consisting of a left-deterministic automaton $A_1$, with states 0–2, shown in FIG. 31 and a right-deterministic automaton $A_2$, with states 0–1, shown in FIG. 32.
Figure 32:
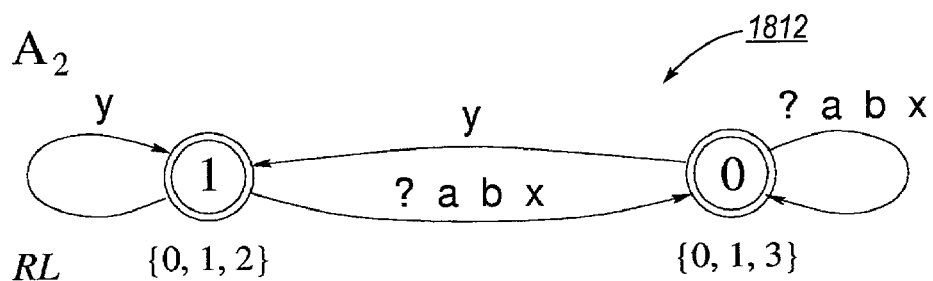

This functional FST T shown in FIG. 30 can be converted into a bimachine B as illustrated in FIGS. 31 and 32. The left-deterministic automaton $A_1$ 1810 of B is equal to the input side of T. The right-deterministic automaton $A_2$ 1812 is equal to the reversed input side of T. Every state of $A_1$ and $A_2$ corresponds to a set of states of T, and is assigned a set of state numbers. Every row of the emission function matrix $\delta$ corresponds to one state of $A_1$, and every column corresponds to one state of $A_2$, as shown in Table 3.

TABLE 3

|       |        | 0           | 1           |   |
|-------|--------|-------------|-------------|---|
| $A_1$ | $A_2$  | {0, 1, 3}   | {0, 1, 2}   |   |
| 0     | {0}    | a b x y ?   | a   b x y ? |   |
| 1     | {1}    | a b x y ?   | a:b b x y ? | δ |
| 2     | {2, 3} | a b x y ?   | a   b x y ? |   |

To obtain an output, e.g., for the input sequence "xaxaya", $A_1$ processes this sequence as shown in Table 4, from left to right (LR), and generates the state sequence 0121200 consisting of the numbers of all states on the path that match the input (FIG. 31). Then, $A_2$ processes the same input as shown in Table 4, from right to left (RL), and generates the state sequence 000100 (written from right to left). The input sequence and the two state sequences constitute a sequence of triples, <0,x,0<, <1,a,0>, <2,x,0>, <1,a,1>, <2,y,0>, <0,a,0>, where every triple $<q_1,\sigma^{in},q_2>$ consists of a state $q_1$ of $A_1$, an input symbol $\sigma^{in}$, and a state $q_2$ of $A_2$. Every triple can be mapped to an output symbol $\sigma^{out}$ by means of the emission function matrix (no matter in which direction and order). For example, the triple <1,a,0> is mapped to the output symbol "a" because the corresponding matrix element (row 1, column 0) contains among others a transition where the symbol "a" is mapped to itself. The triple <1,a,1> is mapped to "b". The whole sequence of triples is mapped to "xaxbya" (FIGS. 31–32), as shown in Table 4.

TABLE 4

$A_1$ :  xaxaya  $\xrightarrow{LR}$  012120[0]

$A_2$ :  xaxaya  $\xrightarrow{RL}$  [0]000100

$\delta$ :  (0, x, 0)(1, a, 0)(2, x, 0)(1, a, 1)  
(2, y, 0)(0, a, 0)  $\longrightarrow$  xaxbya This process of producing an output is equivalent to first applying a left-sequential FST $T_1$ and then a right-sequential FST $T_2$. In this case, $T_1$ maps the input to a sequence of intermediate symbols, and $T_2$ maps this intermediate sequence to an output sequence. An intermediate symbol $\sigma^{mid}$ corresponds to a pair $<q_1,\sigma^{in}>$ consisting of a state $q_1$ of $T_1$ and an input symbol $\sigma^{in}$.

A factorization matrix $\hat{\delta}$ is set forth in Table 5; it results from an emission function matrix that is enhanced with intermediate symbols $\sigma^{mid}$. Here, every transition has the form $\sigma^{in}$: $\sigma^{mid}$: $\sigma^{out}$. Every intermediate symbol consists of the respective input symbol plus an index that is equal to the number of the corresponding state $q_1$ of $A_1$ (and equal to the row number).

TABLE 5

|       |        | 0 | 1 |   |
|-------|--------|---|---|---|
| $A_1$ | $A_2$  | {0, 1, 3} | {0, 1, 2} |   |
| 0 | {0}    | a:a$_0$:a b:b$_0$:b x:x$_0$:x y:y$_0$:y ?:?$_0$:? | a:a$_0$:a b:b$_0$:b x:x$_0$:x y:y$_0$:y ?:?$_0$:? |   |
| 1 | {1}    | a:a$_1$:a b:b$_1$:b x:x$_1$:x y:y$_1$:y ?:?$_1$:? | a:a$_1$:a b:b$_1$:b x:x$_1$:x y:y$_1$:y ?:?$_1$:? | $\hat{\delta}_b$ |
| 2 | {2, 3} | a:a$_2$:a b:b$_2$:b x:x$_2$:x y:y$_2$:y ?:?$_2$:? | a:a$_2$:a b:b$_2$:b x:x$_2$:x y:y$_2$:y ?:?$_2$:? |   |

The left-sequential FST $T_1$ 1814 (FIG. 33) can be obtained from the left-deterministic automaton $A_1$ (FIG. 31) by replacing every arc that starts at a state $q_1$ and is labeled with $\sigma^{in}$ by an arc labeled with $\sigma^{in}$: $\sigma^{mid}$ (mapping an input symbol to an intermediate symbol), corresponding to the row of $q_1$ (see Table 5 and FIG. 33). Note that $\sigma^{mid}$ does not change for the same $\sigma^{in}$ within one row. For example, the arc that leads from state 1 (=$q_1$) to state 2 of $A_1$ and is labeled with "a" is replaced by an arc labeled with "a:a$_1$" in $T_1$, corresponding to row 1 of the factorization matrix $\hat{\delta}$.

The right-sequential FST $T_2$ 1816 (FIG. 34) can be obtained from the right-deterministic automaton $A_2$ (FIG. 32) by replacing every arc that starts at a state $q_2$ and is labeled with $\sigma^{in}$ by a set of arcs labeled with different $\sigma^{mid}$: $\sigma^{out}$, corresponding to the column of $q_2$ (see Table 5 and FIG. 34). All arcs in this set have the same source and destination state as the original arc that they replace. Note that $\sigma^{mid}$ changes for the same $\sigma^{in}$ within one column. For example, the arc that leads from state 1 (=$q_2$) to state 0 of $A_2$ and is labeled with "a", is replaced by a set of arcs labeled in $T_2$ with "a$_0$:a", "a$_1$:b", and "a$_2$:a", respectively, corresponding to column 1 of the factorization matrix $\hat{\delta}$.

Figure 33:
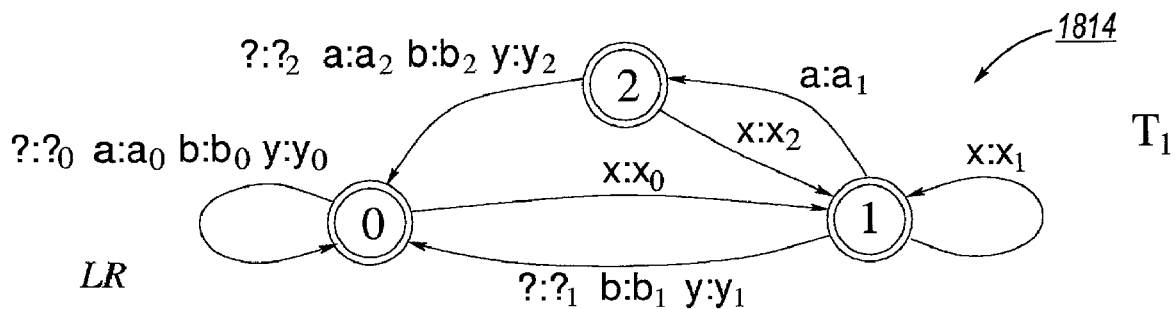
FIG. 33 illustrates a left-sequential FST $T_1$, with states 0–2, that can be obtained from the left-deterministic automaton $A_1$ shown in FIG. 31.
Figure 34:
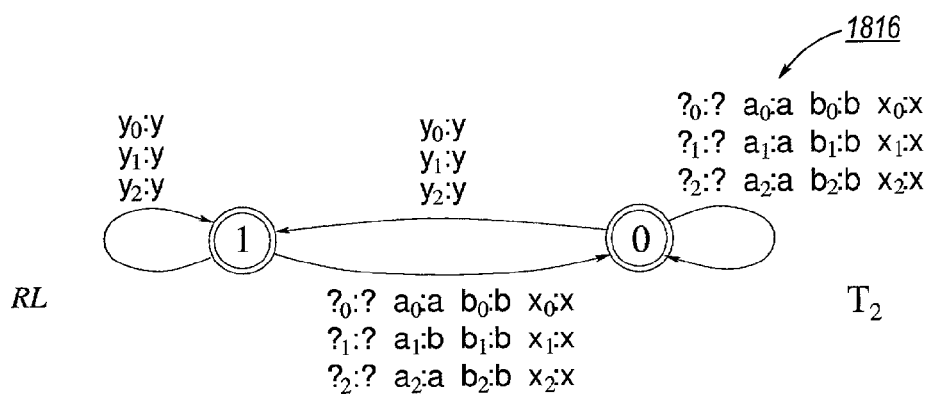
FIG. 34 illustrates a right-sequential FST $T_2$, with states 0–1, that can be obtained from the right-deterministic automaton $A_2$ shown in FIG. 33.
Figure 35:
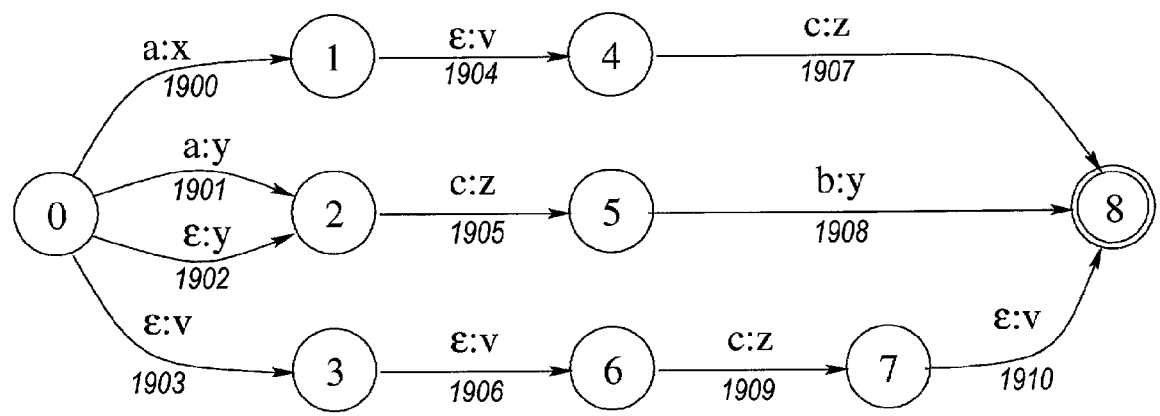
FIG. 35 illustrates a functional FST with epsilon ($\epsilon$) on the input side, with arcs 1900–1910 and states 0–8.

The input sequence "xaxaya", e.g., is mapped (LR) by $T_1$ 1814 to "x$_0$a$_1$x$_2$a$_1$y$_2$a$_0$", which in turn is mapped (RL) by $T_2$ 1816 to "xaxbya" (FIGS. 33–34). The known factorization approach works essentially as set forth above. It does not explicitly create a factorization matrix, but the resulting left-sequential and right-sequential FSTs are the same (FIGS. 33–34).

The above example of a functional FST (FIG. 30) describes an equal-length relation, where pairs of corresponding strings (in the input and output language) are of equal length. This type of FST does not contain $\epsilon$ (epsilon, the empty string) on either side. If an $\epsilon$ occurs on the output side of a functional FST, it can be handled like an ordinary symbol. If it occurs on the input side, it requires pre-processing.

Figure 36:
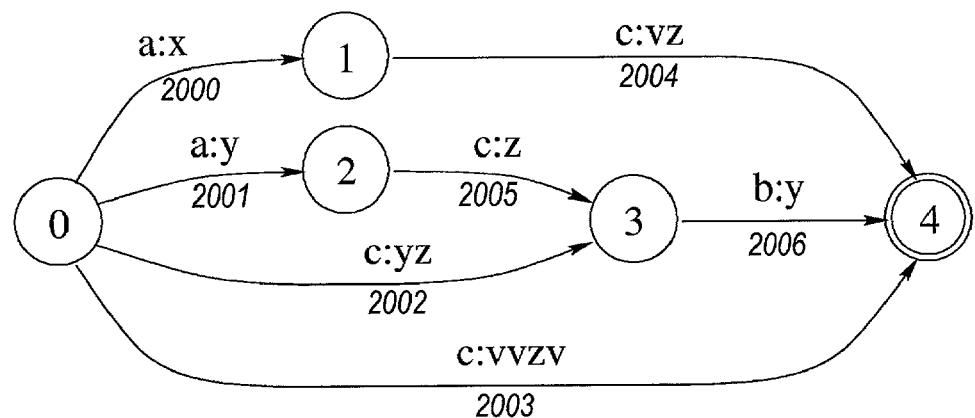
FIG. 36 illustrates a FST, with arcs 2000–2006 and states 0–4, and with epsilon removal by output symbol concatenation of the FST shown in FIG. 35.
Figure 37:
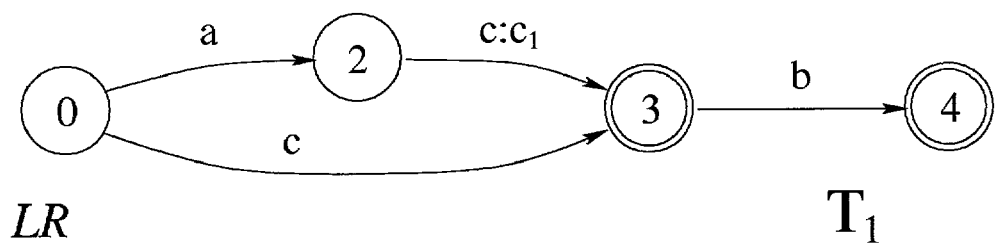
FIGS. 37 and 38 illustrate the factorization of the FST shown in FIG. 36 into a left-sequential FST, with states 0–4, shown in FIG. 37 and a right-sequential FST, with states 0–4, shown in FIG. 38.
Figure 38:
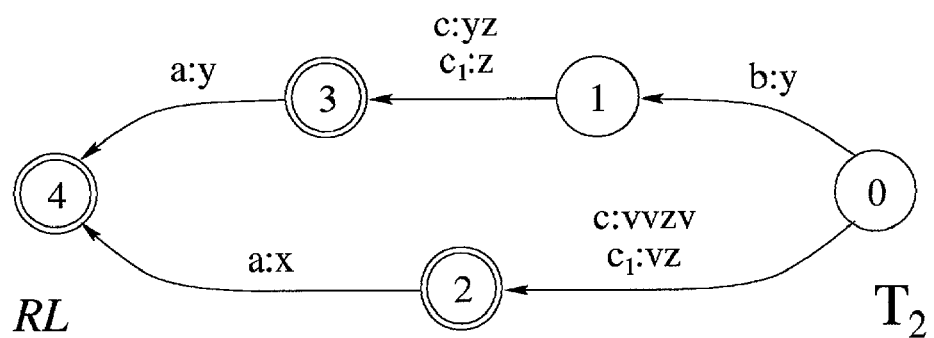

The known method proposes to remove all arcs with $\epsilon$ on the input side, and to concatenate their output symbols with the output of adjacent non-epsilon arcs. For example, the path [903, 1906, 1909, 1910] labeled with [$\epsilon$:v, $\epsilon$:v, $\epsilon$:z, $\epsilon$:v] (FIG. 35) is "compressed" into a single arc [2003] labeled with [c:vvzv] (FIG. 36). The resulting FST does not contain $\epsilon$ on the input side (FIG. 36). It can be factored into a left-sequential FST (FIG. 37) and a right-sequential FST (FIG. 38) by the process set forth above.

Note that the original (FIG. 35) and pre-processed (FIG. 36) FST describe slightly different relations. For example, when the original FST outputs the sequence "v-v-z-v" consisting of four symbols, the pre-processed FST outputs the sequence "vvzv" consisting of one symbol. If this output is to be further processed by another FST, then this difference can matter. The other FST may not accept the multi-character symbol "vvzv". In this case, a conversion (from "vvzv", a single four-character symbol, to "v-v-z-v", four single-character symbols) would be required.

The above process for converting a functional FST into a bimachine, for factoring this bimachine into a left-sequential and a right-sequential FST, and for eliminating arcs with $\epsilon$ on the input side can cause several problems. First problem: the factorization process can create a relatively large number of additional arcs and symbols (FIGS. 33–34) in comparison to the original FST (FIG. 30), because intermediate symbols are obtained by combining input symbols with (possibly many) row numbers of the emission function matrix (FIGS. 31–32 and Tables 3–5). Second problem: the pre-processing step for eliminating arcs with $\epsilon$ on the input side can create many additional symbols by creating many different concatenations of the existing output symbols that may be numerous already. Third problem: the factorization process is not applicable to FSTs with transitions for the unknown symbol, denoted by "?" (FIG. 30). Such transitions map any symbol that is not in the alphabet of the FST to itself. If a ?-transition is factored into two transitions, $?{:}?_i$ in $T_1$ and $?_i{:}?$ in $T_2$ (FIGS. 33–34), then $T_1$ will map an actually occurring input symbol $\sigma^{in}$ to the intermediate symbol $\sigma^{mid}=?_i$, and $T_2$ should map $?_i$ to $\sigma^{out}$ ($=\sigma^{in}$). This, however, is not possible without the memorization of all unknown symbols that occur in an input string, and a "special handling" of such cases at runtime.

Some solutions to these problems are set forth below.

D.1 Reduction Of The Intermediate Alphabet

Figure 39:
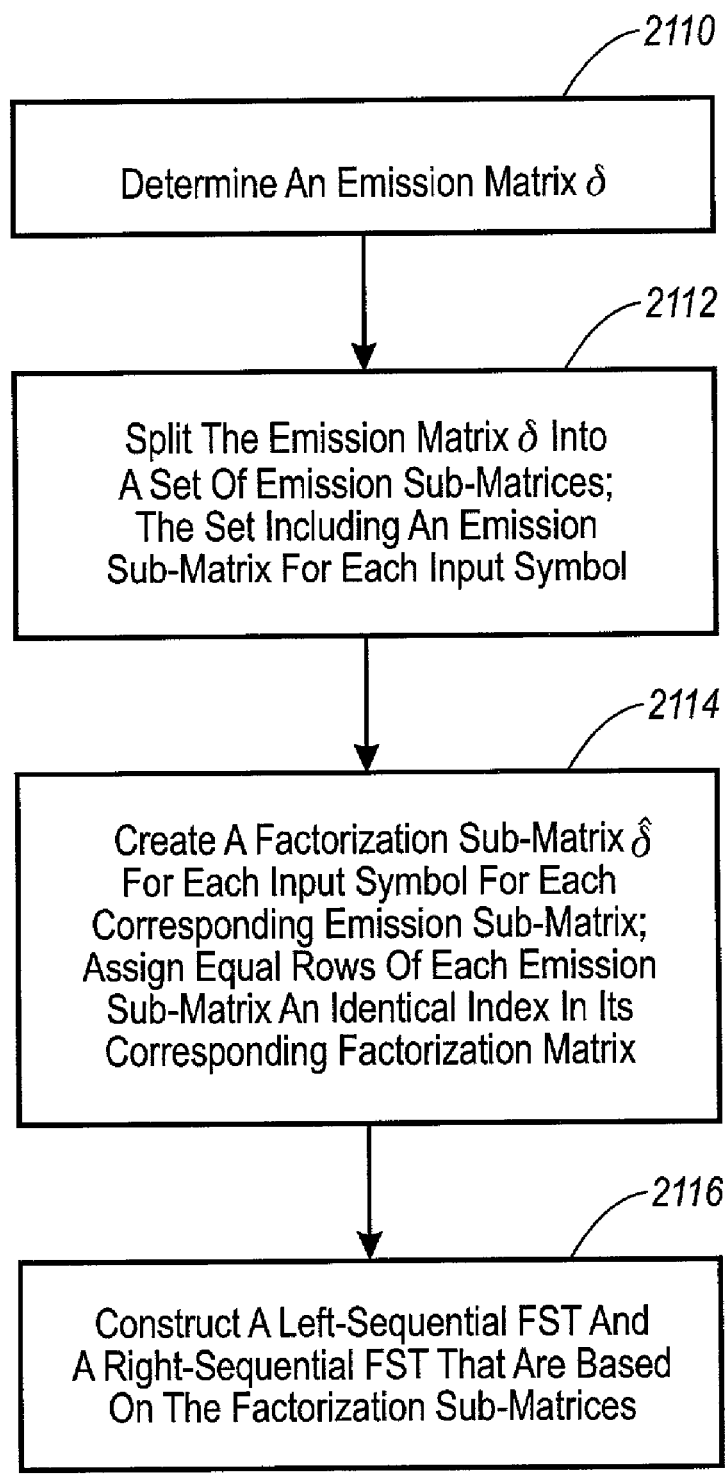
FIG. 39 is a flow diagram that sets forth the steps for factoring unambiguous FSTs.

A solution to the first problem described above is as follows, and is considered with reference to the flow chart set forth in FIG. 39. In the factorization matrix $\hat{\delta}$ (Table 5), every intermediate symbol has an index corresponding to the row number. This is not necessary. Rows that are equal in the emission matrix $\delta$ (Table 3) can use the same index in the factorization matrix $\hat{\delta}$ (Table 5). Equal rows do not need to be distinguished.

Initially, an emission matrix is determined (step 2110). After the emission matrix is determined, the emission matrix is split into a set of emission sub-matrices, one for every input symbol (step 2112). Table 6 shows the emission sub-matrix $\delta_a$ for the input symbol "a", for the example discussed above with reference to FIGS. 30–34. Here, the rows 0 and 2 are equal and use both the index 0. Row 1 is different, and uses the index 1. The indices of all rows are show in the vector next to the sub-matrix. Based on these indices and on the convention that the index 0 is not expressed, the intermediate symbols are "a" for the rows 0 and 2, and "$a_1$" for row 1, as shown on the right side of the Table 6.

TABLE 6

| $A_1$ | $A_2$ | 0 $\{0,1,3\}$ | 1 $\{0,1,2\}$ | | | |
|---|---|---|---|---|---|---|
| 0 | $\{0\}$ | a | a | | 0 | $(a_0)$ | a |
| 1 | $\{1\}$ | a | a:b | $\delta_a$ | 1 | | $a_1$ |
| 2 | $\{2,3\}$ | a | a | | 0 | $(a_0)$ | a |

With these intermediate symbols shown in Table 6, a factorization sub-matrix $\hat{\delta}$ is created for the input symbol "a", as described above while referring to Tables 3 and 5 (step 2114). The resulting factorization sub-matrix $\hat{\delta}_a$ for the input symbol "a" is set forth in Table 7. Note that only one additional symbol is introduced for the input symbol "a".

TABLE 7

| | | 0 | 1 | |
|---|---|---|---|---|
| $A_1$ | $A_2$ | $\{0,1,3\}$ | $\{0,1,2\}$ | |
| 0 | $\{0\}$ | a:a:a | a:a:a | |
| 1 | $\{1\}$ | a:a$_1$:a | a:a$_1$:b | $\hat{\delta}_a$ |
| 2 | $\{2,3\}$ | a:a:a | a:a:a | |

In the same way, we separately build an emission sub-matrix $\delta$ for every other input symbol (step 2112), define row indices and intermediate symbols, and create a factorization sub-matrix $\hat{\delta}$ (step 2114). Tables 8 and 9 illustrate this process for the input symbol "x". No additional symbols are introduced, neither for "x" nor for any of the remaining input symbols. In these cases, all rows are equal and can use the index 0, that by convention is not expressed.

TABLE 8

| $A_1$ | $A_2$ | 0 $\{0,1,3\}$ | 1 $\{0,1,2\}$ | | | |
|---|---|---|---|---|---|---|
| 0 | $\{0\}$ | x | x | | 0 | $(x_0)$ | x |
| 1 | $\{1\}$ | x | x | $\delta_x$ | 0 | $(x_0)$ | x |
| 2 | $\{2,3\}$ | x | x | | 0 | $(x_0)$ | x |

TABLE 9

| | | 0 | 1 | |
|---|---|---|---|---|
| $A_1$ | $A_2$ | $\{0,1,3\}$ | $\{0,1,2\}$ | |
| 0 | $\{0\}$ | x:x:x | x:x:x | |
| 1 | $\{1\}$ | x:x:x | x:x:x | $\hat{\delta}_x$ |
| 2 | $\{2,3\}$ | x:x:x | x:x:x | |

Based on the factorization sub-matrices of all input symbols, a left-sequential FST and a right-sequential FST are constructed (step 2116) using the above process discussed while referring to FIGS. 30–34 and Tables 3–5. In the present example, the resulting left and right sequential FSTs $T_1$ and $T_2$ shown in FIGS. 40–41 have considerably fewer symbols and arcs than those produced by the original approach shown in FIGS. 33–34, respectively.

D.2 Ambiguity Alignment

A solution to the second problem described above is as follows, considered with reference to the flow chart of FIG. 42.

Instead of removing all arcs labeled with $\epsilon$ (epsilon, the empty string), those arcs are replaced with a diacritic that can be factored like an ordinary symbol. This creates two problems that the following approach has to resolve.

Firstly, $\epsilon$ represents a non-determinism. Therefore, the left-sequential FST and right-sequential FST built by factorization should not contain $\epsilon$ on the input side. This issue will be addressed at the end of this section.

Figure 43:
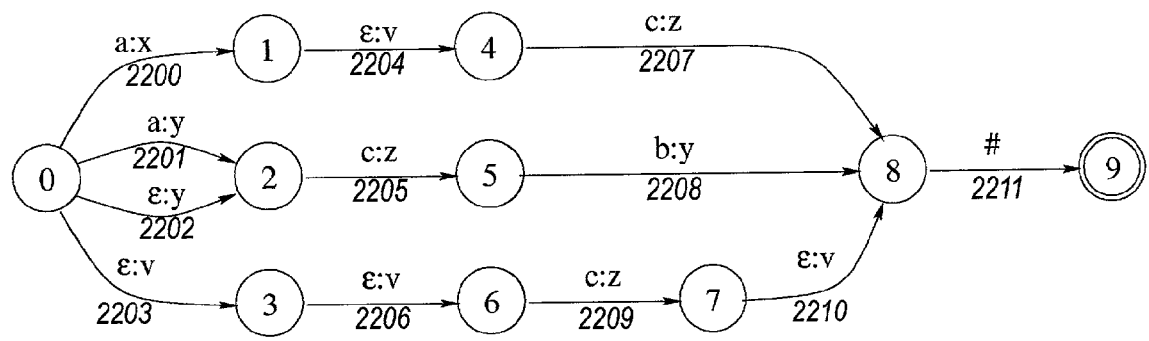
FIG. 43 illustrates the FST shown in FIG. 30 that is concatenated with boundary symbols on the right side and minimized, with arcs 2200–2211 and states 0–9.
Figure 44:
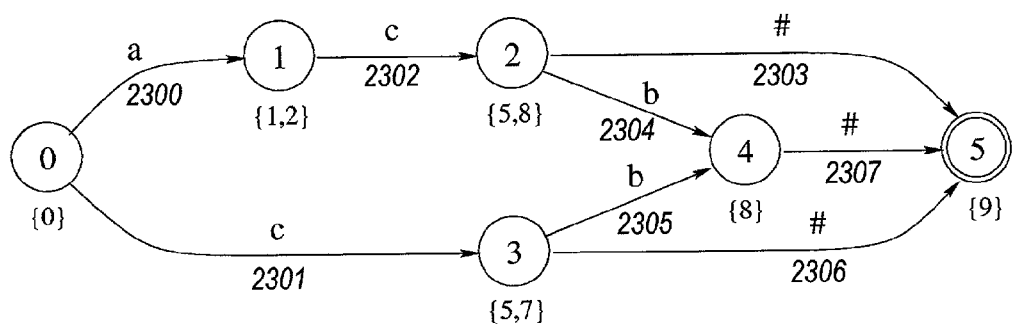
FIG. 44 illustrates a left-deterministic input automaton of the FST shown in FIG. 43, with arcs 2300–2307 and states 0–5.

Second, the number of $\epsilon$-arcs preceding or following a set A of alternative arcs that match the same input symbol after the same input prefix, can be different for different arcs in A. In the example of FIGS. 43–44, this concerns the arc set $\{$2207, 2205$\}$ that matches "c" after "a" (see also FIG. 35). Here, the arc 2207 is preceded by one $\epsilon$-arc and the arc 105 is preceded by no $\epsilon$-arcs. When the arc set $\{$2200, 2201$\}$ that matches "a" at the beginning of an input sequence is merged into one arc in the left-sequential FST, and the arc set $\{$2207, 2205$\}$ is merged into another arc, then there should be an ϵ-arc between 2200 and 2205 that could be merged with the ϵ-arc 2204. In such cases, additional ϵ-arcs are introduced to align all arcs of a set A. This places every arc in A at the same distance to the preceding non-ϵ-arc. This approach is referred to as ambiguity alignment. It is performed as follows.

First, the original (or input) FST T is concatenated on the right side with a boundary symbol, # (step 2410), and is minimized (FIG. 43) (step 2412). The property of finality, so far carried only by states, is now also carried by arcs and is, therefore, easier to handle. The result of this step will be referred to as the minimal FST.

Then, a left-deterministic input FSA is created by extracting the input side of the minimal FST, and determinizing it from left to right (FIG. 44) (step 2414). Every state of the input FSA corresponds to a set of states of the minimal FST, and is assigned a set of state numbers. Here, we follow the convention that ϵ-arcs can be traversed only before (but not after) a non-ϵ-arc. This has an impact on the state sets in the input FSA. For example, state 1 of the input FSA is assigned the set {1,2} rather than the set {4,2} because the ϵ-arc 2204 of the minimal FST is not traversed with the arc 2200, but rather with the arc 2207.

Figure 45:
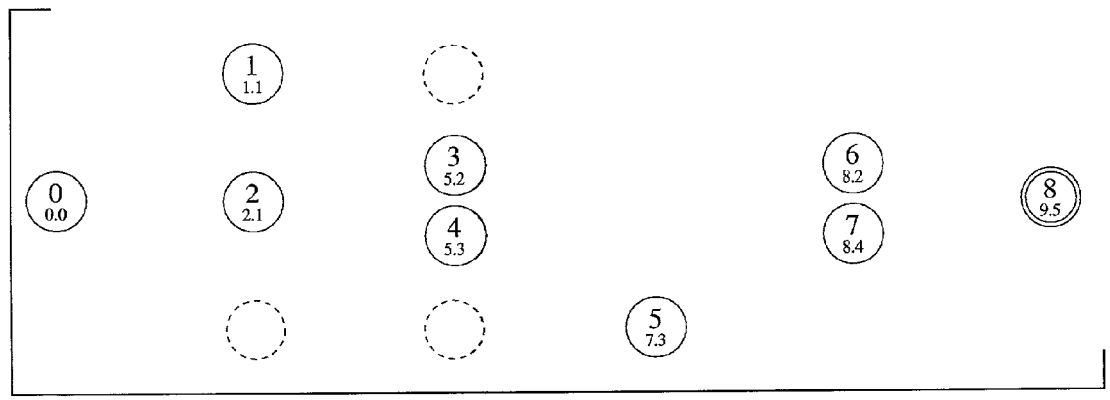
FIG. 45 illustrates states in the FST shown in FIG. 43 with aligned ambiguity.

Finally, an FST with aligned ambiguity can be created (step 2416). It will be referred to as an aligned FST. Every state of the minimal FST is copied to the (new) aligned FST as many times as it occurs in different state sets of the input FSA (FIG. 45) (step 2418). The copying of the arcs is described in detail after. For example, state 5 of the minimal FST occurs in the states sets of both state 2 and 3 of the input FSA, and is therefore copied twice to the aligned FST, where the two copies have the state numbers 3 and 4. Every state q of the aligned FST corresponds to one state $q^m$ of the minimal FST and to one state $q^L$ of the left-deterministic input FSA. Every state q is labeled with a triple of state numbers <q, $q^m$, $q^L$> (FIG. 45). For example, the states 3 and 4 are labeled with the triples <3, 5, 2> and <4, 5, 3>, respectively, which means that they are both copies of state 5 of the minimal FST but correspond to different states of the input FSA, namely to the states 2 and 3, respectively. States of the minimal FST that do not occur in any state set of the input FSA (because all of their incoming arcs are ϵ-arcs), are not copied to the aligned FST. For example, the states 3, 4, and 6 are not copied (see FIG. 45, dashed circles).

TABLE 10

Alternative Sub-Paths In

| $A_L$ | $T_m$ | $T_a$ |
|---|---|---|
| 0[a]1 | {0[a:x]1, 0[a:y]2} | {0[a:x]1, 0[a:y]2} |
| 0[c]3 | {0[ϵ:y,c:z]5, 0[ϵ:v,ϵ:v,c:z]7} | {0[ω:ϵ,ω:y,c:z]4, 0[ω:v,ω:v,c:z]5} |
| 1[c]2 | {1[ϵ:v,c:z]8, 2[c:z]5} | {1[ω:v,c:z]6, 2[ω:ϵ,c:z]3} |
| 2[b]4 | {5[b:y]8} | {3[b:y]7} |
| 2[#]5 | {8[#]9} | {6[#]8} |
| 3[b]4 | {5[b:y]8} | {4[b:y]7} |
| 3[#]5 | {7[ϵ:v,#]9} | {5[ω:v,#]8} |
| 4[#]5 | {8[#]9} | {7[#]8} |

For each arc in the left-deterministic FSA, a corresponding sub-path in the minimal FST is identified (step 2420). For the copying of arcs from the minimal to the aligned FST, alternative sub-paths of the minimal FST are recorded in Table 10 (step 2422). Column 1 of Table 10 lists all arcs of the input FST with their source and destination states. For example, "0[c]3" means that the input FSA contains an arc labeled with "c" that leads from state 0 to state 3. Column 2 shows the corresponding set of sub-paths in the minimal FST consisting each of one or more arcs and a source and destination state. For example, {0[ϵ:y,c:z]5, 0[ϵ:v,ϵ:v,c:z]7} means that the arc 0[c]3 of the input FST corresponds to two sub-paths in the minimal FST, namely one sub-path labeled with [ϵ:y,c:z]ϵ that leads from state 0 to state 5, and another sub-paths labeled with [ϵ:v,ϵ:v,c:z] that leads from state 0 to state 7. Note that every sub-path contains only one non-ϵ-arc. This arc is always the last one, and can be preceded by ϵ-arcs.

Subsequently, all sub-paths within one set are aligned (to equal length) by pre-pending arcs labeled with "ω:ϵ" (column 3 of Table 10) (step 2424). All previously existing ϵ are replaced on the input side by the diacritic ω. For example, the above mentioned set becomes {0[ω:ϵ,ω:y,c:z]4, 0[ω:v, ω:v,c:z]5} where all sub-paths are now three arcs long. Here, the source and destination states q (in the aligned FST; FIG. 45) are determined by the state numbers of the corresponding states in both the minimal FST ($q^m$) and the input FSA ($q^L$). For example, the destination state of the sub-path 0[ω:ϵ,ω:y,c:z]4 corresponds to the state 5 (=$q^m$) in the minimal FST and to the state 3 (=$q^L$) in the input FSA. The aligned FST contains one state that corresponds to this $q^m$ and $q^L$, namely the state 4 that is labeled with the triple <4,5,3>. All other source and destination states are determined in the same way.

Figure 46:
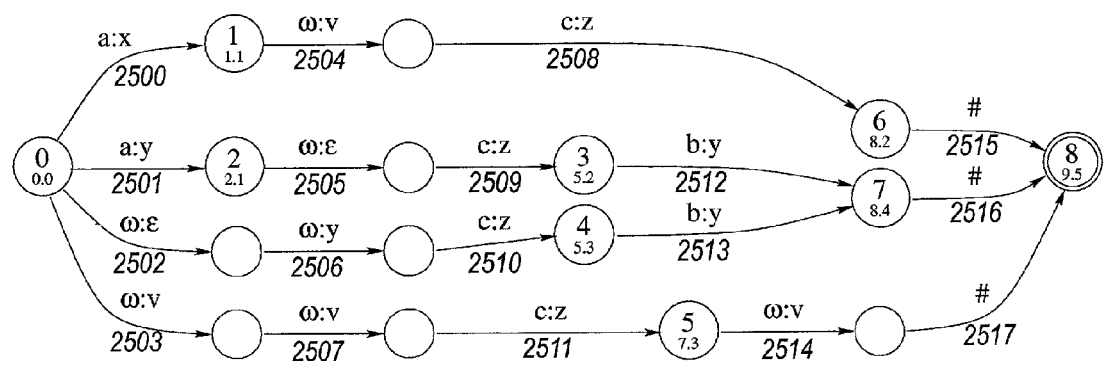
FIG. 46 illustrates a non-minimal FST, with arcs 2500–2517 and states 0–8, and with aligned ambiguity of the FST shown in FIG. 30.
Figure 47:
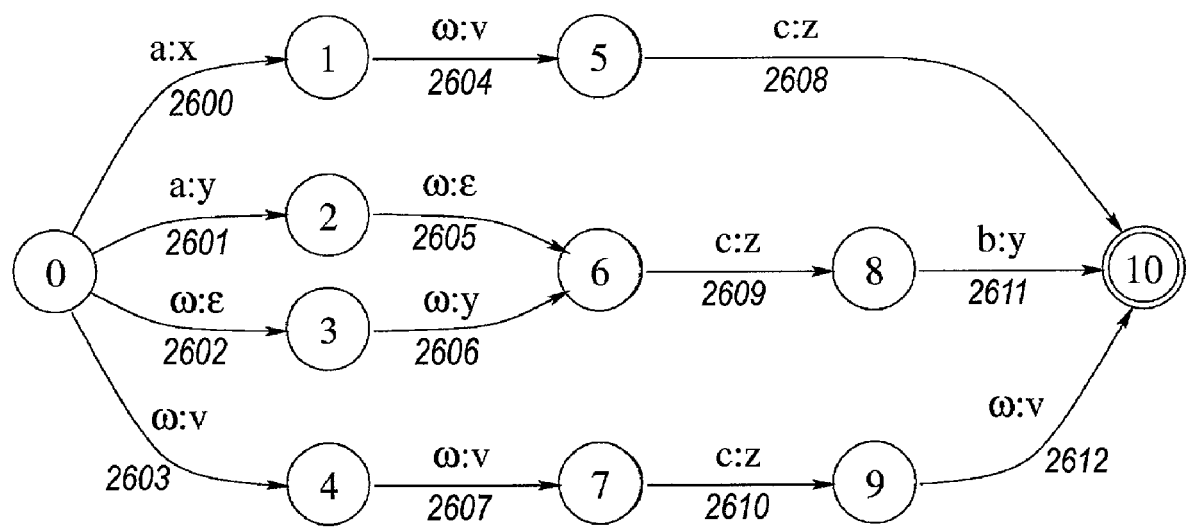
FIG. 47 illustrates a minimal FST, with arcs 2600–2612 and states 0–10, and with aligned ambiguity of the FST shown in FIG. 30.

All aligned sub-paths are inserted into the aligned FST as described in Table 10 (step 2426). Additional states are inserted where required (FIG. 46, circles without numbers). Finally, the boundary symbol, "#", is replaced by ϵ (step 2428), and the aligned FST is minimized (FIG. 47) (step 2430). It describes the same relation as the minimal FST if ω is considered as the empty string.

Figure 48:
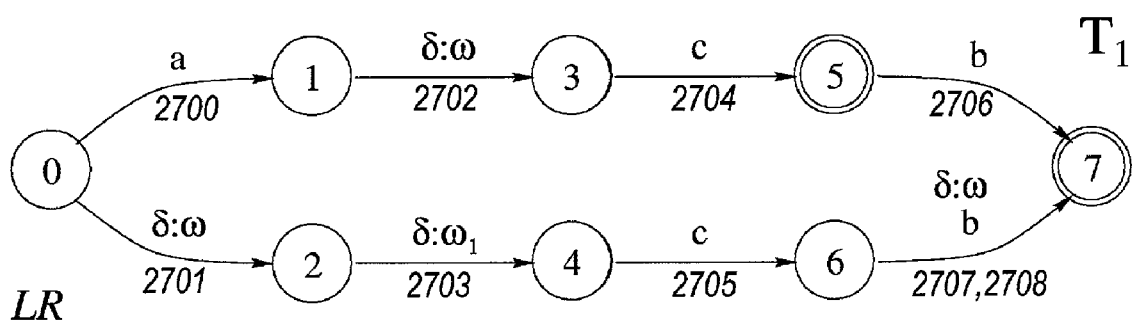
FIG. 48 illustrates a left-sequential FST, with arcs 2700–2708 and states 0–7, and with aligned ambiguity of the FST shown in FIG. 47.
Figure 49:
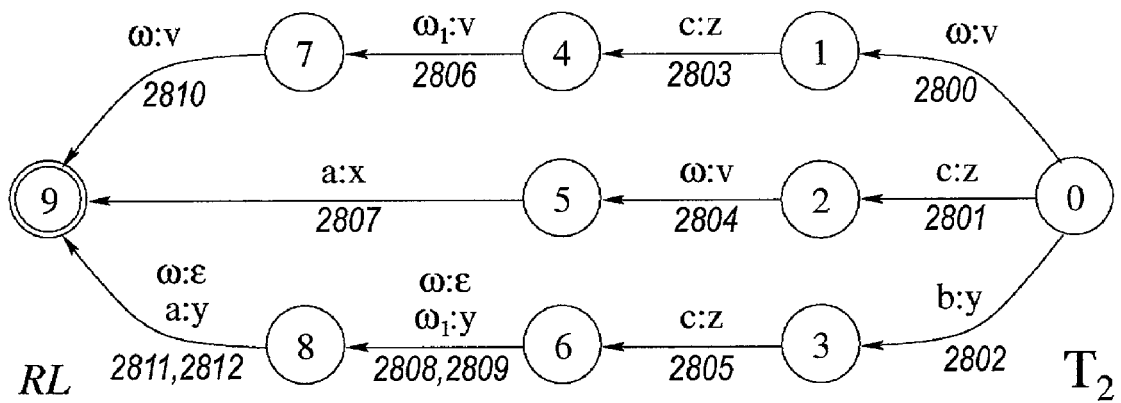
FIG. 49 illustrates a right-sequential FST, with arcs 2800–2812 and states 0–9, and with aligned ambiguity of the FST shown in FIG. 47.

The aligned FST is functional and can be factorized by the previously described process (step 2432), including improvements described herein (FIGS. 48–49). The diacritic ω is factored like an ordinary symbol. In the resulting left-sequential FST $T_1$ (only), ω is replaced on the input side by the diacritic δ that represents a "deterministic empty string."

In an arbitrary FST, ϵ represents a non-determinism whenever a state has an outgoing arc for a particular input symbol $σ^{in}$ and an ϵ-arc. Both arcs must be traversed because the ϵ-arc (or a chain of ϵ-arcs) can lead to a state that has an outgoing arc for $σ^{in}$. This non-deterministic situation cannot occur with δ in a left-sequential FST $T_1$ resulting from the factorization of an aligned FST. In $T_1$, every state has either an arc for a particular $σ^{in}$, or a δ-arc (or a chain of δ-arcs) that leads to a state that has an arc for $σ^{in}$, or none of either. Due to the structure of an aligned FST, no state of $T_1$ can have both arcs. This means that every state of $T_1$ is sequential.

For example, the state 0 of the original FST in this example (FIG. 35) is non-sequential. It has two sub-paths ⌈1900⌉ and ⌈1901⌉ that accept the input prefix "a", and two sub-paths ⌈1902, 1905⌉ and ⌈1903, 1906, 1909⌉ that accept the input prefix "c". In the aligned FST, these sub-paths are converted into ⌈2600⌉ and ⌈2601⌉ for "a", and into ⌈2602, 2606, 2609⌉ and ⌈2603, 2607, 2610⌉ for "c". In $T_1$ (FIG. 48), the sub-paths for "a" are merged into one subpath ⌈2700⌉, and the sub-paths for "c" are merged into another subpath ⌈2701, 2703, 2705⌉. The non-sequentiality of the original FST does not occur in $T_1$. If $T_1$ is applied to an input string starting with "a", it is sufficient to traverse the arc 2700 that results from merging all arc of the original FST that accept "a", and it is not necessary to traverse the δ-arc 2701 (and possibly other following δ-arcs) because they cannot lead to an arc for "a".

When $T_1$ is applied to an input string, a δ-arc must not be traversed if another (non-δ-) arc can be traversed. A δ-arc must be traversed if no other (non-δ-) arc can be traversed. This behavior is deterministic, and $T_1$ is, therefore, sequential. If $T_1$ is applied, e.g., to the input sequence "cb", it produces the intermediate sequence "ωω₁cb" as follows: The δ-arcs 2701 and 2703 must be traversed because at that point there are no arcs that would accept the input symbol "c". Then, the arcs 2705 and 2708 are traversed and match "c" and "b", respectively. The δ-arc 2707 must not be traversed because the state 6 has an outgoing arc (namely 2708) that matches "b". When the right-sequential FST $T_2$ is applied to an intermediate sequence, the diacritics ω and $ω_1$ are treated like ordinary symbols, and ϵ as the ordinary empty string (FIGS. 48–49).

D.3 Factorization Of The Unknown Symbol

Figure 50:
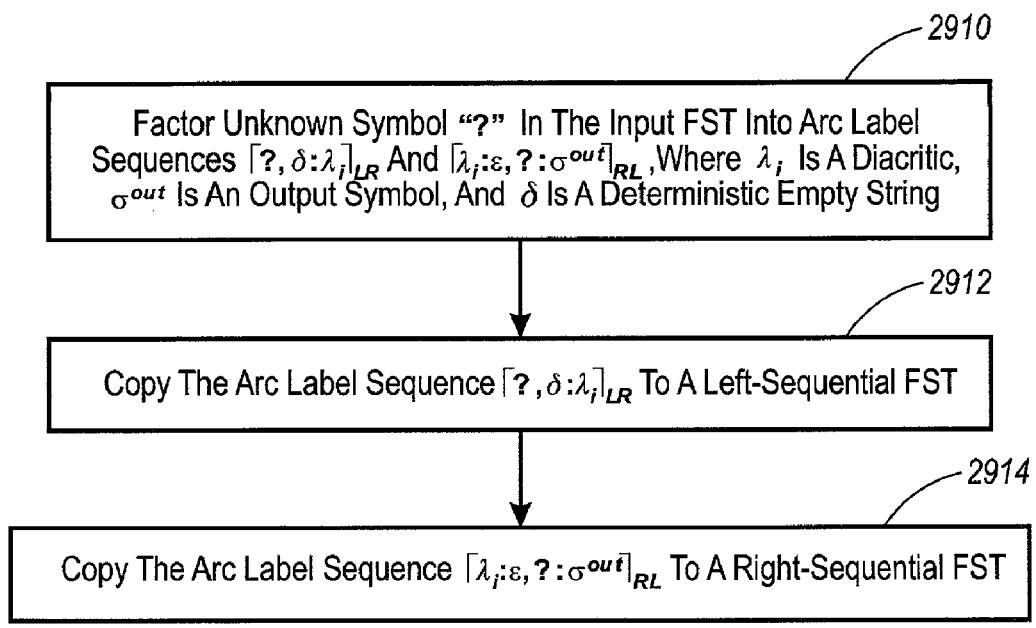
FIG. 50 is a flow diagram which sets forth the steps for factoring FSTs with unknown symbols.

The following method describes a solution to the third problem described above, and is considered with reference to the flow chart set forth in FIG. 50. However, it should be noted that the solution to the first problem described above has a side effect of solving many instances of this problem as well.

Figure 40:
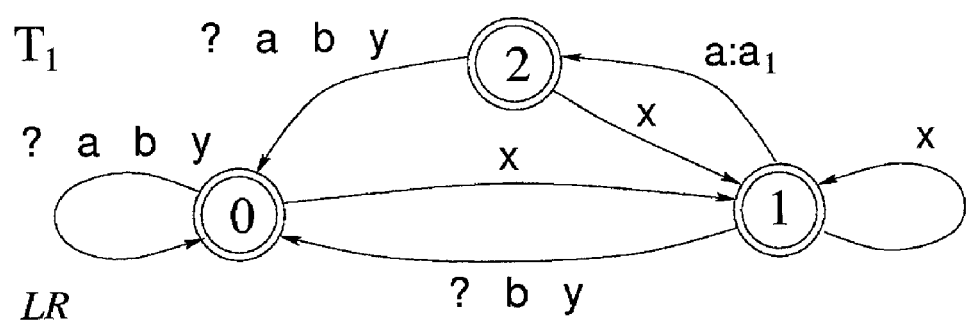
FIG. 40 illustrates a left-sequential FST produced using the steps set forth in FIG. 39, with states 0–2.
Figure 41:
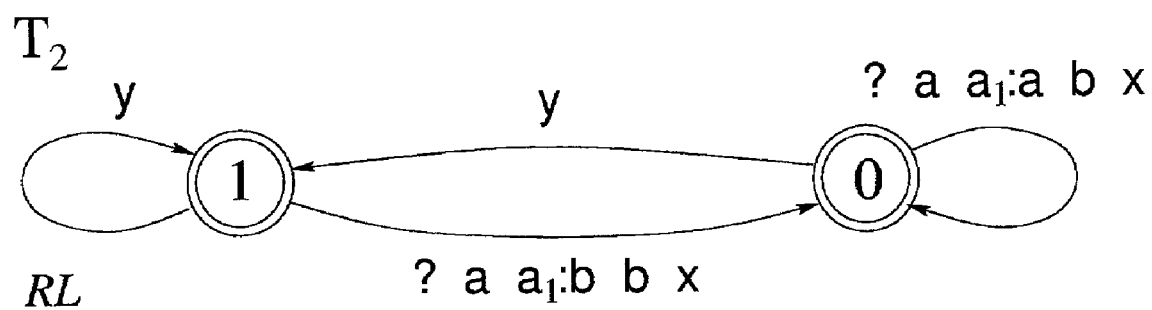
FIG. 41 illustrates a right-sequential FST produced using the steps set forth in FIG. 39, with states 0–1.
Figure 42:
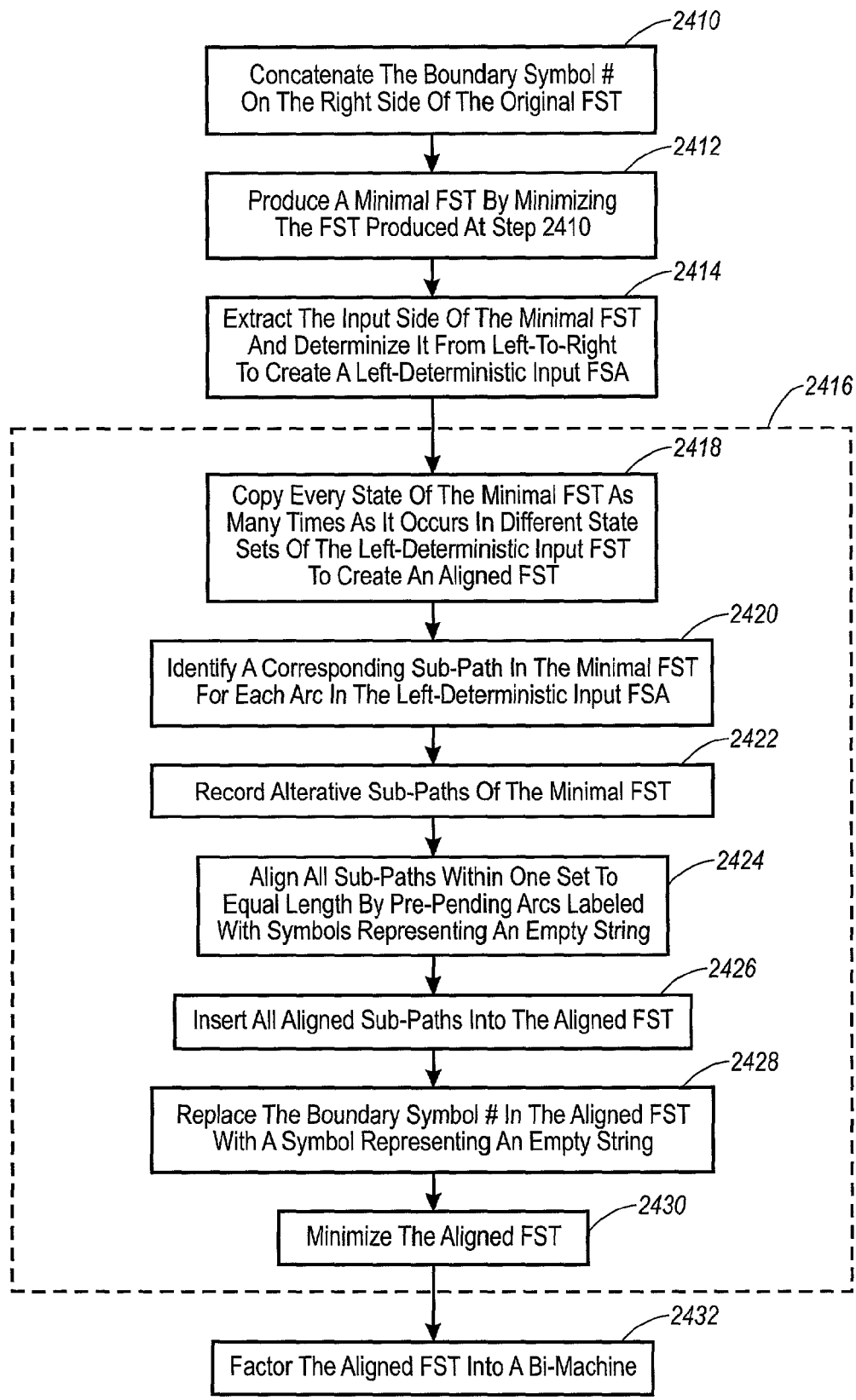
FIG. 42 is a flow diagram that sets forth the steps for aligning ambiguity in FSTs.

The unknown symbol, "?", of the first example (FIG. 30) is factored into $?:?_i$ and $?_i:?$ only by the original process (FIGS. 33–34) but not by the improved process set forth herein (FIGS. 41–42). The original process factors every symbol, including the unknown one. The improved process does not factor symbols that are always mapped to the same output. However, factorization cannot be avoided, even within the improved process, for symbols that are mapped to different output. In the first example (FIG. 30), this concerns only the symbol "a" that is mapped either to "b" or to itself depending on the context (FIGS. 30 and 40–41).

Figure 51:
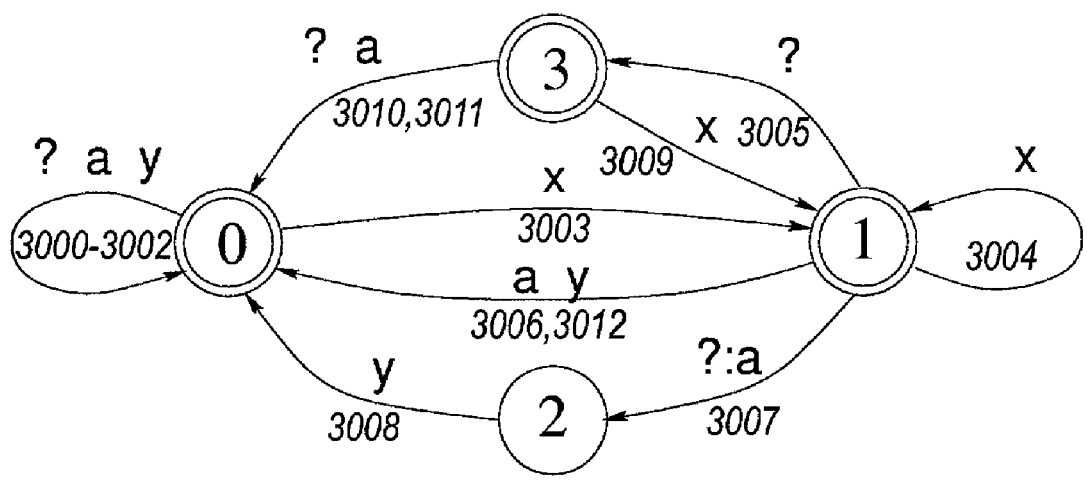
FIG. 51 illustrates a regular relation, with arcs 3000–3012 and states 0–3, in which every symbol other than "x" or "y" that occurs between "x" and "y" on the input side, is replaced by the symbol "a" on the output side.
Figure 52:
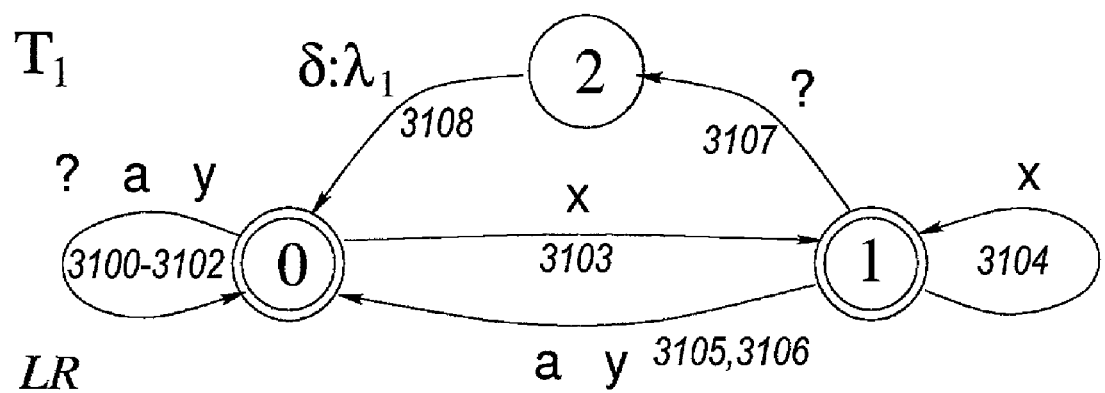
FIG. 52 illustrates a left-sequential FST, with arcs 3100–3108 and states 0–2, in which the unknown symbols is replaced according to the flow diagram set forth in FIG. 50.
Figure 53:
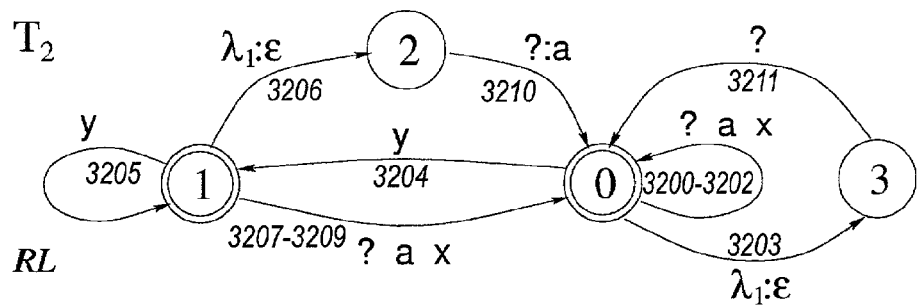
FIG. 53 illustrates a right-sequential FST, with arcs 3200–3211 and states 0–3, in which the unknown symbol is replaced according to the flow diagram set forth in FIG. 50.

FIG. 51 illustrates a functional FST that describes a mapping where every symbol other than "x" or "y" that occurs between "x" and "y" on the input side, is replaced by the symbol "a" on the output side. For example, the input sequence "ixixiy" is mapped to "ixixay". The factorization of this FST requires the factorization of the unknown symbol, "?". The above-mentioned problem of memorizing an actually-occurring unknown symbol (e.g. "i") can be avoided by factoring "?", not into the two labels "?:?$_i$" and "?$_i$:σ$^{out}$" where σ$^{out}$ is one of several alternative output symbols, but rather (step 2910) into the two label sequences $[?,δ:λ_i]_{LR}$, which is copied to a left-deterministic FST (step 2912) and $[λ_i:ϵ, ?:σ^{out}]_{RL}$, which is copied to a right-deterministic FST (step 2914) (FIGS. 52–53). Here, $λ_i$ is a diacritic and δ is the above-explained deterministic empty string. For example, the arcs 3005 and 3007 of the original FST (FIG. 51) that map "?" either to "a" or to itself depending on the context, are represented in $T_1$ by the arc sequence [3107, 3108] (FIG. 52) and in $T_2$ by the two arc sequences [3206, 3210] and [3203, 3211] (FIG. 53). A direct factorization of "?" is thereby avoided.

When the left-sequential FST $T_1$ is applied, e.g., to the input sequence "ixixiy", it produces, from left to right, the intermediate sequence "ixiλ₁xiλ₁y" on the path [3100, 3103, 3107, 3108, 3103, 3107, 3108, 3102]. $T_2$ maps the latter sequence, from right to left, to the output "ixixay" on the path [3204, 3206, 3210, 3202, 3203, 3211, 3202, 3200] (FIGS. 52–53).

E. Complete Factorization Of Arbitrary Finite State Transducers

This section describes different enhancements to factorization processes, such as the process described in Section C above, to make them more generally applicable and more efficient.

E.1 Extraction Of Infinite Ambiguity

This section describes. This means that all infinite ambiguity is extracted and separately described. The process is meant to be applied before the previously proposed method set forth in Section C of factoring finitely ambiguous FSTs, which method is not applicable to FSTs with infinite ambiguity. However, it can also be used in other contexts. In particular, it will be shown how different factorization processes can be applied together.

Infinite ambiguity is always described by "ϵ-loops," i.e., loops where the input symbol of every arc is an ϵ (epsilon, empty string). In the proposed factorization, every ϵ-loop in the first factor is replaced by a single arc with ϵ on the input side and a diacritic on the output side. This means that the first factor does not contain any infinite ambiguity. Instead of (perhaps infinitely) traversing an ϵ-loop, a diacritic is emitted. The second factor maps every diacritic to one or more ϵ-loops. This means that the second factor retains the infinite ambiguity of the original FST.

Figure 54:
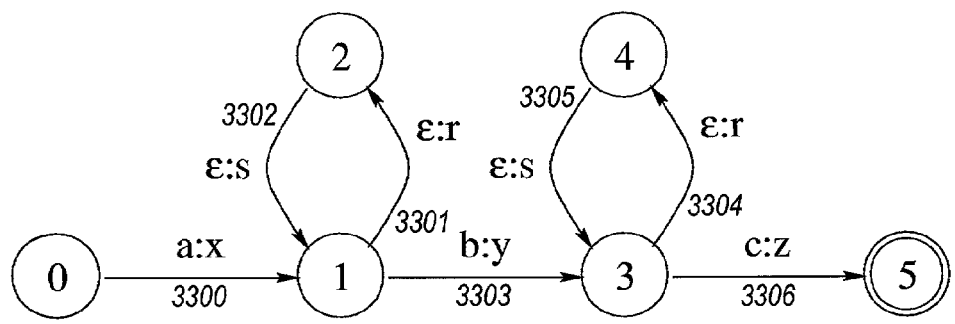
FIG. 54 illustrates an FST, with arcs 3300–3306 and states 0–5, in which infinite ambiguity is described by epsilon loops ($\epsilon$-loops)

FIG. 54 shows a simple example of an FST with infinite ambiguity, consisting of the two ϵ-loops [3301, 3302] and [3304, 3305]. The FST maps the input string "abc" to the output string "xyz", and inserts an undefined number of substrings "rs" inside.

Figure 55:
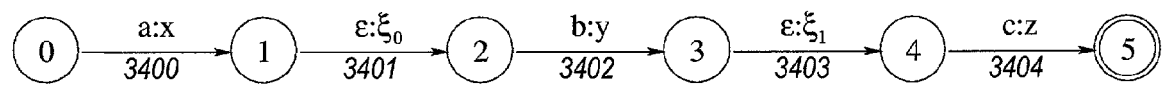
FIG. 55 illustrates a first factor, with arcs 3400–3404 and states 0–5, of the FST shown in FIG. 54 that emits diacritics.
Figure 56:
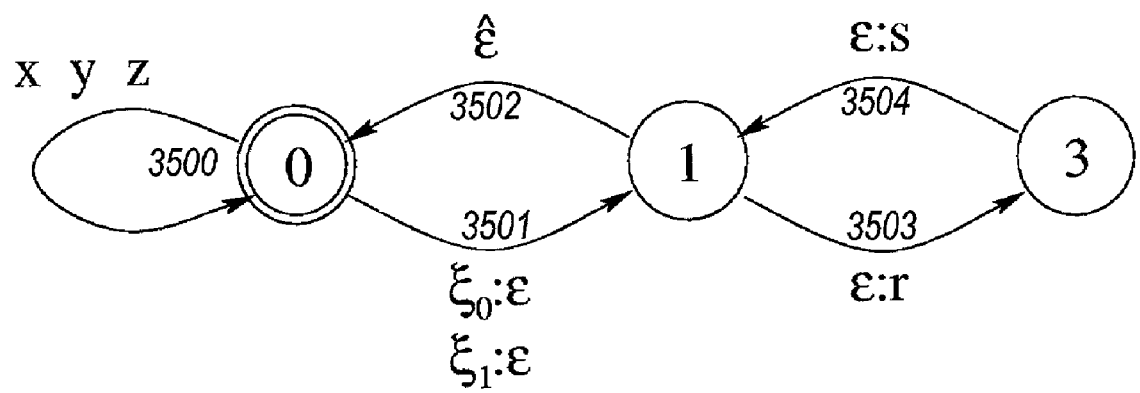
FIG. 56 illustrates a second factor, with arcs 3500–3504 and states 0–3, of the FST shown in FIG. 54 that maps the diacritics, emitted in the first factor illustrated in FIG. 55, to epsilon loops ($\epsilon$-loops)

FIGS. 55–56 show the same example after factorization. The first factor (FIG. 55) maps the input string "abc" to the intermediate string "xξ₀yξ₁z". The second factor maps the diacritics, ξ₀ and ξ₁, to ϵ-loops, and every other symbol of the intermediate string to itself (FIG. 56). Although the diacritics are single symbols, they each describe an infinite ambiguity. Actually, both diacritics describe the same infinite ambiguity in this example, and it would be sufficient to use two occurrences of the same diacritic, e.g. ξ₀, instead. This issue will be addressed further below.

Figure 63:
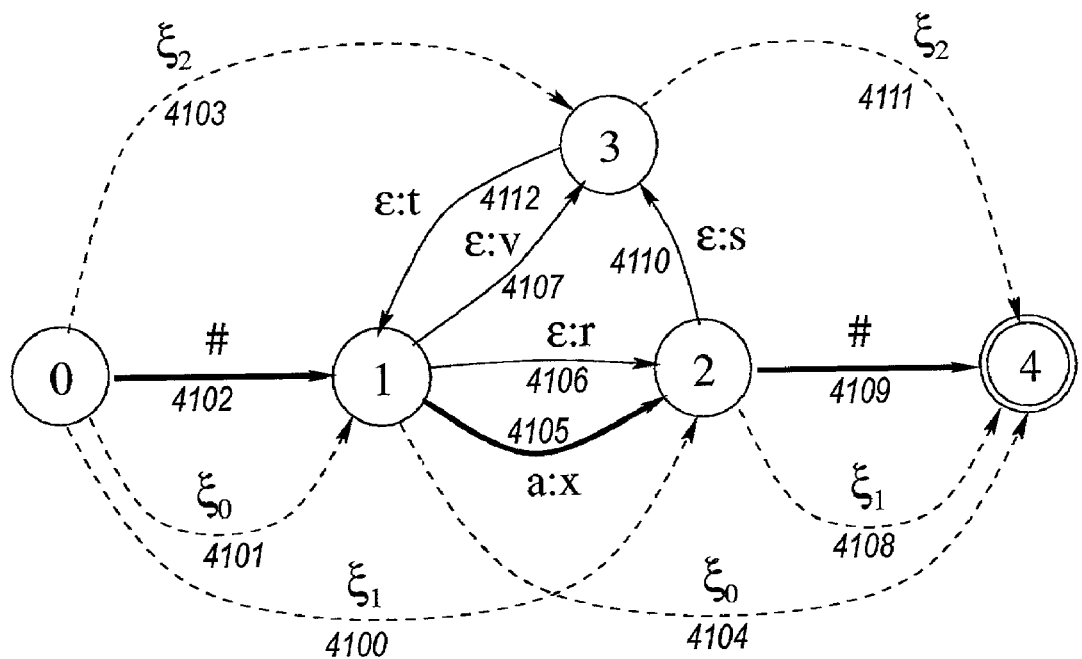
FIG. 63 illustrates preparation of a second factor $\Xi_2$, with arcs 4100–4112 and states 0–4, from the form of the FST shown in FIG. 61 that maps diacritics to epsilon loops ($\epsilon$-loops)

The diacritic ϵ̂ denotes the (ordinary) empty string, like ϵ (FIG. 56). Both have the same effect when the FST is applied to an input sequence or when it is involved in standard finite-state operations. However, ϵ̂ should be preserved in minimization and determinisation, whereas ϵ is removed. The reason to preserve ϵ̂ here and in the following example is that otherwise, the second factor would become larger (FIGS. 56 and 63).

The above example, illustrated in FIG. 54, contains only simple ϵ-loops. Such loops could be removed by physically removing their arcs. However, ϵ-loops can be more complicated. They can overlap with each other, with non-ϵ-loops, or with other parts of the FST. This means that ϵ-loops must be removed without physically removing any of their arcs.

Figure 57:
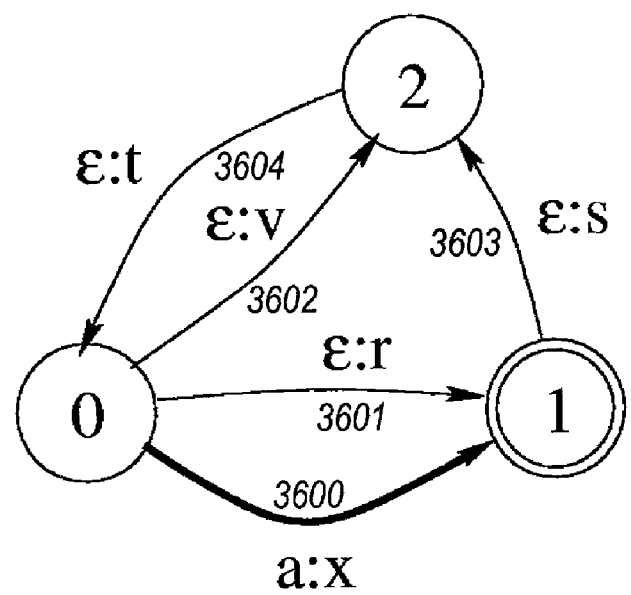
FIG. 57 illustrates an FST, with arcs 3600–3604 and states 0–3, in which infinite ambiguity is described by epsilon loops ($\epsilon$-loops)

FIG. 57 shows a more complex example of an FST with infinite ambiguity. In all of the figures corresponding to this example, thin arcs are used for ϵ-transitions, and thick arcs are used for non-ϵ-transitions. None of the ϵ-arcs 3601, 3603, and 3604 can be physically removed because they are not only part of ϵ-loops but, among others, also part of the complete paths [3601] and [3600, 3603, 3604, 3600] that accept the input strings ϵ and "aa", respectively.

Figure 58:
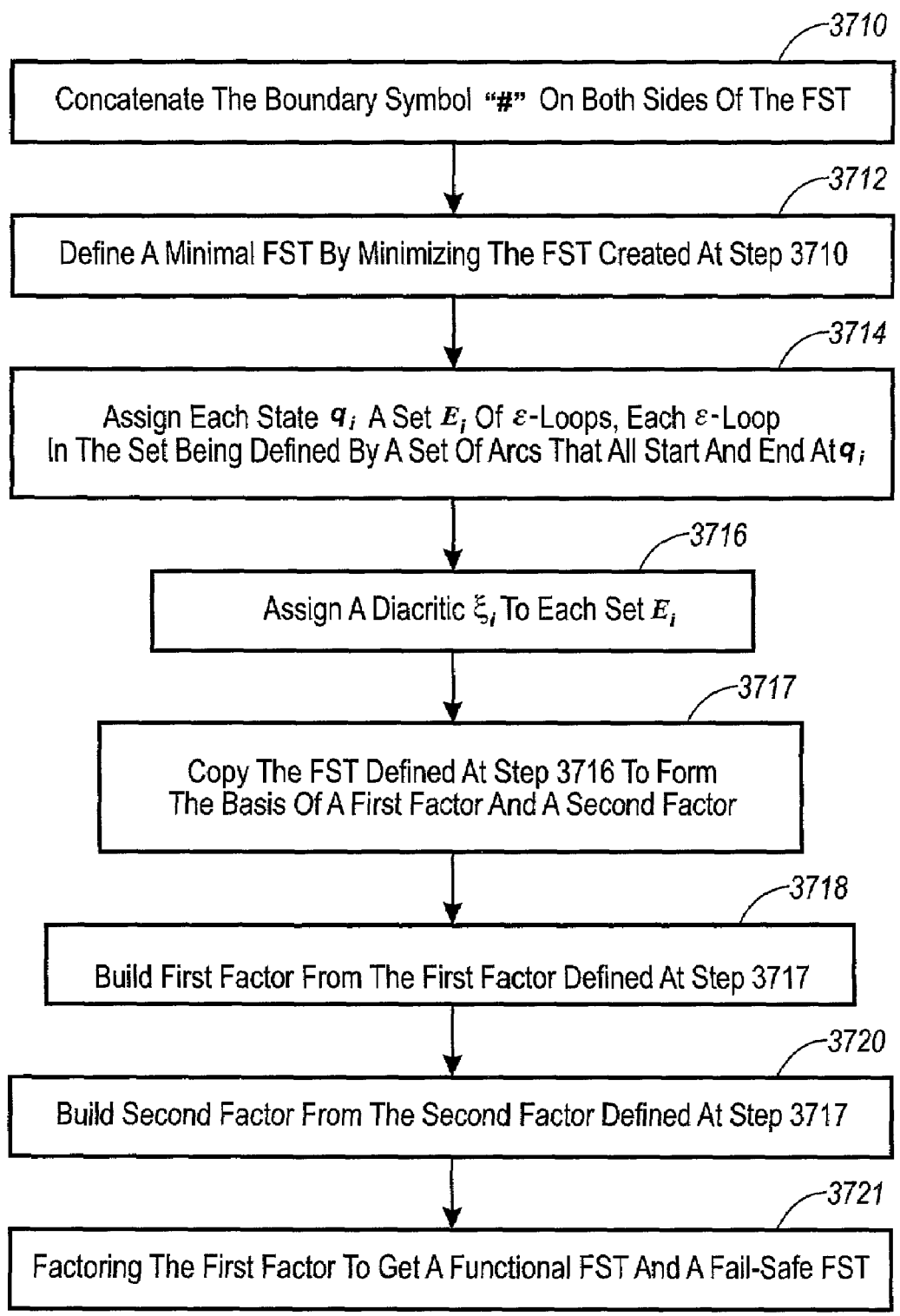
FIG. 58 is a flow diagram that sets forth the steps for extracting infinite ambiguity when factoring finite state transducers.
Figure 59:
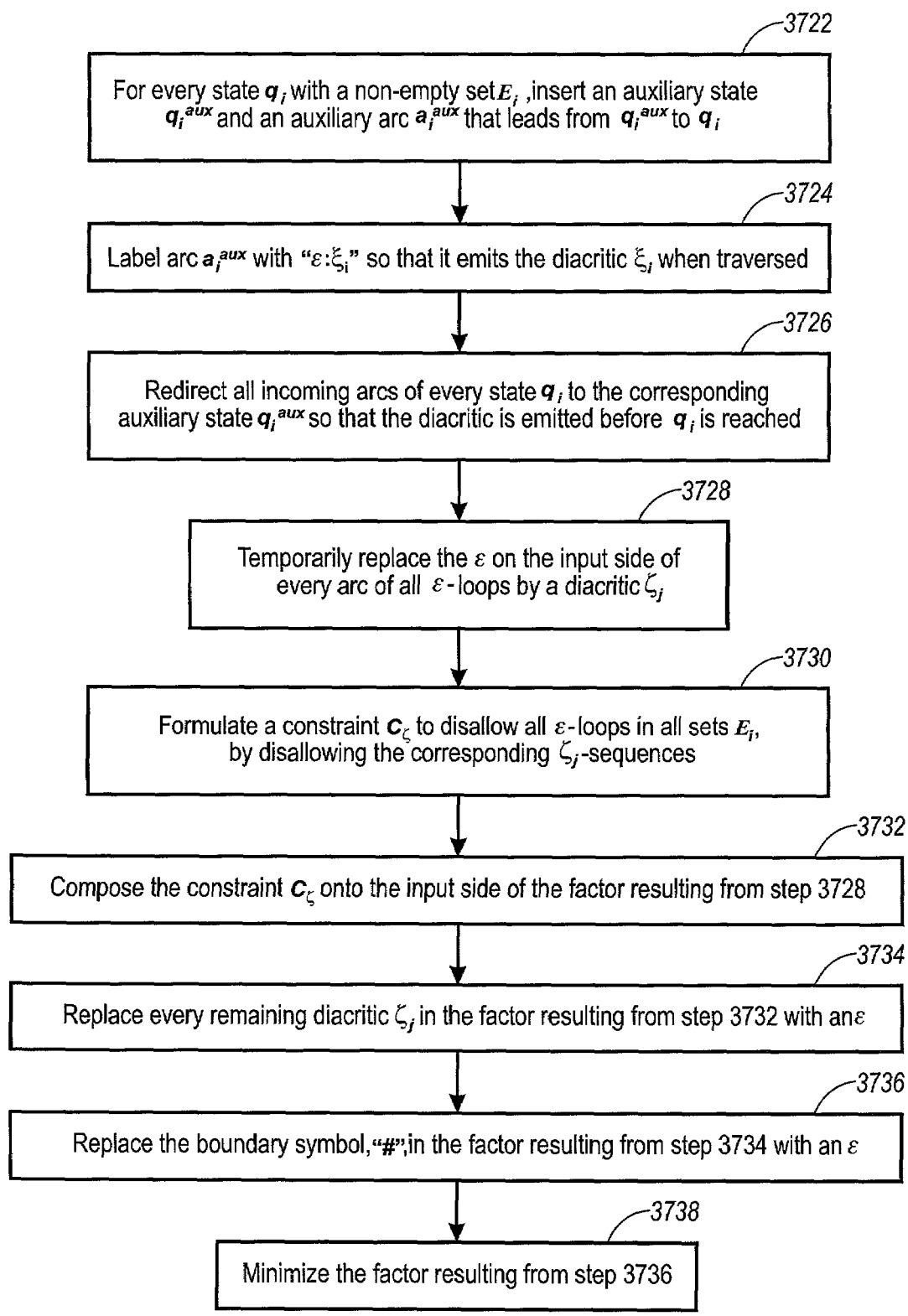
FIG. 59 is a flow diagram that sets forth the step 3718 for building the first factor in the flow diagram in FIG. 58 in greater detail.
Figure 60:
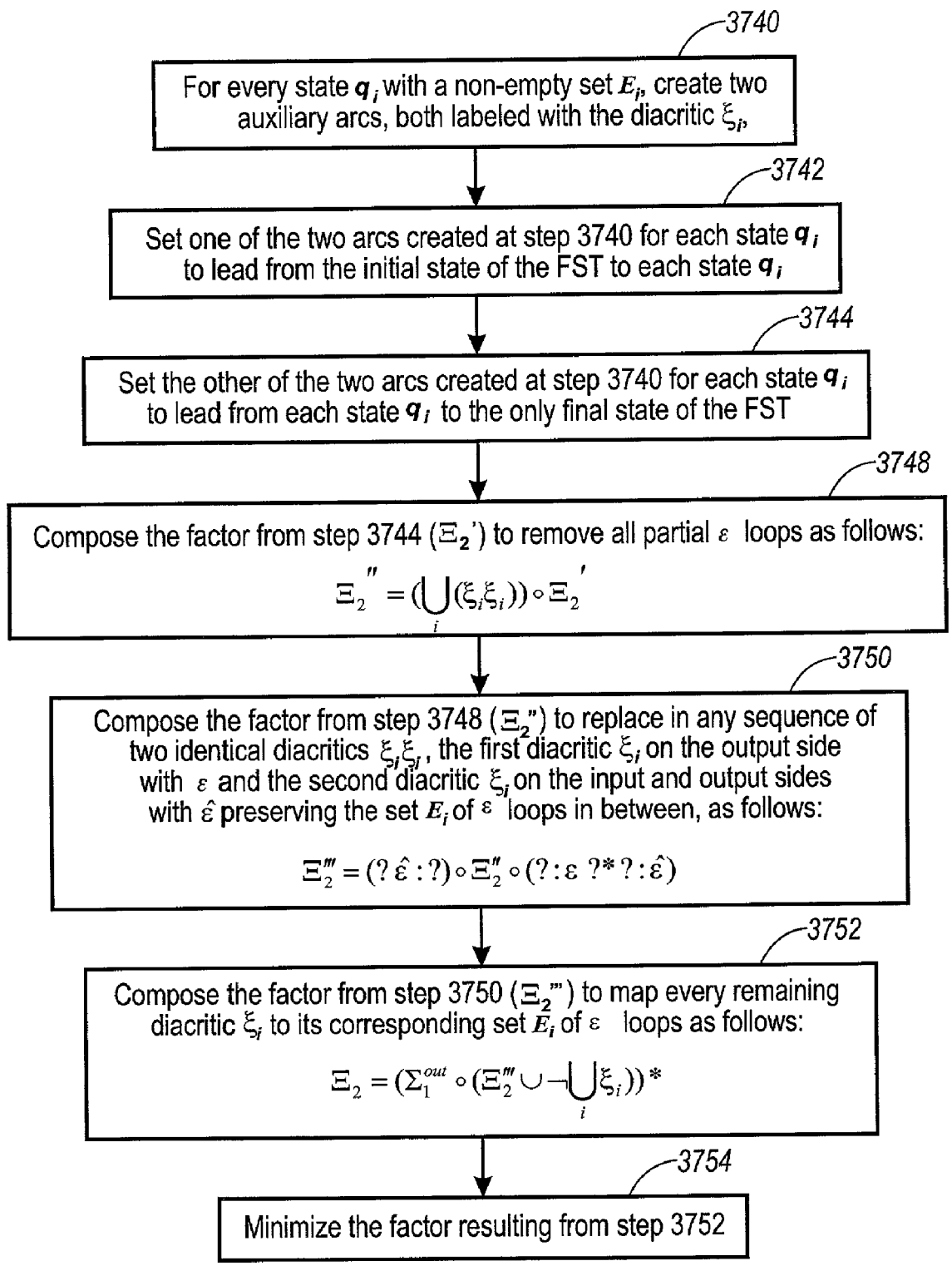
FIG. 60 is a flow diagram that sets forth the step 3720 for building the second factor in the flow diagram in FIG. 58 in greater detail.
Figure 61:
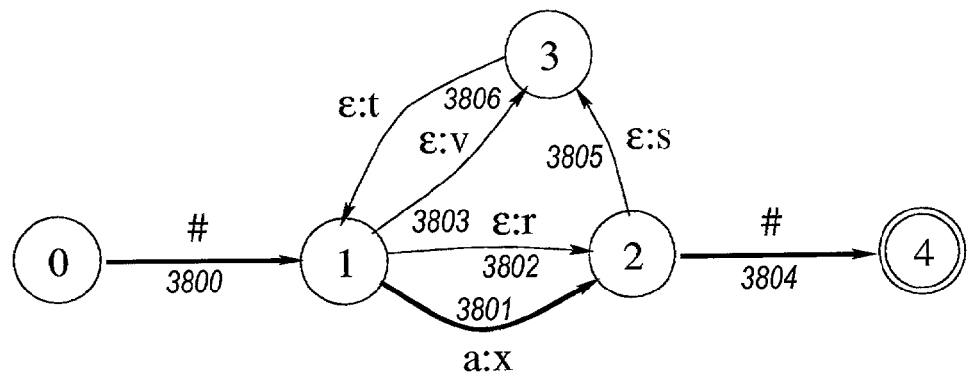
FIG. 61 illustrates an FST, with arcs 3800–3806 and states 0–4, and with boundaries.

To extract all infinite ambiguity from an arbitrary FST, the method proceeds as follows, and as shown in the flow charts of FIGS. 58–60. First, the original FST is concatenated on both sides with boundary symbols, #, (step 3710) and the result is minimized using standard known processes (step 3712). As described above, this operation causes the properties of initiality and finality, so far described only by states, to be also described by arcs; they are, therefore, easier to handle (FIG. 61).

Then, each state $q_i$ is assigned the set $E_i$ of $\epsilon$-loops that all start (and end) at $q_i$ (step 3714), and a diacritic $\xi_i$ that is considered as equivalent to the set $E_i$ (FIG. 61) (step 3716). For example, state 1 is assigned the set {⌈3802, 3805, 3806⌊, [3803, 3806]} and the diacritic $\xi_0$, which means that two $\epsilon$-loops consisting of the named arcs start at state 1 and that these $\epsilon$-loops are equivalent to $\xi_0$. The two $\epsilon$-loops generate the (output) substrings "(rst)*" and "(vt)*" (where the "*" symbol represents zero-or-more occurrences of the preceding symbol or bracketed set of symbols) respectively. There are different methods to obtain the information in the sets $E_i$. One method is, starting iteratively from every state $q_i$, to traverse every sequence of $\epsilon$-arcs. If a sequence ends at its start state, it describes an $\epsilon$-loop, and is added to the set $E_i$ of $q_i$. This method is well known by those skilled in the art.

Both factors, $\Xi_1$ and $\Xi_2$, are built from this form of the FST (FIG. 61) (step 3717). Generally, two steps are required to build the first factor (step 3718): First, at every state $q_i$ with a non-empty set $E_i$, an arc must be inserted that maps $\epsilon$ to $\xi_i$ that represents $E_i$. Second, all $\epsilon$-loops must be removed without physically removing their arcs. The details of these steps for building the first factor $\Xi_1$ (step 3718) are set forth in the flow diagram in FIG. 59.

Figure 62:
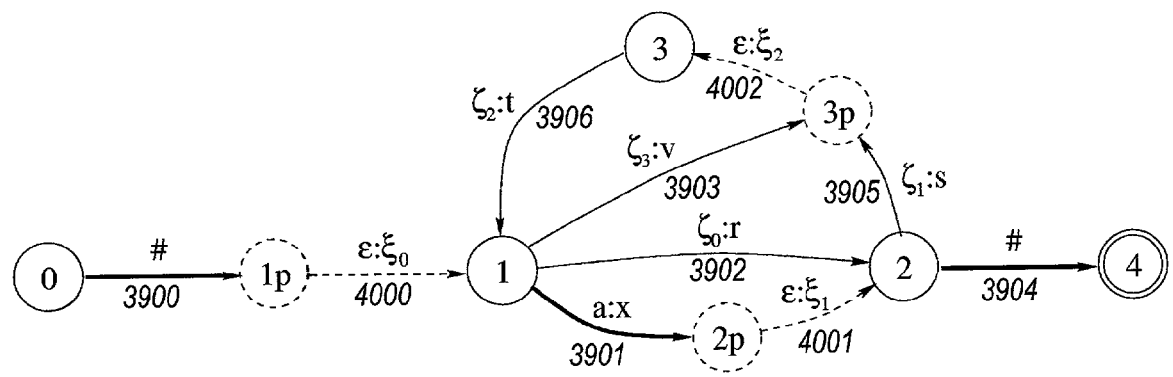
FIG. 62 illustrates preparation of a first factor $\Xi_1$, with arcs 3900–3906 and 4000–4002 and states 0–4 and 1p–3p, from the form of the FST shown in FIG. 61 that has diacritics instead of epsilon loops ($\epsilon$-loops)

In the first factor, for every state $q_i$ with a non-empty set $E_i$, an auxiliary state $q_i^{aux}$ and an auxiliary arc $\alpha^{aux}$ that leads from $q_i^{aux}$ to $q_i$ are inserted (FIG. 62) (step 3722). The arc $\alpha^{aux}$ is labeled with "$\epsilon{:}\xi_i$" (step 3724), i.e., it emits the diacritic $\xi_i$ when it is traversed. For example, state 1 is preceded by state 1p, 1 and the arc 4000 labeled with "$\epsilon{:}\xi_0$" leads from state 1p 1 to 1. By default, all incoming arcs of every state $q_i$ are redirected to the corresponding auxiliary state $q_i^{aux}$ so that the diacritic is emitted before $q_i$ is reached (step 3726). An incoming arc $\alpha$ requires no redirection if the set $E_i$ of its destination state $q_i$ is a repetition, relative to $\alpha$, of a subset of $E_{i-1}$ of the source state $q_{i-1}$ of $\alpha$. This is the case if every $\epsilon$-loop in $E_i$ can be obtained by rotation of an $\epsilon$-loop in $E_{i-1}$ over $\alpha$. Here, a redirection of $\alpha$ would not be wrong, but it is redundant. For example, the arc 3901 must be redirected from state 2 to 2p because it is not an $\epsilon$-arc (FIGS. 61–62). The arc 3906 requires no redirection from state 1 to 1p because every $\epsilon$-loop of its destination state 1 is a repetition of an $\epsilon$-loop of its source state 3 relative to the arc 3906; namely the $\epsilon$-loop [3902, 3905, 3906] of state 1 is obtained by rotating the $\epsilon$-loop [3906, 3902, 3905] of state 3 over the arc 3906, and the $\epsilon$-loop [3903, 3906⌊ of state 1 results from rotating the $\epsilon$-loop [3906, 3903] of state 3 over the same arc 3906. The arc 3903 must be redirected from state 3 to 3p because the $\epsilon$-loop [3906, 3902, 3905] of state 3 cannot be obtained by rotating any of the $\epsilon$-loops of state 1 over the arc 3903. This preliminary form of factor 1 will be referred to as $\Xi_1'$.

To remove all $\epsilon$-loops without removing their arcs, the $\epsilon$ on the input side of every arc of all $\epsilon$-loops is temporarily replaced by a diacritic $\xi_j$ (FIGS. 61–62) (step 3728). This diacritic is different for every concerned arc. For example, on the arc 3902, the $\epsilon$ is replaced by $\xi_0$ and on the arc 3905 it is replaced by $\xi_1$. Every $\epsilon$-loop in $\Xi_1'$ is then described by a sequence of $\xi_j$. For example, the $\epsilon$-loop [3902, 3905, 3906] on state 1 is described by the sequence [$\xi_0, \xi_1, \xi_2$] that consists of the new input symbols of this $\epsilon$-loop (FIGS. 61–62). Then, a constraint $C_\xi$ is formulated to disallow all $\epsilon$-loops in all sets $E_i$, by disallowing the corresponding $\xi_j$-sequences (step 3730). In this second example, the constraint is:

$$C_{86} = \neg(?^*((\xi_0\xi_1\xi_2)\cup(\xi_3\xi_2)\cup(\xi_1\xi_2\xi_0)\cup(\xi_2\xi_0\xi_1)\cup(\xi_2\xi_3))?^*)$$

When the constraint $C_\xi$ is composed onto the input side of $\Xi_1'$ (step 3732), all $\epsilon$-loops disappear:

$$\Xi_1'' = C_{86} \circ \Xi_1'$$

Figure 64:
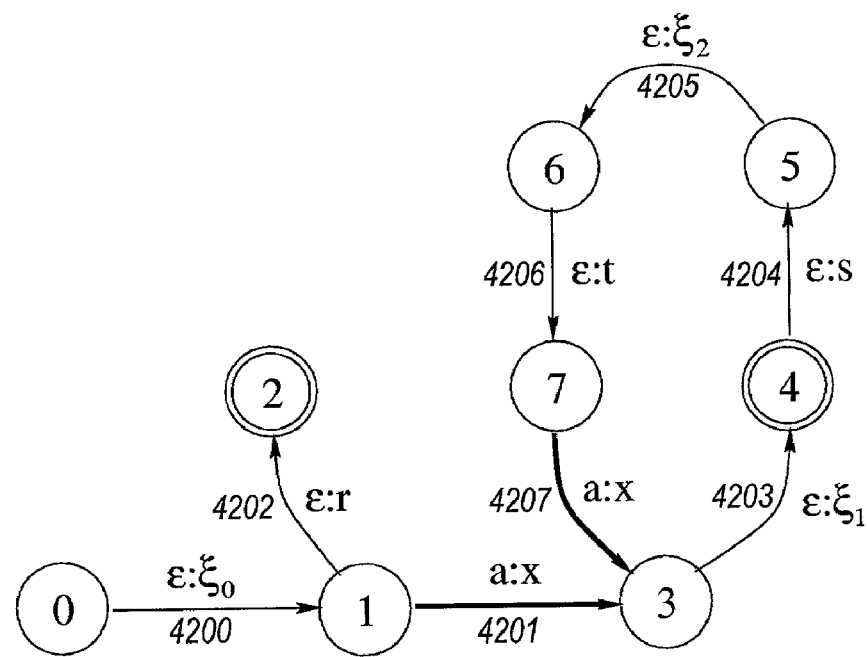
FIG. 64 illustrates the first factor $\Xi_1$, with arcs 4200–4207 and states 0–7, from the form of the FST shown in FIG. 61 that emits diacritics.

However, instances of the $\xi_j$-arcs remain if they are also part of another path than these $\epsilon$-loops. Finally, every $\xi_j$ in $\Xi_1''$ is replaced again with an $\epsilon$ (step 3734), the boundary symbol, "#", is replaced by $\epsilon$ (step 3736), and the first factor is minimized (step 3738) (FIG. 64). The final form of the first factor will be referred to as $\Xi_1$. Note that an initially introduced diacritic $\xi_i$ can disappear from $\Xi_1$ because none of the incoming arcs of a particular state have been redirected.

The second factor is built (step 3720) from the same modified form of the original FST as the first factor (FIG. 61). The details of building the second factor $\Xi_2$ (step 3720) are set forth in FIG. 60. The second factor must map any diacritic $\xi_i$ to the corresponding set $E_i$ of $\epsilon$-loops. For every state $q_i$ with a non-empty set $E_i$, two auxiliary arcs, both labeled with the diacritic $\xi_i$, are created (FIG. 63) (step 3740). One arc leads from the initial state of the FST to $q_i$ (step 3742), the other from $q_i$ to the only final state (step 3744). This preliminary form of the second factor will be referred to as $\Xi_2'$. After $q_i$ is reached by such an auxiliary arc, all $\epsilon$-loops of $q_i$ can be traversed any number of times before $q_i$ is left by the other auxiliary arc. Only those paths that contain complete $\epsilon$-loops of a state $q_i$ must be kept in $\Xi_2'$, i.e., all other paths, that contain partial $\epsilon$-loops, must be removed. For example, the paths [**4101, (4106, 4110, 4112)*, 4104**] (where, once again, the "*" symbol represents zero or more repeats) containing all $\epsilon$-loops of state 1 must be kept, and the paths [**4101, (4106, 4110, 4112)*, 4106, 4108] must be removed (FIG. 63). The paths to be kept consist of twice the same diacritic on the input side, i.e., $\xi_i\xi_i$ (step 3746). To allow only these paths, $\Xi_2'$ is composed with a constraint (step 3748**):

$$\Xi_2'' = \left(\bigcup_i (\xi_i\xi_i)\right) \circ \Xi_2'$$

This composition removes all undesired paths. In this example, the constraint is (FIG. 63):

$$\Xi_2'' = ((\xi_0\xi_0)\cup(\xi_1\xi_1)\cup(\xi_2\xi_2)) \circ \Xi_2'$$

The resulting $\Xi_2''$ maps any sequence of two identical diacritics $\xi_i\xi_i$ to itself, and inserts the corresponding set $E_i$ of $\epsilon$-loops in between (step 3750). The second occurrence of every $\xi_i$ is actually unwanted. It is removed by the composition:

$$\Xi_2''' = (?\hat{\epsilon}{:}?) \circ \Xi_2'' \circ (?{:}\epsilon?^*?{:}\hat{\epsilon})$$

The resulting $\Xi_2'''$ maps any single diacritic $\xi_i$ to the corresponding set $E_i$. The $\hat{\xi}$ denotes the (ordinary) empty string, like $\epsilon$. Both have the same effect when the FST is applied to an input sequence or when it is involved in standard finite-state operations. However, $\hat{\epsilon}$ should be preserved in minimization and determinisation, whereas $\epsilon$ is removed. The reason for preserving $\hat{\epsilon}$ is to prevent the final form of the second factor from otherwise becoming larger. If the size is of no concern, $\epsilon$ can be used instead.

The final form of the second factor, $\Xi_2$, must accept any sequence of output symbols of the first factor, $\Xi_1$, i.e., any sequence in $\Sigma_1^{out*}$. Within such a sequence, every diacritic $\xi_i$ must be mapped to the corresponding set $E_i$ of $\epsilon$-loops, and every other symbol must remain unchanged. $\Xi_2$ is obtained by (step 3752):

$$\Xi_2 = \left( \Sigma_1^{out} \circ \left( \Xi_2''' \cup \neg \bigcup_i \xi_i \right) \right)^*$$

This operation has the side effect that all diacritics $\xi_i$ that initially have been introduced by the process but have disappeared later from $\Xi_1$ are also removed from $\Xi_2$. Finally, $\Xi_2$ is minimized (FIG. 65) (step 3754).

Figure 65:
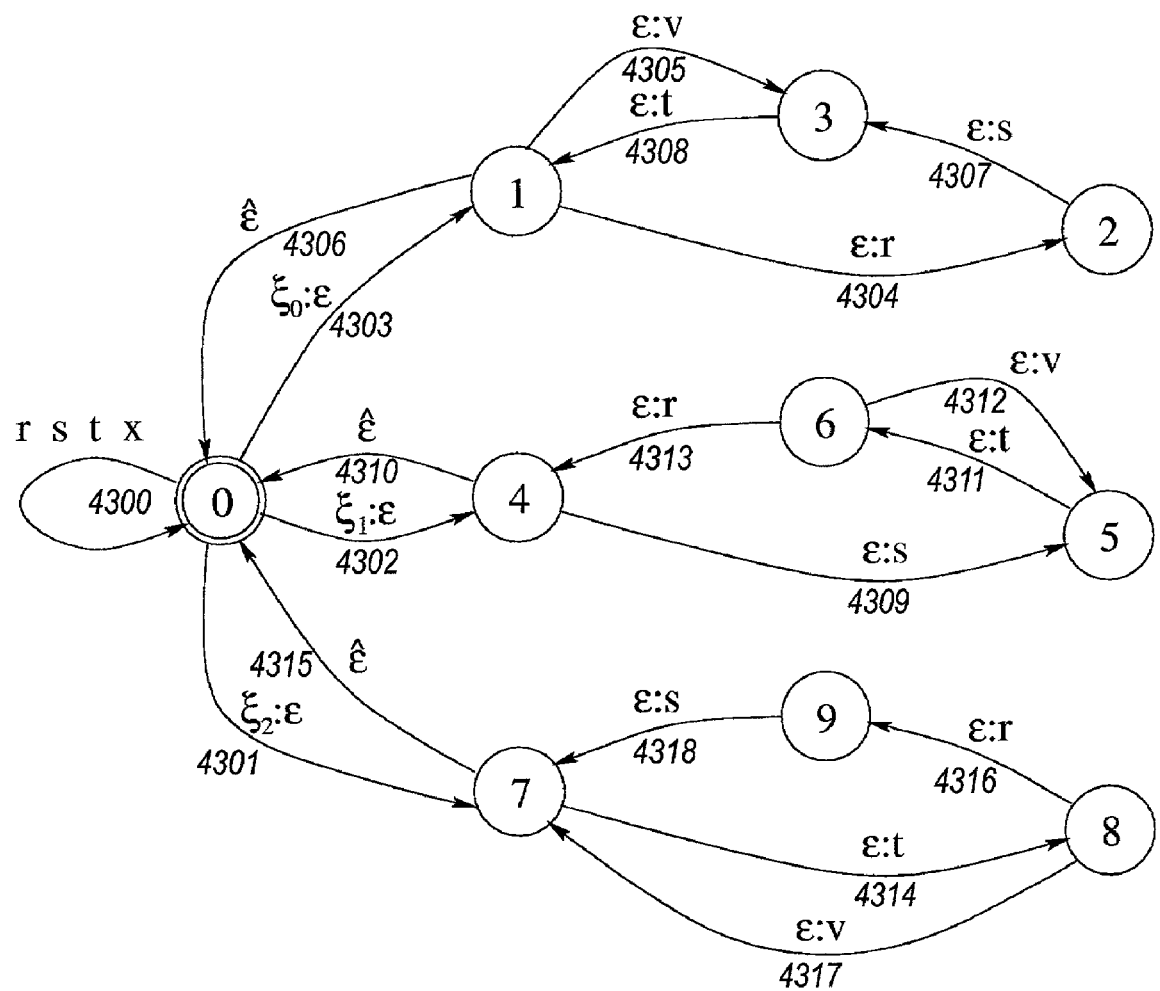
FIG. 65 illustrates the second factor $\Xi_2$, with arcs 4300–431 and states 0–8, from the form of the FST shown in FIG. 61 that maps diacritics to epsilon loops ($\epsilon$-loops)

Jointly in a cascade, the two factors, $\Xi_1$ and $\Xi_2$, describe the same relation and perform the same mapping as the original FST (see FIGS. 64–65). When $\Xi_1$ and $\Xi_2$ are composed with each other, the original FST is obtained.

The size increase of the second factor, compared to the original FST, is not necessarily a concern. The second factor could be an intermediate result that is further processed. For example, the $\epsilon$-loops in the second factor could be removed, or modified, or preserved, and the second factor could then be composed again with the first factor or with a part of it that results from another factorization (step 3721). It is discussed below in Section E.4 how different factorization processes can be applied together.

E.2 Post-Reduction Of The Intermediate Alphabet

Figure 66:
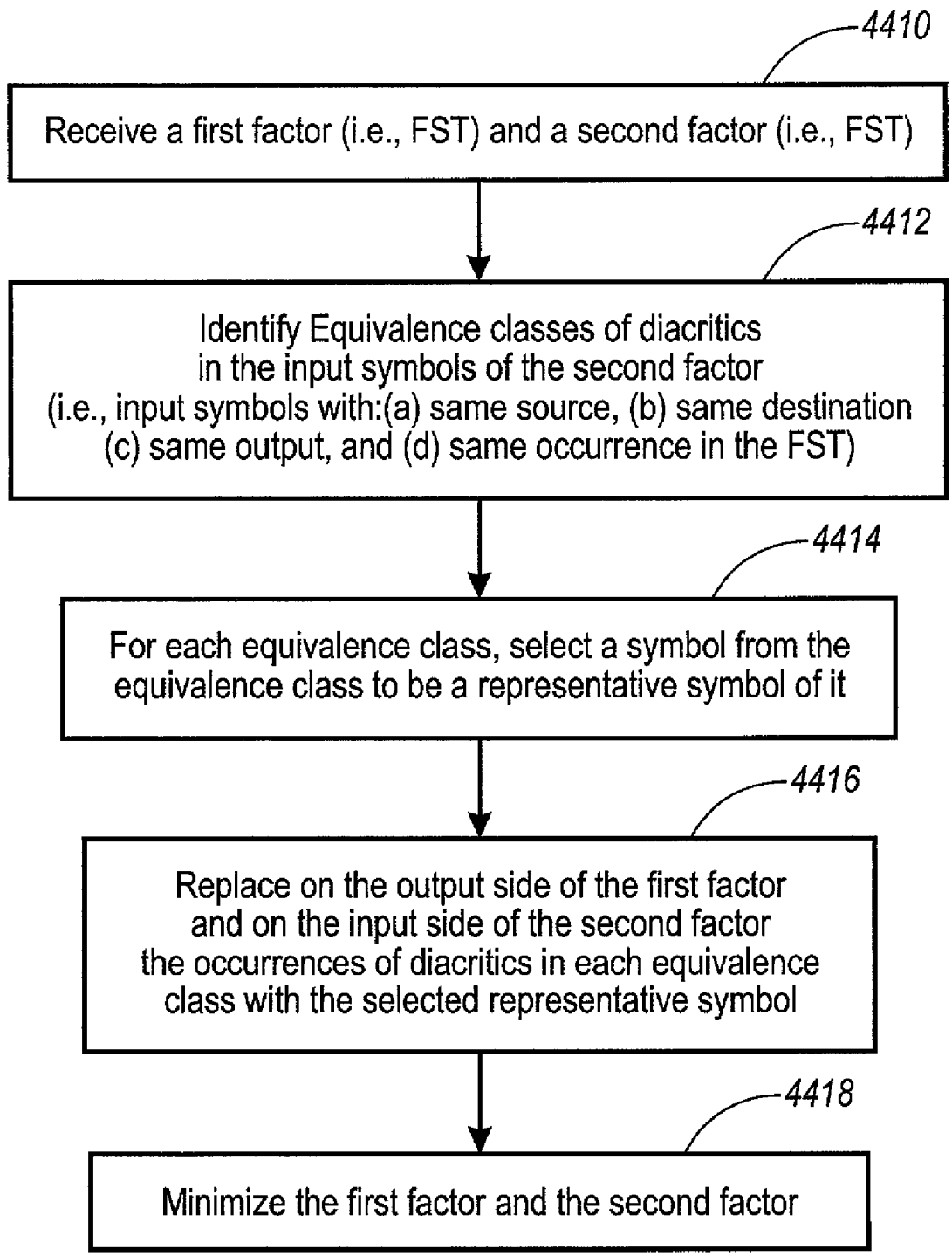
FIG. 66 is a flow diagram that sets forth the steps for reducing the intermediate alphabet occurring between two FSTs.

The following section describes a method, while referring to the flow chart in FIG. 66, for reducing the number of diacritics and other intermediate symbols occurring between two factors that result from any factorization such as extraction of infinite ambiguity, factorization of a finitely ambiguous FST, or bimachine factorization. The method is described with reference to the flow chart of FIG. 66.

Figure 67:
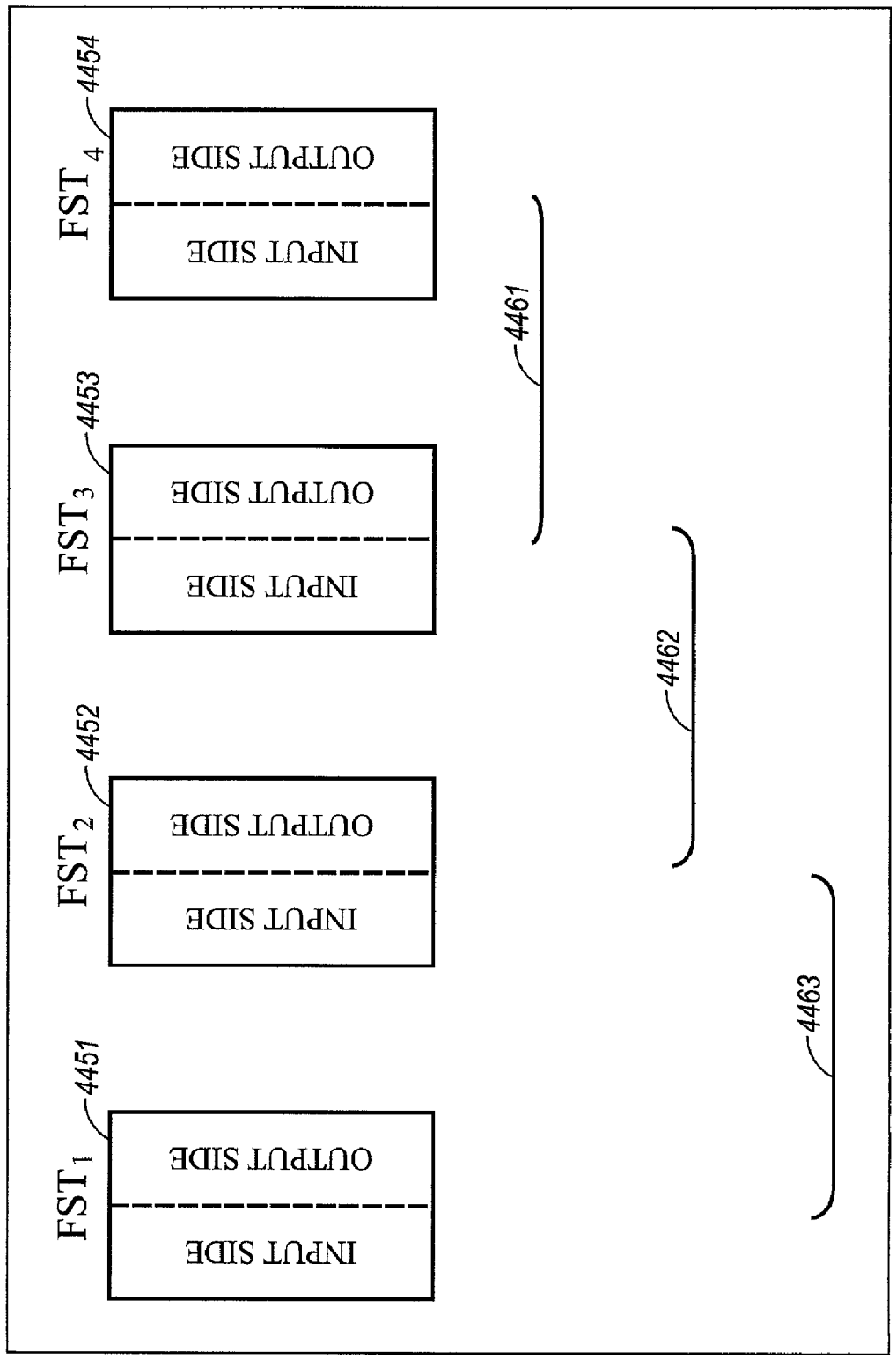
FIG. 67 illustrates the manner in which to extract short runs of ambiguity from four FSTs operate in a cascade.

In one embodiment, the method can be used with any other two FSTs that operate in a cascade (step 1410). With longer cascades, it can be applied pair-wise to all FSTs, preferably starting from the last pair. FIG. 67 illustrates an example in which four FSTs 4451–4454 operate in a cascade. The method for reducing the number of diacritics and other intermediate symbols occurring between two FSTs that operate in a cascade in this example is performed first on the pair of FSTs 4453 and 4454, then on the pair of FSTs 4452 and 4453, and finally on the pair of FSTs 4451 and 4452, as indicated by reference numbers 4461, 4462, and 4463, respectively.

Figure 68:
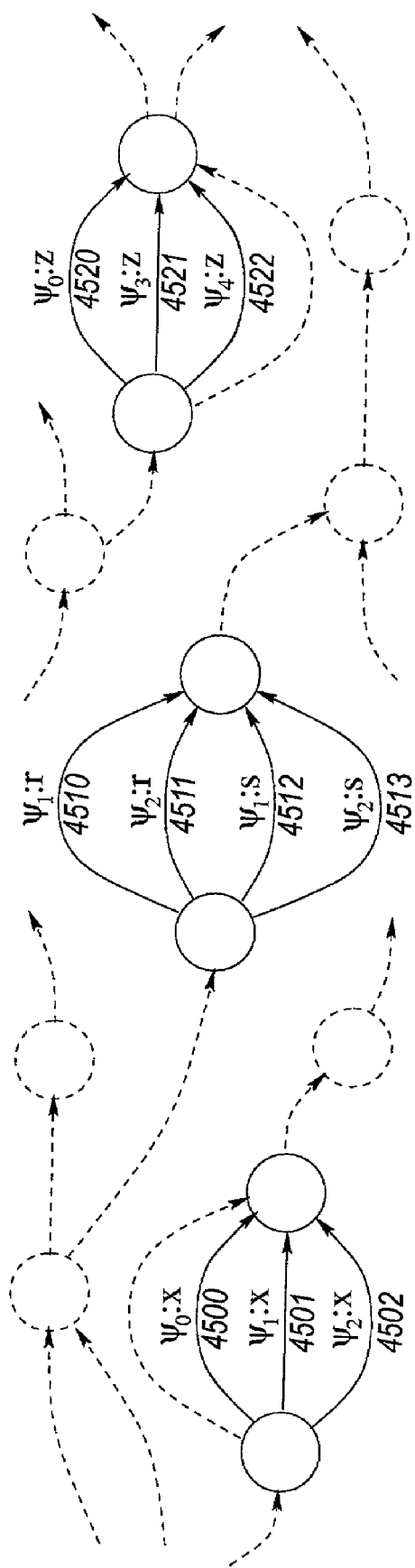
FIG. 68 illustrates part of a second factor of a FST, with arcs 4500–4502, 4510–4513, 4520–4522.

First, the process is applied to the second factor, or in the general case, to the second FST of a pair. FIG. 68 shows part of the second factor resulting from any factorization. The transitions and states that are relevant for the current purpose are represented by solid arcs and circles, and all other transitions and states are represented by dashed arcs and circles.

The first step consists of constituting (i.e., identifying) non-overlapping equivalence classes of diacritics in the input alphabet (i.e., symbols) of the second factor (step 4412). Two symbols, e.g., $\psi_i$ and $\psi_j$, are considered equivalent if for every arc with $\psi_i$ on the input side, there is another arc with $\psi_j$ on the input side and vice versa, so that both arcs have the same source and destination state and the same output symbol. From the above example (FIG. 68), we obtain the non-overlapping equivalence classes $\{\psi_o\}$, $\{\psi_1, \psi_2\}$, and $\{\psi_3, \psi_4\}$. Here, $\psi_0$ constitutes a class on its own because it first co-occurs with $\psi_1$ and $\psi_2$ in the arc set $\{$4500, 4501, 4502$\}$, and later with $\psi_3$ and $\psi_4$ in the arc set $\{$4520, 4521, 4522$\}$.

Figure 69:
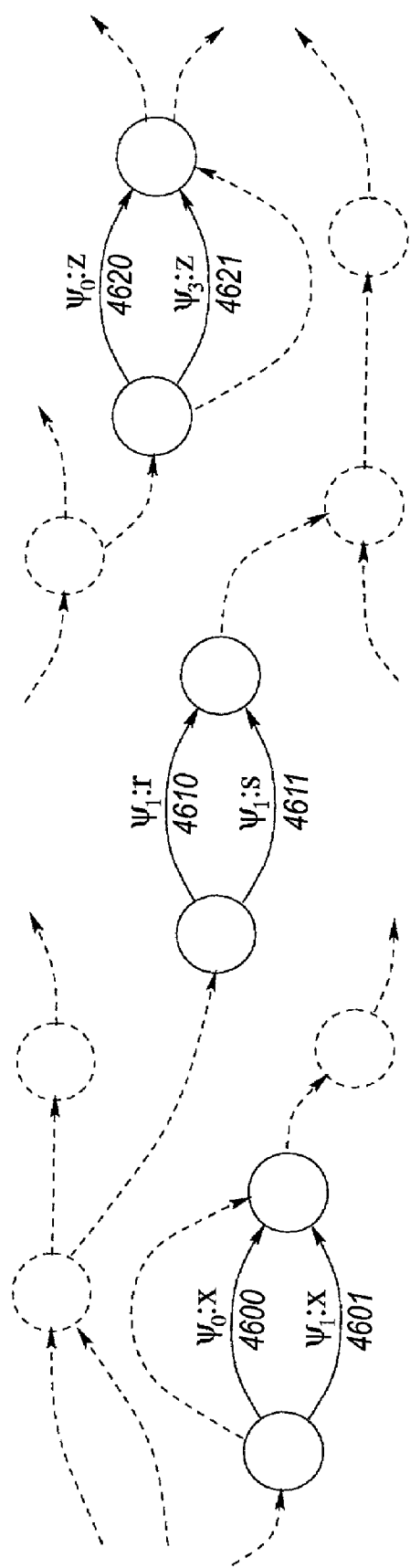
FIG. 69 illustrates part of a second factor of a FST, in which the second factor has reduced diacritics, with arcs 4600, 4601, 4610, 4611, 4620, and 4621.
Figure 70:
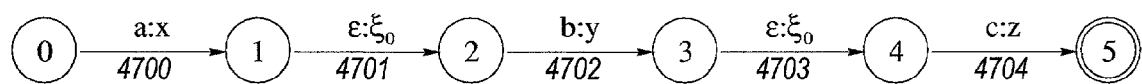
FIG. 70 illustrates the FST, with arcs 4700–4704 and states 0–5, shown in FIG. 55 with a reduced set of intermediate diacritics.
Figure 71:
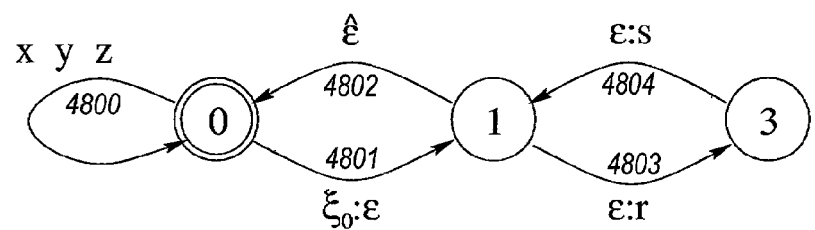
FIG. 71 illustrates the FST, with arcs 4800–4804 and states 0–3, shown in FIG. 56 with a reduced set of intermediate diacritics.

When the equivalence classes are constituted, all occurrences of all diacritics are replaced by the representative of their class which can be, e.g., the first member of the class (step 4414). This replacement must be performed on both the output side of the first factor and the input side of the second factor (step 4416). The resulting first factor and the second factor can then be minimized (step 4418). FIG. 69 shows the effect of this replacement on the first factor of the current example (cf. FIG. 68). FIG. 70 shows the first factor and FIG. 71 shows the second factor of a previous example with a reduced set of intermediate diacritics (cf. FIGS. 55–56).

The process reduces the set of intermediate diacritics a posteriori, i.e., it cannot prevent their creation in the first place. The process can be applied not only to diacritics but to every symbol in the intermediate alphabet of two factors.

E.3 Extraction Of Short Ambiguity

Figure 72:
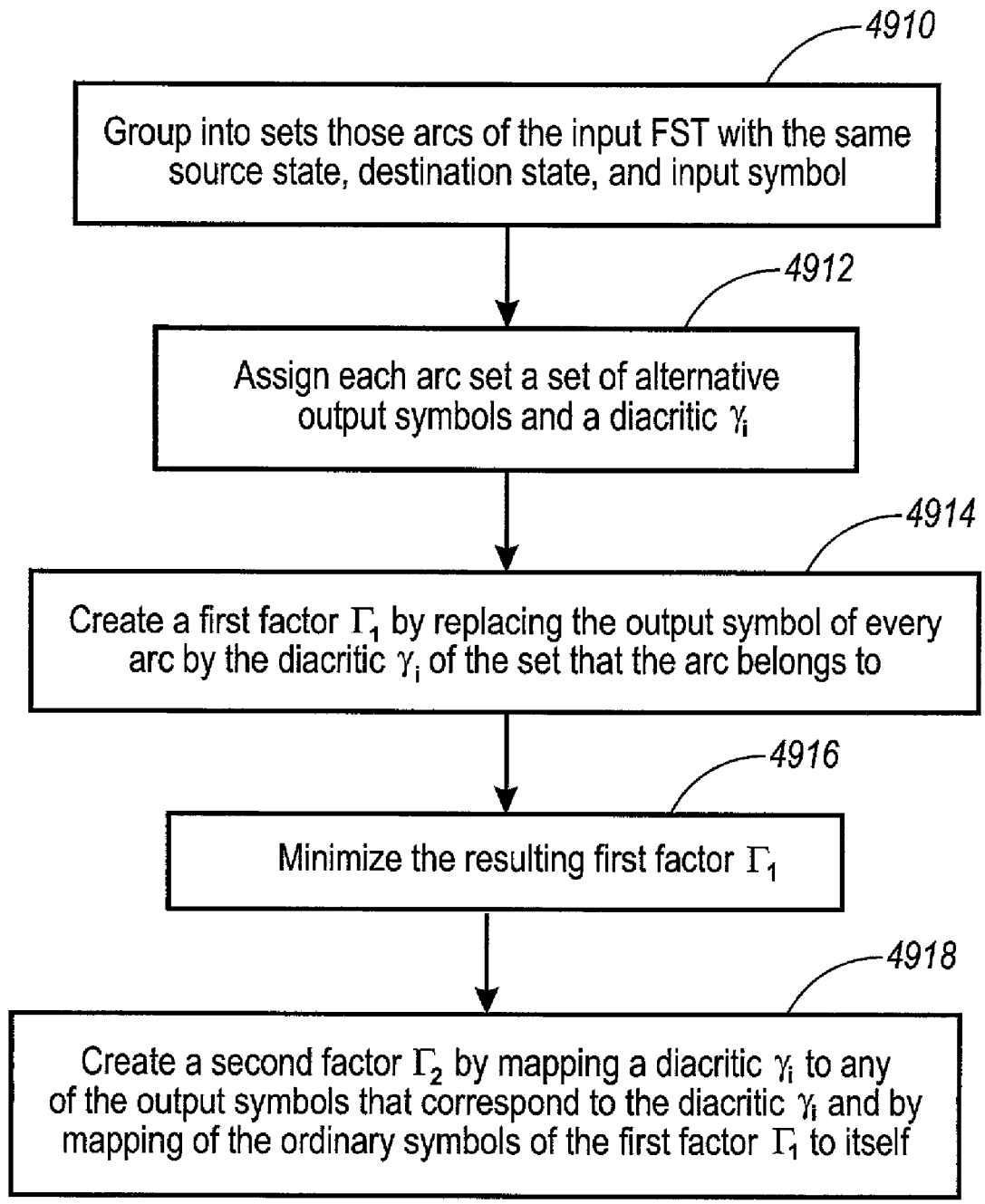
FIG. 72 is a flow diagram that sets forth the steps for extracting short runs of ambiguity from FSTs.

The following section describes a method for extracting "short" ambiguity. The method is described with reference to the flow chart of FIG. 72. Generally, the method factorizes any arbitrary FST into two FSTs. The first factor, $T_1$, contains most of the original FST, and the second factor, $T_2$, contains those parts of the ambiguity of the original FST that are one arc long, regardless of whether this is finite or infinite ambiguity.

Figure 73:
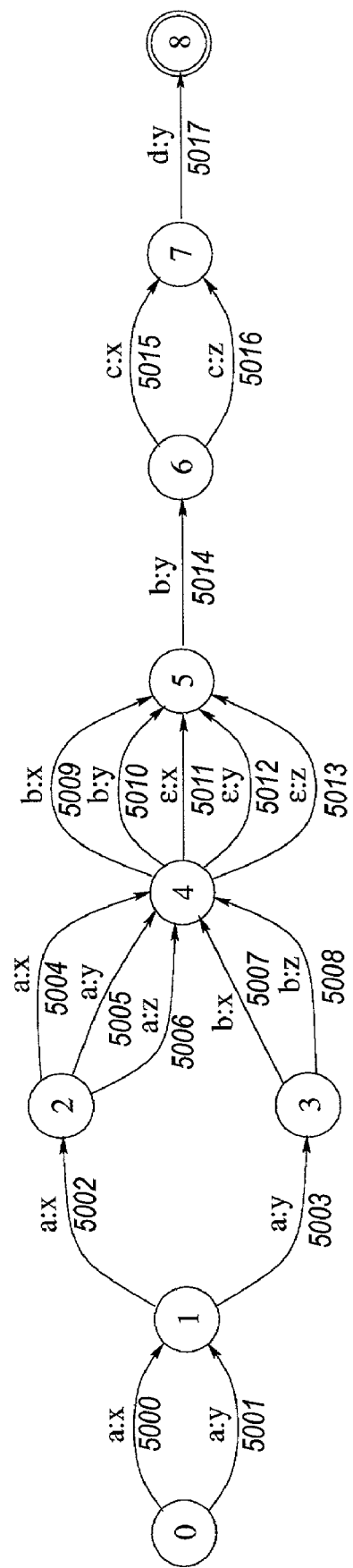
FIG. 73 illustrates an example of an FST, with arcs 5000–5017 and states 0–8, and with "short" ambiguity.

FIG. 73 shows an ambiguous FST. Part of the ambiguity is only one arc long. The method starts with building sets of arcs with the same source and destination state, and the same input symbol (step 4910). A set of arcs must contain more than one arc. Here, $\epsilon$ is treated like an ordinary symbol, both on the input side and the output side. In the current example the arc sets are: $\{$5000, 5001$\}$, $\{$5004, 5005, 5006$\}$, $\{$5007, 5008$\}$, $\{$5009, 5010$\}$, $\{$5011, 5012, 5013$\}$, and $\{$5015, 5016$\}$. Every arc set is assigned a set of alternative output symbols and a unique diacritic $\gamma_i$ that is considered equivalent to the symbol set (step 4912). Equal symbol sets have the same diacritic. Different symbol sets can overlap. For the current example, we obtain: $\{$5000,5001$\}$:$\gamma_0$:$\{x,y\}$; $\{$5009, 5010$\}$:$\gamma_0$: $\{x,y\}$; $\{$5004, 5005, 5006$\}$:$\gamma_1$: $\{x,y,z\}$; $\{$5011, 5012, 5013$\}$:$\gamma_1$:$\{x,y,z\}$; $\{$5007, 5008$\}$:$\gamma_2$:$\{x,z\}$; $\{$5015, 5016$\}$:$\gamma_2$: $\{x,z\}$.

Figure 74:
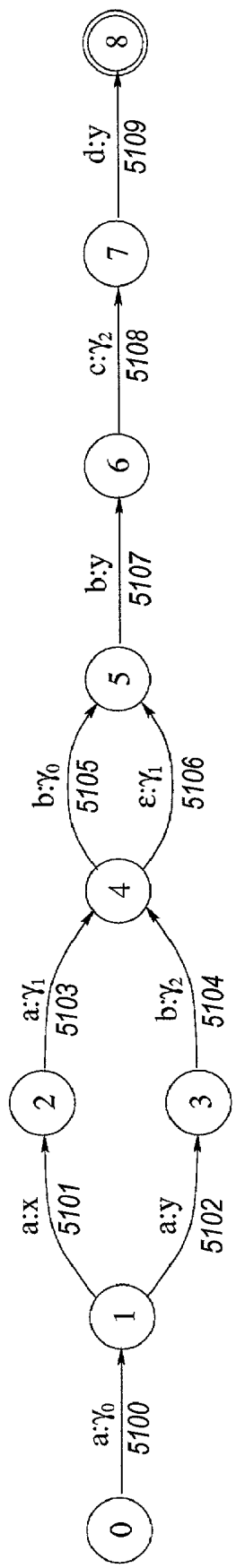
FIG. 74 illustrates the first factor of the FST shown in FIG. 73, with arcs 5100–5109 and states 0–8, and with factored short ambiguity that emits diacritics.

Based on these sets, the first factor, i.e. $\Gamma_1$, is created from the original FST. The output symbol of every arc is replaced by the diacritic $\gamma_i$ of the set that the arc belongs to (step 4914). For example, the output symbols of the arcs 5000 and 5001 are replaced by $\gamma_0$. The resulting $\Gamma_1$ is mninimized (FIG. 74) (step 4916). It can still be ambiguous because only the ambiguity that is one arc long has been extracted.

Figure 75:
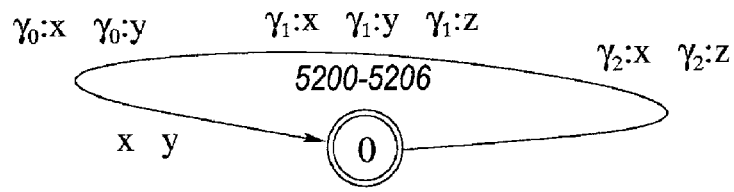
FIG. 75 illustrates the second factor of the FST shown in FIG. 73, with arcs 5200–5206 and state 0, and with factored short ambiguity that maps diacritics to output symbols.

The second factor (FIG. 75), i.e. $\Gamma_2$, is directly created from the above symbol sets (step 4918). $\Gamma_2$ has only a single state and a set of arcs that loop on this state. The arcs either map a diacritic $\gamma_i$ to any of the output symbols that correspond to $\gamma_i$, or they map any of the ordinary output symbols of $\Gamma_1$ to itself.

Although the method presented in this section cannot extract ambiguity that is longer than one arc (and that can be extracted by other factorization processes), it has the advantage of creating intermediate diacritics more sparingly, i.e., it prevents a priori the creation of some redundant diacritics. The method can be used as a preprocessing step for those other factorization processes.

E.4 Applications

This final section summarizes different factorizations and related processes, and describes how they can be applied together to any arbitrary FST.

Each of the following processes factorizes an FST into two FSTs that are referred to as a first factor and a second factor. When applied to an input sequence, the two factors operate in a cascade. The first factor maps the input to intermediate sequences which in turn are mapped by the second factor to final output sequences:

(A) Extraction of infinite ambiguity. Factorization of an arbitrary FST such that the first factor, $\Xi_1$, is at most finitely ambiguous, and the second, $\Xi_2$, retains all infinite ambiguity of the original FST.

(B) Extraction of "short" ambiguity. Factorization of an arbitrary FST such that the second factor, $\Gamma_2$, contains all ambiguity that is one arc long, and the first factor, $\Gamma_1$, contains all other parts of the original FST.

(C) Extraction of finite ambiguity. Factorization of a finitely ambiguous FST such that the first factor, $\Psi_1$, is functional, i.e., unambiguous, and the second, $\Psi_2$, retains all finite ambiguity of the original FST. Factor $\Psi_2$ is fail-safe for any output from $\Psi_1$, i.e., in every state of $\Psi_2$ there is always a transition for the next symbol generated by $\Psi_1$.

(D) Factorization of any functional FST such that the first factor, $B_1$, is left-sequential and processes an input sequence from left to right, and the second, $B_2$, is right-sequential and processes an intermediate sequence from right to left. $B_1$ and $B_2$ are jointly equivalent to a bimachine.

Each of the following processes improves one or more of the above factorizations:

(A) Reduction of the intermediate alphabet of any two FSTs that operate in a cascade. The process is applicable to the two factors resulting from any above factorization. It removes a posteriori all redundant intermediate symbols but it cannot a priori prevent their creation.

(B) Ambiguity alignment in any (at most) finitely ambiguous FST: The process deals with $\epsilon$ (epsilon, the empty string) on the input side of an FST. It introduces additional $\epsilon$-arc to "align" a set of arcs that have all the same input symbol and the same set of alternative input prefixes. The process can be used as a preprocessing step before bimachine factorization, or before the factorization of finitely ambiguous FSTs.

(C) Reduction of the number of diacritics in the intermediate alphabet of two sequential FSTs that jointly represent a bimachine. This process is applicable in the course of bimachine factorization.

(D) "Indirect factorization" of the unknown symbol. The process is applicable in the course of bimachine factorization and of factorization of finitely ambiguous FSTs.

The foregoing factorization processes can be jointly applied to any arbitrary FST.

F. System

It will be recognized that portions of the foregoing processes (i.e., methods detaining processing instructions or operations) may be readily implemented in software as methods using software development environments that provide source code that can be used on a variety of general purpose computers. Alternatively, portions of the processes may be implemented partially or fully in hardware using standard logic circuits. Whether software or hardware is used to implement different portions of the processes varies depending on speed and efficiency requirements of the system being designed.

Figure 76:
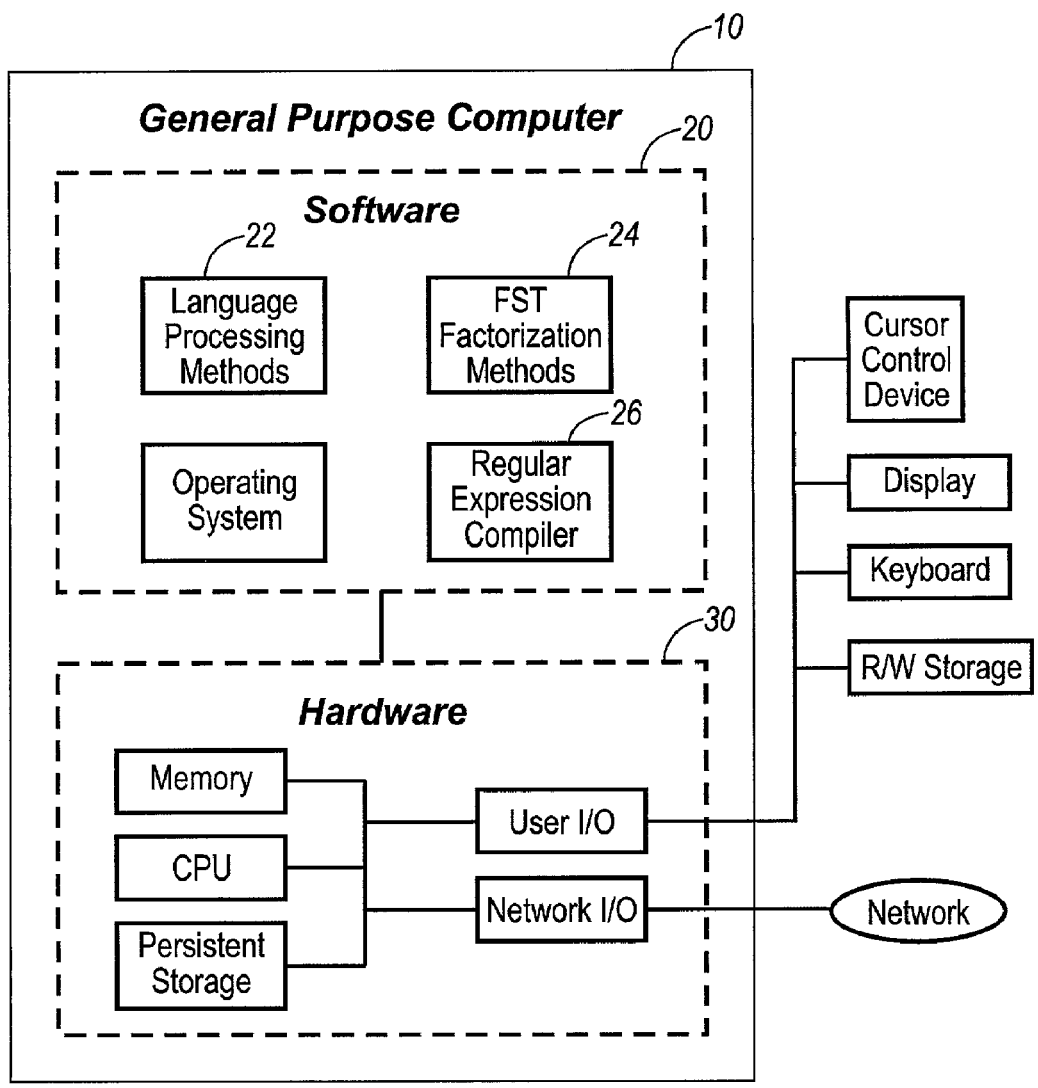
FIG. 76 illustrates a general purpose computer for carrying out the present inventions.

FIG. 76 illustrates a general purpose computer embodying a data processing system for performing the methods in accordance with the present invention. More specifically, it will be recognized the many of the foregoing methods, which include language processing methods 22 and FST factorization methods 23, can be implemented in various ways, including hardware 30, software 20, and combinations of hardware and software as shown in FIG. 76 on general purpose computer 10. The language processing methods 22 that use FSTs, compiled for example from regular expressions using compiler 26, that are described above include tokenization, phonological and morphological analysis, disambiguation, spelling correction, and shallow parsing. The FST factorization methods 23 include those described in Sections C, D, and E above. It will further be recognized that the methods and processes set forth herein are combinable in various ways to produce advantageous results.

It will also be recognized by those skilled in the art that any resulting language processing method(s) incorporating the present invention, having computer-readable program code, may be embodied within one or more computer-usable media such as memory devices or transmitting devices, thereby making a computer program product or article of manufacture. As such, the terms "article of manufacture" and "computer program product" as used herein are intended to encompass a computer program existent (permanently, temporarily, or transitorily) on any computer-usable medium such as on any memory device or in any transmitting device.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A computer-implemented method for finite-state language processing that aligns ambiguity in an input finite-state transducer (FST) having an input side to provide a sequential FST, comprising the steps of:

receiving an input string at the FST;

concatenating a boundary symbol on a right side of the input FST;

creating a left-deterministic input finite-state automaton (FSA) having a plurality of arcs by producing a minimal FST from the input FST and by extracting the input side and determinizing the input side from left to right, including, for every state $q_i$ with a non-empty set $E_{Ei}$, creating two auxiliary arcs, both labeled with the diacritic $\xi_i$, setting one of the two auxiliary arcs for each state $q_i$ to lead from an initial state of the FST to each state $q_i$, setting the other of the two auxiliary arcs for each state $q_i$ to lead from each state $q_i$ to an only final state of the FST, composing a factor $\Xi_2'$ to remove all partial $\epsilon$ loops using an equation $$\Xi_2'' = \left(\bigcup_i (\xi_i \xi_i)\right) \circ \Xi_2',$$

composing a factor $\Xi_2''$ to replace in any sequence of two identical diacritics $\Xi_i \Xi_i$, a first diacritic $\Xi_i$ on an output side with $\epsilon$ and a second discritic $\xi_i$ on the input and output sides with $\hat{\epsilon}$ preserving a set $E_i$ of $\epsilon$ loops in between using an equation $\Xi_2''' = (?\hat{\epsilon}:?) \circ \Xi_2'' \circ (?:\epsilon?*?:\hat{\epsilon})$, composing a factor $\Xi_2'''$ to map every remaining diacritic $\xi_i$ to a corresponding set $E_i$ of s loops using the equation $$\Xi_2 = \left(\Sigma_1^{out} \circ \left(\Xi_2''' \cup \neg \bigcup_i \xi_i\right)\right)^*,$$

and minimizing a resulting factor;
  copying at least one state of the minimal FST as many times as it occurs in different state sets of the input FST to create an aligned FST; identifying each arc in the left-deterministic FSA, and for each such arc:
  identifying at least one corresponding sub-path in the input EST;
    recording at least one alternative sub-path of the minimal FST; and
    aligning the sub-path with at least one other corresponding sub-path by prepending arcs with symbols representative of an empty string;
  replacing the boundary symbol with a symbol representing an empty string to provide an aligned sequential FST; and
  performing language processing using an output string of the aligned sequential FST.

2. The method of claim 1, further comprising the step of inserting the sub-path in an aligned FST after aligning the sub-path.

3. The method of claim 2, further comprising the step of minimizing the aligned FST.

4. The method of claim 3, further comprising the step of factoring the aligned FST to produce a left-sequential FST and a right-sequential FST.

5. The method of claim 1, wherein the language processing comprises one of tokenization, phonological analysis, morphological analysis, disambiguation, spelling correction, and shallow parsing.

6. The method of claim 4, wherein the left-sequential FST and the right-sequential FST are lexical transducers.

7. The method of claim 3, further comprising the step of replacing the boundary symbols with empty string symbols before minimizing the aligned FST.

8. The method of claim 1, further comprising the step of concatenating the boundary symbol between any final states existing in the input FST and a new final state.

9. The method of claim 8, further comprising the step of minimizing the input FST with the new final state.

10. An apparatus for finite-state language processing that aligns ambiguity in an input finite-state transducer (FST) having an input side to provide a sequential FST, comprising:
  means for receiving an input string at the FST;
  means for concatenating a boundary symbol on a right side of the input FST;
  means for creating a left-deterministic input finite-state automaton (FSA) having a plurality of arcs by producing a minimal FST from the input FST and by extracting the input side and determinizing the input side from left to right, including, for every state q1 with a non-empty set $E_i$, creating two auxiliary arcs, both labeled with the diacritic $\xi_i$, setting one of the two auxiliary arcs for each state qi to lead from an initial state of the FST to each state $q_i$, setting the other of the two auxiliary arcs for each state q1 to lead from each state $q_i$ to an only final state of the FST, composing a factor $\Xi_2'$ to remove all partial $\epsilon$ loops using an equation $$\Xi_2'' = \left(\bigcup_i (\xi_i \xi_i)\right) \circ \Xi_2',$$

composing a factor $\Xi_2''$ to replace in any sequence of two identical diacritics $\xi_i \xi_i$, a first diacritic $\xi_i$ on an output side with $\epsilon$ and a second discritic $\xi_i$ on the input and output sides with $\hat{\epsilon}$ preserving a set $E_i$ of $\epsilon$ loops in between using an equation $\Xi_2'''=(?\epsilon:?)\circ\Xi_2''\circ(?:\epsilon^*?:\hat{\epsilon})$, composing a factor $\Xi_2'''$ to map every remaining diacritic $\xi_i$ to a corresponding set $E_i$ of $\epsilon$ loops using the equation, $$\Xi_2 = \left(\Sigma_1^{out} \circ \left(\Xi_2''' \cup \neg \bigcup_i \xi_i\right)\right)^*,$$

and minimizing a resulting factor;
  means for copying at least one state of the minimal FST as many times as it occurs in different state sets of the input FST to create an aligned FST;
  means for identifying each arc in the left-deterministic FSA, and for each such arc said identifying means:
    identifying at least one corresponding sub-path in the input FST;
    recording at least one alternative sub-path of the minimal FST; and
    aligning the sub-path with at least one other corresponding sub-path by prepending arcs with symbols representative of an empty string;
  means for replacing the boundary symbol with a symbol representing an empty string to provide an aligned sequential FST; and
  means for performing language processing using an output sting of the aligned sequential FST.

11. The apparatus of claim 10, further comprising means for inserting the sub-path in an aligned FST after aligning the sub-path.

12. The apparatus of claim 11, further comprising means for minimizing the aligned FST.

13. The apparatus of claim 12, further comprising means for factoring the aligned FST to produce a left-sequential FST and a right-sequential FST.

14. The apparatus of claim 10, wherein the language processing comprises one of tokenization, phonological analysis, morphological analysis, disambiguation, spelling correction, and shallow parsing.

15. The apparatus of claim 13, wherein the left-sequential FST and the right-sequential FST are lexical transducers.

16. A computer readable medium encoded with a computer program that causes a computer to perform finite-state language processing that aligns ambiguity in an input finite-state transducer (FST) having an input side to provide a sequential FST, comprising the steps of:
  receiving an input string at the FST;
  concatenating a boundary symbol on a right side of the input FST;
  creating a left-deterministic input finite-state automaton (FSA) having a plurality of arcs by producing a minimal FST from the input FST and by extracting the input side and determinizing the input side from left to right, including, for every state $q_i$ with a non-empty set $E_i$, creating two auxiliary arcs, both labeled with the diacritic $\xi_i$, setting one of the two auxiliary arcs for each state $q_1$ to lead from an initial state of the FST to each state $q_1$, setting the other of the two auxiliary arcs for each state $q_i$ to lead from each state q1 to an only final state of the FST, composing a factor $\Xi_2'$ to remove all partial ∈ loops using an equation, $$\Xi_2'' = \left(\bigcup_i (\xi_i \xi_i)\right) \circ \Xi_2',$$

composing a factor $\Xi_2''$ to replace in any sequence of two identical diacritics $\xi_i \xi_i$, a first diacritic $\xi_i$ on an output side with ∈ and a second discritic $\xi_i$ on the input and output sides with $\hat{\epsilon}$ preserving a set $E_i$ of ∈ loops in between using an equation $\Xi_2'''=(?\hat{\epsilon}:?)\circ\Xi_2''\circ(?:\epsilon?*?:\hat{\epsilon})$, composing a factor $\Xi_2'''$ to map every remaining diacritic $\Xi_i$ to a corresponding set $E_i$ of ∈ loops using the equation, $$\Xi_2 = \left(\Sigma_1^{out} \circ \left(\Xi_2''' \cup \neg \bigcup_i \xi_i\right)\right)^*,$$

and minimizing a resulting factor;

copying at least one state of the minimal FST as many times as it occurs in different state sets of the input FST to create an aligned FST;

identifying each arc in the left-deterministic FSA, and for each such arc:

identifying at least one corresponding sub-path in the input FST;

recording at least one alternative sub-path of the minimal FST; and aligning the sub-path with at least one other corresponding sub-path by prepending arcs with symbols representative of an empty string;

replacing the boundary symbol with a symbol representing an empty-string to provide an aligned sequential FST; and performing language processing using an output string of the aligned sequential FST.

* * * * *